United States Patent
Ohwada

(10) Patent No.: US 7,117,344 B1
(45) Date of Patent: Oct. 3, 2006

(54) PROCESSOR EXECUTION, PIPELINE SHARING INSTRUCTION, AND DATA SOURCE PATH

(75) Inventor: Akihiko Ohwada, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 09/586,961

(22) Filed: Jun. 5, 2000

(30) Foreign Application Priority Data

Oct. 5, 1999 (JP) .................................. 11-284850

(51) Int. Cl.
G06F 9/38 (2006.01)
(52) U.S. Cl. ..................................................... 712/218
(58) Field of Classification Search ................. 712/218
See application file for complete search history.

(56) References Cited

U.S. PATENT DOCUMENTS

| | | | | |
|---|---|---|---|---|
| 5,165,034 A | * | 11/1992 | Kanuma ...................... | 712/218 |
| 5,325,495 A | * | 6/1994 | McLellan ................... | 712/219 |
| 5,333,284 A | * | 7/1994 | Nugent ....................... | 712/218 |
| 5,471,626 A | * | 11/1995 | Carnevale et al. .......... | 712/219 |
| 5,619,664 A | * | 4/1997 | Glew ......................... | 712/218 |
| 5,740,181 A | * | 4/1998 | Heikes et al. ............... | 714/731 |
| 5,918,034 A | * | 6/1999 | Petolino, Jr. ................ | 712/218 |
| 5,928,355 A | * | 7/1999 | Petolino, Jr. ................ | 712/214 |
| 5,930,492 A | * | 7/1999 | Lynch ........................ | 712/216 |
| 5,996,065 A | * | 11/1999 | Makineni et al. ........... | 712/218 |
| 6,012,139 A | * | 1/2000 | Biswas et al. .............. | 712/222 |
| 6,049,860 A | * | 4/2000 | Krygowski et al. ........... | 712/25 |
| 6,460,134 B1 | * | 10/2002 | Blomgren et al. .......... | 712/219 |

FOREIGN PATENT DOCUMENTS

| | | |
|---|---|---|
| JP | SH058-106636 | 6/1983 |
| JP | HEI 6-222920 A | 8/1994 |
| JP | HEI 8-87411 A | 4/1996 |

OTHER PUBLICATIONS

InstantWeb. Free Online Computing Dictionary. © 1995. Search Term: Latch http://www.instantweb.com/foldoc/foldoc.cgi?query=latch.*
Texas Instruments. "Semiconductor Service and Support: Digital Compression Glossary of Terms". © Jun. 1994. Term: Decoder http://www.ti.com/sc/docs/glossary/94056.htm.*
Japanese Office Action dated Aug. 23, 2005 for App. No. HEI11-284850 (6 pgs).

* cited by examiner

Primary Examiner—Eddie Chan
Assistant Examiner—Aimee J. Li
(74) Attorney, Agent, or Firm—Staas & Halsey LLP

(57) ABSTRACT

A processor execution pipeline that includes, a stage latch circuit and a stage latch circuit provided at an input stage of a first processing stage for holding a first processing data $SOURCE_1$ and a second processing data, respectively; an operator provided at the first processing stage for executing a processing by using the first processing data $SOURCE_1$ and the second processing data; a stage latch circuit provided between the first processing stage and a second processing stage for holding an output value of the operator; an operator provided at the second processing stage for executing the processing by using a value of the stage latch circuit when an instruction has been decoded; and an instruction decoder that decodes the instruction to the operator as a through instruction to pass the value of the stage latch circuit through this operator.

13 Claims, 27 Drawing Sheets

PROCESSOR EXECUTION, PIPELINE SHARING INSTRUCTION, AND DATA SOURCE PATH

FIELD OF THE INVENTION

The present invention relates to a pipeline operator that uses a pipeline processing. Particularly, this invention relates to a pipeline operator that can achieve reduction in power consumption and reduction in scale of the hardware of stage latch circuits, inter-stage wiring, control circuits, etc.

BACKGROUND OF THE INVENTION

As microprocessors that achieve high-speed processing, pipeline operators that use pipeline processing have been used. The pipeline processing employs a method of overlapping the processing of a plurality of instructions by delaying the starting time of the execution of each instruction one clock by one clock, thereby achieving the execution of the instructions at an equivalent high speed. Before installing a pipeline operator into a computer system, the installation area, power consumption, and price of the pipeline operator are important factors that need to be examined. The pipeline operator must meet compactness, low power consumption, and low price as essential conditions.

FIG. 27 is a diagram that shows a structure of a conventional pipeline operator. The pipeline operator shown in this drawing has two processing stages of a first processing stage and a second processing stage. An operator $22_1$ and an operator $12_2$ to be described later are provided at the first processing stage and the second processing stage respectively. A processing-data register 10 is provided corresponding to a pipeline path $P_{10}$, and holds a first processing data (source operand). A processing-data register 20 is provided corresponding to a pipeline path $P_{20}$, and holds a second processing data (source operand). An instruction register 30 is provided corresponding to an instruction pipeline path $P_{30}$, and holds an instruction $INST_1$ and an instruction $INST_2$. The instruction $INST_1$ is a processing instruction dispatched to the operator $22_1$, and the instruction $INST_2$ is a processing instruction dispatched to the operator $12_2$.

Further, according to the conventional pipeline operator, a plurality of stage latch circuits for temporarily holding data and instructions are provided at an input stage of the two processing stages, between the first processing stage and the second processing stage (inter-processing stage), and at an output stage of the two processing stages, respectively. Specifically, a stage latch circuit $11_1$, a stage latch circuit $21_1$ and a stage latch circuit $31_1$ are provided in parallel at the input stage. A stage latch circuit $11_2$, a stage latch circuit $21_2$ and a stage latch circuit $31_2$ are provided in parallel between the processing stages, and a stage latch circuit $11_3$ is provided at the output stage. The stage latch circuit $11_1$ and the stage latch circuit $11_2$ are sequentially driven in one clock cycle in such a order of the input stage→the processing stage→the output stage.

At the first processing stage, the stage latch circuit $11_1$ is provided corresponding to the processing-data register 10, and holds the first processing data from the processing-data register 10. The stage latch circuit $21_1$ is provided corresponding to the processing-data register 20, and holds the second processing data from the processing-data register 20. The stage latch circuit $31_1$ is provided corresponding to the instruction register 30, and holds the instruction $INST_1$ and the instruction $INST_2$ from the instruction register 30. The instruction decoder 32, decodes the instruction $INST_1$ from the stage latch circuit $31_1$. When the instruction $INST_1$ has been decoded, the operator $22_1$ executes the processing according to the instruction $INST_1$ by using the value (the first processing data) of the stage latch circuit $11_1$ and the value (the second processing data) of the stage latch circuit $21_1$. Then, the operator $22_1$ outputs the result of the processing to the stage latch circuit $21_2$ through the pipeline path $P_{20}$.

At the second processing stage, the stage latch circuit $11_2$ is provided corresponding to the processing-data register 10, and holds the value of the stage latch circuit 11, (the first processing data). The stage latch circuit $21_2$ is provided corresponding to the processing-data register 20, and holds the result of the processing by the operator $22_1$. The stage latch circuit $31_2$ is provided corresponding to the instruction register 30, and holds the values of the stage latch circuit $31_1$ (instruction $INST_1$ and the instruction $INST_2$). The instruction decoder $32_2$ decodes the instruction $INST_2$ from the stage latch circuit $31_2$. When the instruction $INST_2$ has been decoded, the operator $12_2$ executes the processing according to the instruction $INST_2$ by using the value (the first processing data) of the stage latch circuit $11_2$, and outputs the result of the processing through the pipeline path $P_{10}$.

A multiplexer $40_2$ is a two-input and one-output type changeover unit whose changeover is controlled by the instruction decoder $32_2$. The multiplexer $40_2$ outputs one of the processing result of the operator $12_2$ and the value of the stage latch circuit $21_2$ (the processing result of the operator $22_1$). Specifically, the multiplexer $40_2$ outputs the processing result of the operator $12_2$ when the instruction $INST_2$ has been decoded by the instruction decoder $32_2$. On the other hand, the multiplexer $40_2$ outputs the value of the stage latch circuit $21_2$ when the instruction other than the instruction $INST_2$ (for example, the instruction $INST_1$) has been input to the instruction decoder $32_2$. The stage latch circuit $11_3$ holds the processing result of the operator $12_2$ or the value of the stage latch circuit $21_2$ (the processing result of the operator $22_1$) according to the changeover state of the multiplexer $40_2$. A processing-result register 50 holds a value of the stage latch circuit $11_3$, that is, a processing result (a destination operand) of the pipeline operator.

The operation of the conventional pipeline operator will be explained here. The operation when the instruction $INST_1$ has been dispatched will be explained first. At the first clock, the first processing data, the second processing data and the instruction $INST_1$ are held in the processing-data register 10, the processing-data register 20 and the instruction register 30 respectively. At the next clock, the first processing data, the second processing data and the instruction $INST_1$ are held in the stage latch circuit $11_1$, the stage latch circuit $21_1$ and the stage latch circuit $31_1$ respectively. Then, the instruction decoder $32_1$ decodes the instruction $INST_1$ from the stage latch circuit $31_1$. The operator $22_1$ executes the processing according to the instruction $INST_1$ by using the value (the first processing data) of the stage latch circuit $11_1$ and the value (the second processing data) of the stage latch circuit $21_1$.

At the next clock, the value (the first processing data) of the stage latch circuit $11_1$, the processing result of the operator $22_1$ and the value (the instruction $INST_1$) of the stage latch circuit $31_1$ are held in the stage latch circuit $11_2$, the stage latch circuit $21_2$ and the stage latch circuit $31_2$ respectively. In this case, as the value (instruction $INST_1$) of the stage latch circuit $31_2$ is irrelevant to the instruction according to the operator $12_2$, the instruction decoder $32_2$ makes the multiplexer $40_2$ select the stage latch circuit $21_2$.

At the next clock, the value (the processing result of the operator $22_1$) of the stage latch circuit $21_2$ is held in the stage latch circuit $11_3$ through the multiplexer $40_2$. As a result, the processing-result register 50 holds the processing result of the operator $22_1$ as the processing result of the pipeline operator.

The operation when the instruction $INST_2$ has been dispatched will be explained next. At the first clock, the first processing data, the second processing data and the instruction $INST_2$ are held in the processing-data register 10, the processing-data register 20 and the instruction register 30 respectively in the similar manner to that of the above operation. At the next clock, the first processing data, the second processing data and the instruction $INST_2$ are held in the stage latch circuit $11_1$, the stage latch circuit $21_1$ and the stage latch circuit $31_1$ respectively. In this case, as the value (instruction $INST_2$) of the stage latch circuit $31_1$ is irrelevant to the instruction according to the operator $22_1$, the instruction decoder $32_1$ does not decode the instruction. Therefore, the operator $22_1$ executes no processing in this case.

At the next clock, the value (the first processing data) of the stage latch circuit $11_1$ and the value (the instruction $INST_2$) of the stage latch circuit $31_1$ are held in the stage latch circuit $11_2$ and the stage latch circuit $31_2$ respectively. In this case, the instruction decoder $32_2$ decodes the instruction $INST_2$ from the stage latch circuit $31_2$, and at the same time, makes the multiplexer $40_2$ select the operator $12_2$. As a result, the operator $12_2$ executes the processing according to the instruction $INST_2$ by using the value (the first processing data) of the stage latch circuit $11_2$.

At the next clock, the processing result of the operator $12_2$ is held in the stage latch circuit $11_3$ through the multiplexer $40_2$. As a result, the processing-result register 50 holds the processing result of the operator $12_2$ as the processing result of the pipeline operator.

As explained above, as shown in FIG. 27, the conventional pipeline operator is provided with the stage latch circuit $11_2$ for holding the first processing data (source operand) from the processing-data register 10. Furthermore, the pipeline operator is provided with the stage latch circuit $21_2$ for holding the processing result of the operator $22_1$, independent of the stage latch circuit $11_2$. In this structure, the first processing data held in the processing-data register 10 is input to the operator $12_2$ through the stage latch circuit $11_1$ and the stage latch circuit $11_2$. On the other hand, the processing result of the operator $22_1$ is input to the multiplexer $40_2$ through the stage latch circuit $21_2$.

According to the conventional pipeline operator, because the stage latch circuit $11_2$ and the stage latch circuit $21_2$ are provided independent of each other between the first processing stage and the second processing stage, as explained above, the circuits (the stage latch circuits, the wiring and the control circuits) have redundant structures. Accordingly, the conventional pipeline operator poses a problem because it requires a large scale of hardware, and as a result has high power consumption.

SUMMARY OF THE INVENTION

It is an object of the present invention to provide a pipeline operator having less hardware and therefore small power consumption.

In order to achieve the above object, according to a first aspect of the invention, there is provided a pipeline operator having at least a first processing stage and a second processing stage, the pipeline operator comprises a plurality of latching units that are provided at an input stage, between processing stages and at an output stage of the first processing stage and the second processing stage respectively, for holding a processing data and a processing result respectively; a first processing unit provided at the first processing stage, for carrying out a processing according to an instruction by using the processing data held in the upstream latching unit and for outputting a processing result to a downstream latching unit; a second processing unit provided at the second processing stage, for carrying out a processing according to an instruction by using the processing data held in the upstream latching unit and for outputting a processing result to a downstream latching unit; and instruction decoding units for decoding the instructions dispatched to the first processing unit and the second processing unit respectively, wherein, in decoding the instruction dispatched to the second processing unit, each instruction decoding unit decodes the instruction as the instruction to pass the processing data held in the upstream latching unit through the first processing unit.

According to the first aspect, at the time of decoding the instruction to the second processing unit, the instruction decoding unit decodes the instruction to pass the processing data through the first processing unit. When this instruction has been decoded, the first processing unit outputs the processing data held in the upstream latching unit to the downstream latching unit through the first processing unit. Thus, the processing data is held in the downstream latching unit. Then, the second processing unit executes the processing according to the instruction by using the processing data held in the upstream latching unit.

As explained above, according to the first aspect, the processing data held in the upstream latching unit is passed through the first processing unit at the time of decoding the instruction to the second processing unit. Therefore, it is possible to reduce the sharing of the latching unit and to reduce the wiring between the first processing unit and the second processing unit. As a result, the hardware volume and power consumption can be reduced.

According to a second aspect of the invention, there is provided a pipeline operator having at least a first processing stage and a second processing stage, the pipeline operator comprises a plurality of latching units that are provided at an input stage, between processing stages and at an output stage of the first processing stage and the second processing stage respectively, for holding a processing data and a processing result respectively; a first processing unit provided at the first processing stage, for carrying out a processing according to an instruction by using the processing data held in the upstream latching unit and for outputting a processing result to a downstream latching unit; a second processing unit provided at the second processing stage, for carrying out a processing according to an instruction by using the processing data held in the upstream latching unit and for outputting a processing result to a downstream latching unit; and instruction decoding units for decoding the instructions dispatched to the first processing unit and the second processing unit respectively, wherein, in decoding the instruction dispatched to the first processing unit, each instruction decoding unit decodes the instruction as the instruction to pass the processing result of the first processing unit held in the upstream latching unit through the second processing unit.

According to the second aspect, at the time of decoding the instruction to the first processing unit, the instruction decoding unit decodes the instruction to pass the processing result of the first processing unit through the second processing unit. When this instruction has been decoded, the first processing unit executes the processing according to the instruction by using the processing data held in the upstream latching unit, and outputs the processing result to the downstream latching unit. Thus, the processing result of the first processing unit is held in the downstream latching unit. Then, the second processing unit passes through it the processing result of the first processing unit held in the upstream latching unit.

As explained above, according to the second aspect, the processing result of the first latching unit held in the upstream latching unit is passed through the second processing unit at the time of decoding the instruction to the first processing unit. Therefore, it is possible to reduce the latching unit and to reduce the wiring at the downstream of the second processing unit. As a result, the hardware volume and power consumption can be reduced.

According to a third aspect of the invention, there is provided a pipeline operator having a first processing stage to an n-th (n is a natural number such that n>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein, in decoding the instruction dispatched to an x-th (x is a natural number such that n>1) processing unit, each instruction decoding unit decodes the instruction as the instruction to pass the processing data held in the upstream latching unit through the first processing unit to the (x−1)-th processing unit.

According to the third aspect, at the time of decoding the instruction to the x-th processing unit, the instruction decoding unit decodes the instruction to pass the processing data through the first processing unit to the (x−1)-th processing unit. When this instruction has been decoded, the first processing unit to the (x−1)-th processing unit sequentially pass the processing data held in the upstream latching units through these operators to the downstream latching units. Thus, the processing data are sequentially held in the latching units of the first processing unit to the (x−1)-th processing unit respectively. Then, the x-th processing unit executes the processing according to the instruction by using the processing data held in the upstream latching units.

As explained above, according to the third aspect, the processing data held in the upstream latching units are passed through the first processing unit to the (x−1)-th processing unit at the time of decoding the instruction to the x-th processing unit. Therefore, it is possible to reduce both the stage latch circuits and the wiring at the first processing stage to the (x−1)-th processing stage in comparison to the conventional levels. As a result, the hardware volume and power consumption can be reduced.

According to a fourth aspect of the invention, there is provided a pipeline operator having a first processing stage to an n-th (n is a natural number such that n>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein, in decoding the instruction dispatched to an x-th (x is a natural number such that n>x) processing unit, each instruction decoding unit decodes the instruction as the instruction to pass the processing result of the x-th processing unit held in the upstream latching units through the (x+1)-th processing unit to the n-th processing unit.

According to the fourth aspect, at the time of decoding the instruction to the x-th processing unit, the instruction decoding units decode the instructions to pass the processing result of the x-th processing unit through the (x+1)-th processing unit to the n-th processing unit. When these instructions have been decoded, the x-th processing unit executes the processing according to the instruction by using the processing data held in the upstream latching unit, and outputs the processing result to the downstream latching unit. Thus, the processing result of the x-th processing unit is held in the downstream latching unit. Then, the (x+1)-th processing unit to the n-th processing unit sequentially pass the processing result of the x-th processing unit held in the upstream latching unit through these processing units.

As explained above, according to the fourth aspect, the processing result of the x-th latching unit held in the upstream latching unit is passed through the (x+1)-th processing unit to the n-th processing unit at the time of decoding instruction to the x-th processing unit. Therefore, it is possible to reduce both the stage latch circuits and the wiring needed in the (x+1)-th processing unit to the n-th processing stage in comparison to the conventional levels. As a result, the hardware volume and power consumption can be reduced.

According to a fifth aspect of the invention, there is provided a pipeline operator having at least a first processing stage and a second processing stage, the pipeline operator comprises a plurality of latching units that are provided at an input stage, between processing stages and at an output stage of the first processing stage and the second processing stage respectively, for holding a processing data and a processing result respectively; a first processing unit provided at the first processing stage, for carrying out a processing according to an instruction by using the processing data held in the upstream latching unit and for outputting a processing result to a downstream latching unit; a second processing unit provided at the second processing stage, for carrying out a processing according to an instruction by using the processing data held in the upstream latching unit and for outputting a processing result to a downstream latching unit; and instruction decoding units for decoding the instructions dispatched to the first processing unit and the second processing unit respectively, wherein the instruction decoding units decode the instructions that have a correlation between the processing of the first processing unit and the processing of the second processing unit that the processing result of the first processing unit becomes the processing data of the second processing unit, and further, in decoding the instruction to the second processing unit for executing the processing by itself, the instruction decoding unit decodes the instruction as the instruction to pass the processing data held in the upstream latching unit through the first processing unit.

According to the fifth aspect, when the instruction decoding unit has decoded the instruction that has a correlation between the first processing unit and the second processing unit, the first processing unit executes the processing according to this instruction. The result of the processing is held in the downstream latching unit. Next, the second processing unit executes the processing according to the above instruction by using the processing result held in the latching unit. The result of this processing is held in the downstream latching unit. Further, according to the fifth aspect, at the time of decoding the instruction to the second processing unit for executing the processing by itself, the instruction decoding unit decodes the instruction to pass the processing data through the first processing unit. When this instruction has been decoded, the first processing unit outputs the processing data held in the upstream latching unit to the downstream latching unit through the first processing unit. Thus, the processing data is held in the downstream latching unit. Then, the second processing unit executes the processing according to the instruction by using the processing data held in the upstream latching unit.

As explained above, according to the fifth aspect, the processing data held in the upstream latching unit is passed through the first processing unit at the time of decoding the instruction to the second processing unit. Therefore, it is possible to reduce the sharing of the latching unit and to reduce the wiring between the first processing unit and the second processing unit. As a result, the hardware volume and power consumption can be reduced. Further, according to the fifth aspect, the second processing unit can execute the processing independent of the first processing unit.

According to a sixth aspect of the invention, there is provided a pipeline operator having at least a first processing stage and a second processing stage, the pipeline operator comprises a plurality of latching units that are provided at an input stage, between processing stages and at an output stage of the first processing stage and the second processing stage respectively, for holding a processing data and a processing result respectively; a first processing unit provided at the first processing stage, for carrying out a processing according to an instruction by using the processing data held in the upstream latching unit and for outputting a processing result to a downstream latching unit; a second processing unit provided at the second processing stage, for carrying out a processing according to an instruction by using the processing data held in the upstream latching unit and for outputting a processing result to a downstream latching unit; and instruction decoding units for decoding the instructions dispatched to the first processing unit and the second processing unit respectively, wherein the instruction decoding units decode the instructions that have a correlation between the processing of the first processing unit and the processing of the second processing unit that the processing result of the first processing unit becomes the processing data of the second processing unit, and further, in decoding the instruction to the first processing unit for executing the processing by itself, the instruction decoding unit decodes the instruction as the instruction to pass the processing result of the first processing unit held in the upstream latching unit through the second processing unit.

According to the sixth aspect, when the instruction decoding unit has decoded the instruction that has a correlation between the first processing unit and the second processing unit, the first processing unit executes the processing according to this instruction. The result of the processing is held in the downstream latching unit. Next, the second processing unit executes the processing according to the above instruction by using the processing result held in the latching unit. The result of this processing is held in the downstream latching unit. Further, according to the sixth aspect, at the time of decoding the instruction to the first processing unit for executing the processing by itself, the instruction decoding unit decodes the instruction to pass the processing result of the first processing unit through the second processing unit. When this instruction has been decoded, the first processing unit executes the processing according to this instruction by using the processing data held in the upstream latching unit, and outputs the processing result to the downstream latching unit. Thus, the processing result of the first processing unit is held in the downstream latching unit. Then, the second processing unit passes through it the processing result of the first processing unit held in the upstream latching unit.

As explained above, according to the sixth aspect, the processing result of the first processing unit held in the upstream latching unit is passed through the second processing unit at the time of decoding the instruction to the first processing unit. Therefore, it is possible to reduce the latching unit and to reduce the wiring at the downstream of the second processing unit. As a result, the hardware volume and power consumption can be reduced. Further, according to the sixth aspect, the first processing unit can execute the processing independent of the second processing unit.

According to a seventh aspect of the invention, there is provided a pipeline operator having a first processing stage to an n-th (>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein the instruction decoding units decode the instructions that have a correlation between m stages of processing from an r-th processing unit (r is a natural number such that r>1) to an s-th processing unit (r<s<n) (m<n) out of the first processing unit to the n-th processing unit that the processing result of the pre-stage processing unit becomes the processing data of the next-stage processing unit, and further, in decoding the instruction to an x-th processing unit (r≦x≦s) among the r-th processing unit to the s-th processing unit for executing the processing by the x-th processing unit by itself, the instruction decoding units decode the instructions as the instructions to pass the processing results held in the upstream latching units through the first processing unit to the (x−1)-th processing unit.

According to the seventh aspect, when the instruction decoding units have decoded the instructions that have a correlation among the r-th processing unit to the s-th processing unit having m stages, the r-th processing unit to the s-th processing unit execute the processing according to the instructions respectively. The results of the processing are sequentially held in the downstream latching units. Further, according to the seventh aspect, at the time of decoding the instruction to the x-th processing unit, the instruction decoding units decode the instructions to pass the processing data through the first processing unit to the (x−1)-th processing unit. When these instructions have been decoded, the first processing unit to the (x−1)-th processing unit sequentially output the processing data held in the upstream latching units to the downstream latching units. Thus, the processing data are sequentially held in the respective latching units of the first processing unit to the (x−1)-th processing unit. Then, the x-th processing unit executes the processing according to the instruction by using the processing data held in the upstream latching unit.

As explained above, according to the seventh aspect, the processing data held in the upstream latching units are passed through the first processing unit to the (x−1)-th processing unit at the time of decoding the instruction to the x-th processing unit. Therefore, it is possible to reduce both the stage latch circuits and the wiring in the first processing unit to the (x−1)-th processing unit from the conventional levels. As a result, the hardware volume and power consumption can be reduced. Further, according to the seventh aspect, the x-th processing unit in the r-th processing unit to the s-th processing unit can execute the processing independent of other processing units.

According to an eighth aspect of the invention, there is provided a pipeline operator having a first processing stage to an n-th (>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein the instruction decoding units decode the instructions that have a correlation between m stages of processing from an r-th processing unit (>1) to an s-th processing unit (r<s<n) (m<n) out of the first processing unit to the n-th processing unit that the processing result of the pre-stage processing unit becomes the processing data of the next-stage processing unit, and further, in decoding the instructions to an x-th processing unit (r≦x≦s) to an (x+p)-th processing unit (p≦s−r) among the r-th processing unit to the s-th processing unit for completing the execution of one processing by the processing units of p stages, the instruction decoding units decode the instructions as the instructions to pass the processing data held in the upstream latching units through the first processing unit to the (x−1)-th processing unit.

According to the eighth aspect, when the instruction decoding units have decoded the instructions that have a correlation among the r-th processing unit to the s-th processing unit having m stages, the r-th processing unit to the s-th processing unit execute the processing according to the instructions respectively. The results of the processing are sequentially held in the downstream latching units. Further, according to the eighth aspect, at the time of decoding the instructions to the x-th processing unit to the (x+p)-th processing unit, the instruction decoding units decode the instructions to pass the processing data through the first processing unit to the (x−1)-th processing unit. When these instructions have been decoded, the first processing unit to the (x−1)-th processing unit sequentially output the processing data held in the upstream latching units to the downstream latching units. Thus, the processing data are sequentially held in the respective latching units of the first processing unit to the (x−1)-th processing unit. Then, the x-th processing unit to the (x+p)-th processing unit execute the processing according to the instruction by using the processing data held in the upstream latching unit.

As explained above, according to the eighth aspect, the processing data held in the upstream latching units are passed through the first processing unit to the (x−1)-th processing unit at the time of decoding the instruction to the x-th processing unit to the (x+p)-th processing unit. Therefore, it is possible to reduce both the stage latch circuits and the wiring in the first processing unit to the (x−1)-th processing unit from the conventional levels. As a result, the hardware volume and power consumption can be reduced. Further, according to the eighth aspect, the x-th processing unit to the (x+p)-th processing unit in the r-th processing unit to the s-th processing unit can execute the processing independent of other processing units.

According to a ninth aspect of the invention, there is provided a pipeline operator having a first processing stage to an n-th (>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein the instruction decoding units decode the instructions that have a correlation between m stages of processing from an r-th processing unit (>1) to an s-th processing unit (r<s<n) (m<n) out of the first processing unit to the n-th processing unit that the processing result of the pre-stage processing unit becomes the processing data of the next-stage processing unit, and further, in decoding the instruction to an x-th processing unit (r≦x≦s) among the r-th processing unit to the s-th processing unit for the x-th processing unit to execute the processing by itself, the instruction decoding units decode the instructions as the instructions to pass the processing result of the x-th processing unit held in the upstream latching units through the (x+1)-th processing unit to the n-th processing unit.

According to the ninth aspect, when the instruction decoding units have decoded the instructions that have a correlation among the r-th processing unit to the s-th processing unit having m stages, the r-th processing unit to the s-th processing unit execute the processing according to the instructions respectively. The results of the processing are sequentially held in the downstream latching units. Further, according to the ninth aspect, at the time of decoding the instruction to the x-th processing unit, the instruction decoding units decode the instructions to pass the processing result of the x-th processing unit through the (x+1)-th processing unit to the n-th processing unit. When these instructions have been decoded, the x-th processing unit executes the processing according to the instruction by using the processing data held in the upstream latching unit, and outputs the processing result to the downstream latching unit. Thus, the processing result of the x-th processing unit is held in the downstream latching unit. Then, the (x+1)-th processing unit to the n-th processing unit sequentially pass the processing result of the x-th processing unit held in the upstream latching unit through these processing units.

As explained above, according to the ninth aspect, the processing result of the x-th processing unit held in the upstream latching unit is passed through the (x+1)-th processing unit to the n-th processing unit at the time of decoding the instruction to the x-th processing unit. Therefore, it is possible to reduce both the stage latch circuits and the wiring in the (x+1)-th processing unit to the n-th processing unit from the conventional levels. As a result, the hardware volume and power consumption can be reduced. Further, according to the ninth aspect, the x-th processing unit in the r-th processing unit to the s-th processing unit can execute the processing independent of other processing units.

According to a tenth aspect of the invention, there is provided a pipeline operator having a first processing stage to an n-th (>1) processing stage, the pipeline operator comprises a plurality of latching units that are provided at an input stage, between processing stages and at an output stage of the first processing stage to the n-th processing stage respectively, for holding a processing data and a processing result respectively; a first processing unit to an n-th processing unit provided at the first processing stage to the n-th processing stage respectively, each for carrying out a processing according to an instruction by using the processing data held in the upstream latching unit and for outputting a processing result to a downstream latching unit respectively; and instruction decoding units for decoding the instructions dispatched to the first to the n-th processing units respectively, wherein the instruction decoding units decode the instructions that have a correlation between m stages of processing from an r-th processing unit (>1) to an s-th processing unit (r<s<n) (m<n) out of the first processing unit to the n-th processing unit that the processing result of the pre-stage processing unit becomes the processing data of the next-stage processing unit, and further, in decoding the instructions to an (x−p)-th processing unit to an x-th processing unit (r≦x≦s; p≦s−r) among the r-th processing unit to the s-th processing unit for completing the execution of one processing by the processing units of p stages, the instruction decoding units decode the instructions as the instructions to pass the processing results of the (x−p)-th processing unit to the x-th processing unit held in the upstream latching units through the (x+1)-th processing unit to the n-th processing unit.

According to the tenth aspect, when the instruction decoding units have decoded the instructions that have a correlation among the r-th processing unit to the s-th processing unit having m stages, the r-th processing unit to the s-th processing unit execute the processing according to the instructions respectively. The results of the processing are sequentially held in the downstream latching units. Further, according to the tenth aspect, at the time of decoding the instruction to the (x−p)-th processing unit to the x-th processing unit, the instruction decoding units decode the instructions to pass the processing results of the (x−p)-th processing unit to the x-th processing unit through the (x+1)-th processing unit to the n-th processing unit. When these instructions have been decoded, the (x−p)-th processing unit to the x-th processing unit execute the processing according to the instructions by using the processing data held in the upstream latching units, and output the processing results to the downstream latching units. Thus, the processing results of the (x−p)-th processing unit to the x-th processing unit are held in the downstream latching units.

Then, the (x+1)-th processing unit to the n-th processing unit sequentially pass the processing results of the (x−p)-th processing unit to the x-th processing unit held in the upstream latching units through these processing units.

As explained above, according to the tenth aspect, the processing results of the (x−p)-th processing unit to the x-th processing unit held in the upstream latching units are passed through the (x+1)-th processing unit to the n-th processing unit at the time of decoding the instructions to the (x−p)-th processing unit to the x-th processing unit. Therefore, it is possible to reduce both the stage latch circuits and the wiring in the (x+1)-th processing unit to the n-th processing unit from the conventional levels. As a result, the hardware volume and power consumption can be reduced. Further, according to the tenth aspect, the (x−p)-th processing unit to the x-th processing unit in the r-th processing unit to the s-th processing unit can execute the processing independent of other processing units.

Other objects and features of this invention will become apparent from the following description with reference to the accompanying drawings.

DESCRIPTION OF THE PREFERRED EMBODIMENTS

First to eighth embodiments of a pipeline operator relating to the present invention will be explained below with reference to the attached drawings.

Figure 1:
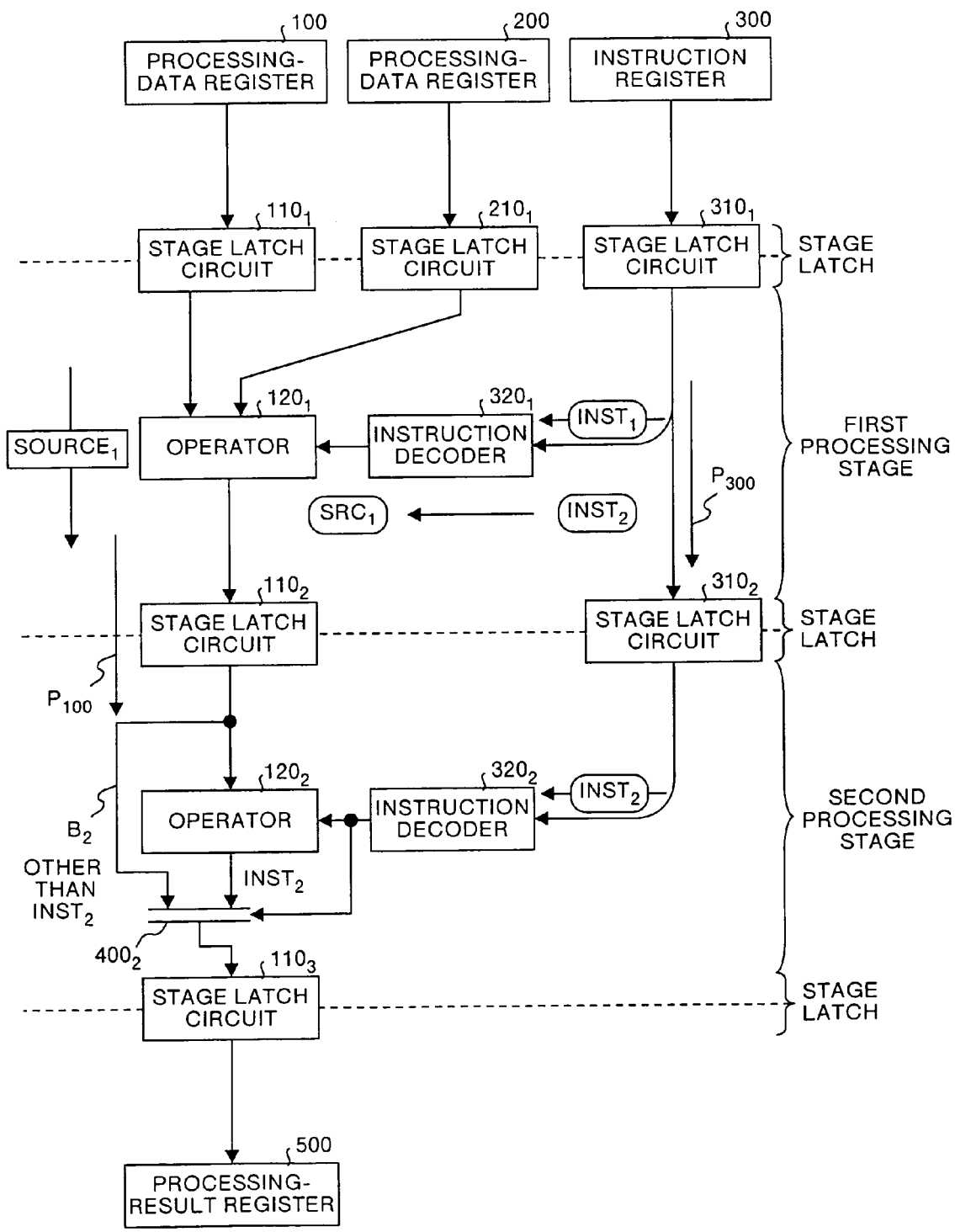
FIG. 1 is a block diagram that shows a structure of a first embodiment of the present invention.

FIG. 1 is a block diagram that shows a structure of a first embodiment of the present invention. The pipeline operator shown in this drawing has two processing stages of a first processing stage and a second processing stage. An operator $120_1$ is provided at the first processing stage and an operator $120_2$ is provided at the second processing stage. A processing-data register 100 holds a first processing data (source operand) $SOURCE_1$. A processing-data register 200 holds a second processing data (source operand). An instruction register 300 is provided corresponding to an instruction pipeline path $P_{300}$. The instruction register 300 holds an instruction $INST_1$ and an instruction $INST_2$. The instruction $INST_1$ is a processing instruction dispatched to the operator $120_1$, and the instruction $INST_2$ is a processing instruction dispatched to the operator $120_2$.

Further, according to the pipeline operator of the first embodiment, stage latch circuits for temporarily holding data and instructions are provided at an input stage of the two processing stages, between the first processing stage and the second processing stage (inter-processing stage), and at an output stage of the two processing stages, respectively. Specifically, a stage latch circuit $110_1$, a stage latch circuit $210_1$ and a stage latch circuit $310_1$ are provided in parallel at the input stage. A stage latch circuit $110_2$ and a stage latch circuit $310_2$ are provided in parallel between the processing stages. A stage latch circuit $110_3$ is provided at the output stage. The stage latch circuit $110_1$ and the stage latch circuit $110_2$ are sequentially driven in one clock cycle in such a order of the input stage→the processing stage→the output stage.

Figure 27:
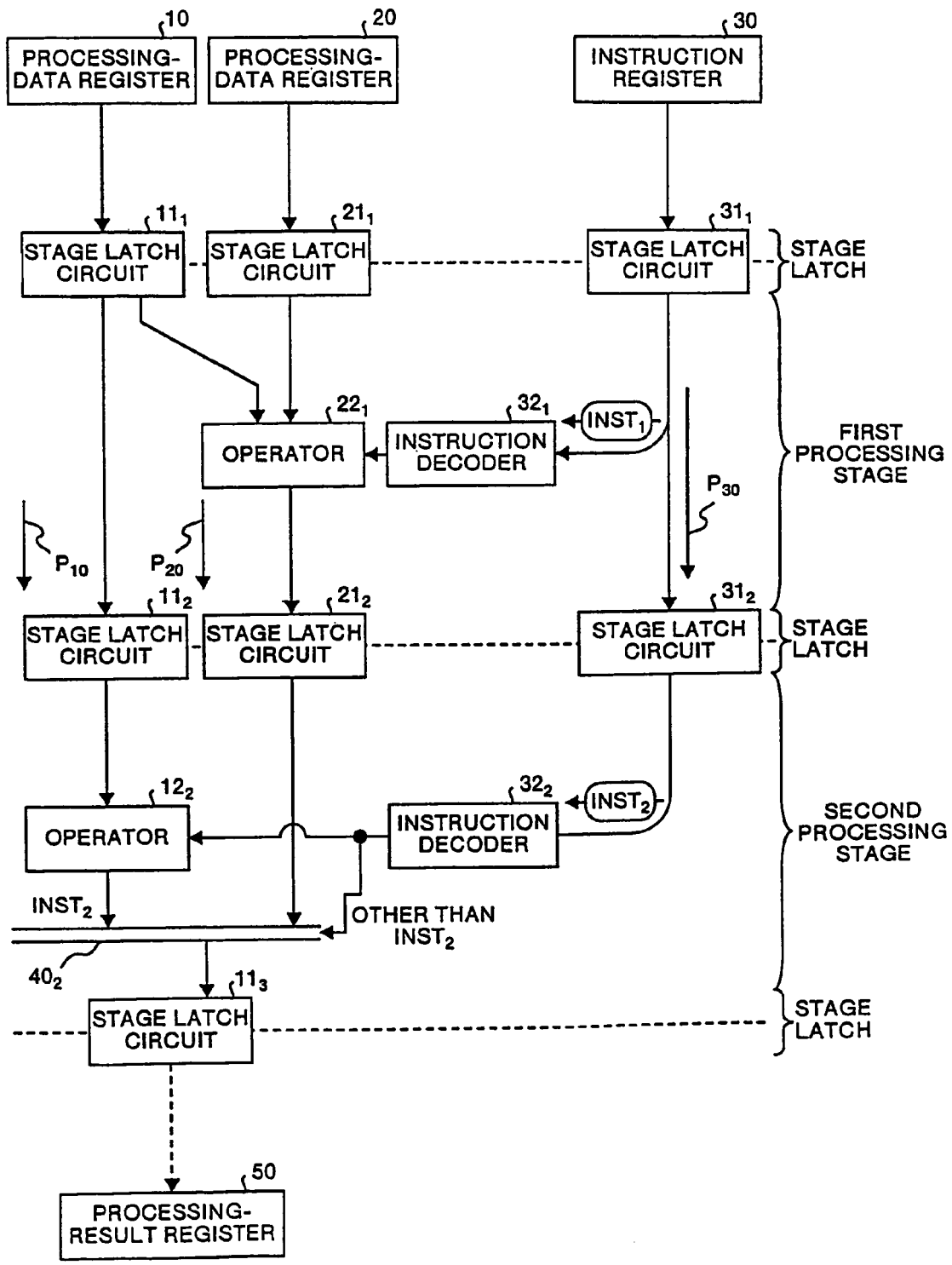
FIG. 27 is a diagram that shows a structure of a conventional pipeline operator.

When the number of the stage latch circuits between the processing stages (between the first processing stage and the second processing stage) in the structure of FIG. 1 is compared with the conventional pipeline operator shown in FIG. 27 for, it will be noticed that there are three stage latch circuits (the stage latch circuit $11_2$, the stage latch circuit $21_2$ and the stage latch circuit $31_2$) in FIG. 27, while there are two stage latch circuits (the stage latch circuit $110_2$ and the stage latch circuit $310_2$) in FIG. 1.

At the first processing stage, the stage latch circuit $110_1$ is provided corresponding to the processing-data register 100 (pipeline path $P_{100}$) and holds the first processing data $SOURCE_1$ from the processing-data register 100. The stage latch circuit $210_1$ is provided corresponding to the processing-data register 200, and holds the second processing data from the processing-data register 200. The stage latch circuit $310_1$ is provided corresponding to the instruction register 300, and holds the instruction $INST_1$ and the instruction $INST_2$ from the instruction register 300. The instruction decoder $320_1$ decodes the instruction $INST_1$ from the stage latch circuit $310_1$. When the instruction $INST_1$ has been decoded, the operator $120_1$ executes the processing according to the instruction $INST_1$ by using the value (the first processing data $SOURCE_1$) of the stage latch circuit $110_1$ and the value (the second processing data) of the stage latch circuit $210_1$. The operator $120_1$ then outputs the result of the processing to the stage latch circuit $110_2$.

When the instruction other than the instruction $INST_1$ (the instruction $INST_2$ in this case) has been input, the instruction decoder $320_1$ decodes this instruction as a through instruction $SRC_1$, and controls the operator $120_1$. When the through instruction $SRC_1$ has been input, the operator $120_1$ passes only the first processing data $SOURCE_1$ through out of the two processing data (the first processing data $SOURCE_1$ and the second processing data).

At the second processing stage, the stage latch circuit $110_2$ is provided corresponding to the processing-data register 100, and holds the processing result of the operator $120_1$ or the output value (the first processing data $SOURCE_1$) of the operator $120_1$. The stage latch circuit $310_2$ is provided corresponding to the instruction register 300, and holds the values (the instruction $INST_1$ and the instruction $INST_2$) of the stage latch circuit $310_1$. The instruction decoder $320_2$ decodes the instruction $INST_2$ from the stage latch circuit $310_2$. When the instruction $INST_2$ has been decoded, the operator $120_2$ executes the processing according to the instruction $INST_2$ by using the value of the stage latch circuit $110_2$, and outputs the result of the processing. A bypass line $B_2$ is provided in parallel with the operator $120_2$, and guides the value of the stage latch circuit $110_2$ to pass through this bypass line to a multiplexer $400_2$ without passing through the operator $120_2$.

The multiplexer $400_2$ is a two-input and one-output type changeover unit that is changeover controlled by the instruction decoder $320_2$. The multiplexer $400_2$ outputs one of the processing result of the operator $120_2$ and the value of the stage latch circuit $110_2$. Specifically, the multiplexer $400_2$ outputs the processing result of the operator $120_2$ when the instruction $INST_2$ has been decoded by the instruction decoder $320_2$. On the other hand, the multiplexer $400_2$ outputs the value of the stage latch circuit $110_2$ when the instruction other than the instruction $INST_2$ (the instruction $INST_1$ in this case) has been input to the instruction decoder $320_2$. The stage latch circuit $110_3$ holds the processing result of the operator $120_2$ or the value of the stage latch circuit $110_2$ according to the changeover state of the multiplexer $400_2$. A processing-result register 500 holds a value of the stage latch circuit $110_3$, that is, a processing result (a destination operand) of the pipeline operator.

In this first embodiment, the operator $120_1$ of the first processing stage and the operator $120_2$ of the second processing stage execute the processing respectively according to the instructions (the instruction $INST_1$ and the instruction $INST_2$) that have no mutual relationship. In other words, when there is no correlation, the processing of the operator $120_1$ and the processing of the operator $120_2$ are carried out independent of each other. Further, in this first embodiment, when the through instruction $SRC_1$ has been decoded at the first processing stage, the first processing data $SOURCE_1$ is passed through.

Figure 2:
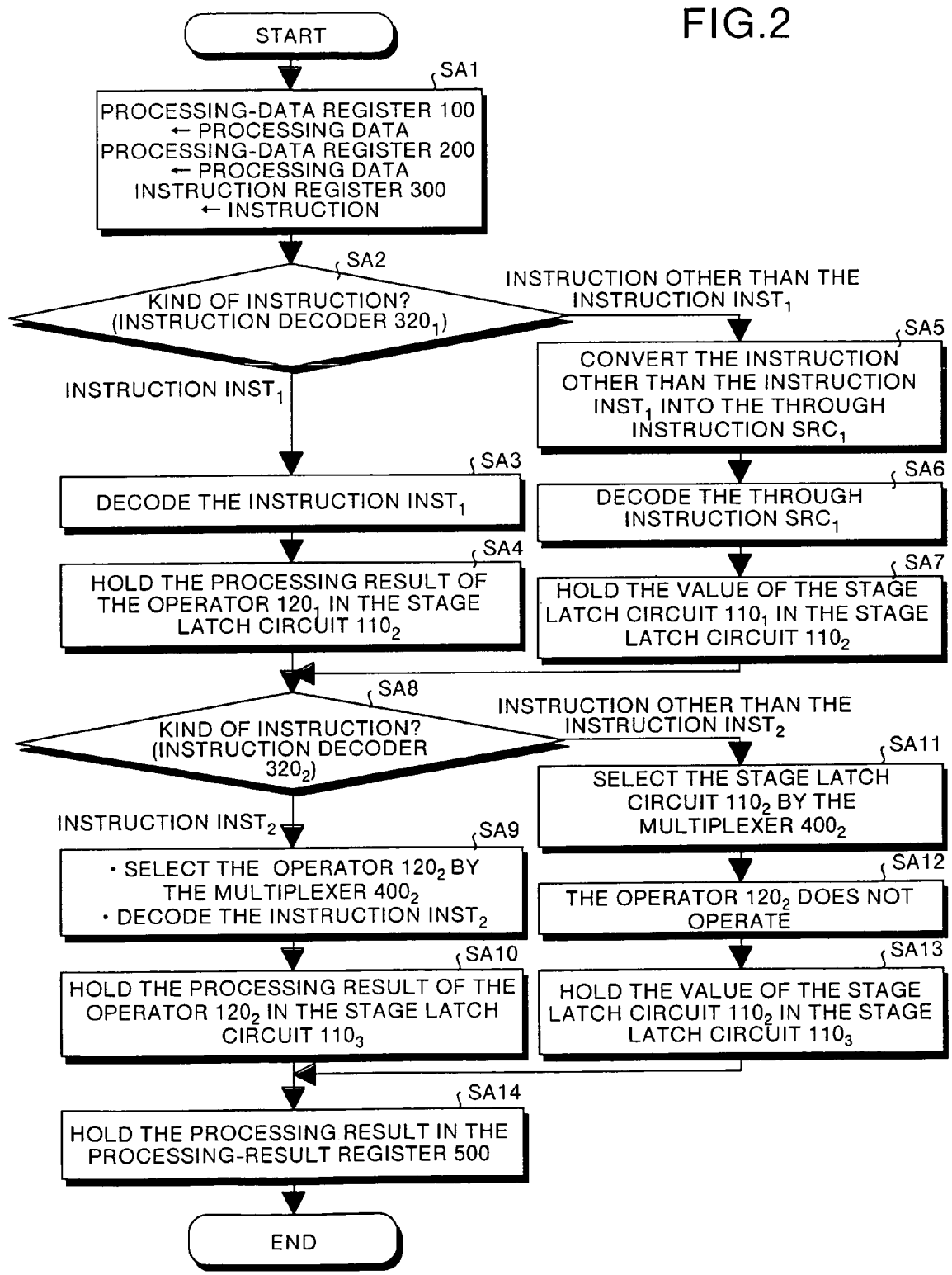
FIG. 2 is a flowchart that explains the operation of the first embodiment.

The operation of the first embodiment will be explained with reference to a flowchart shown in FIG. 2. The operation when the instruction $INST_1$ has been dispatched will be explained first. At step SA1 shown in FIG. 2, the first processing data $SOURCE_1$, the second processing data and the instruction $INST_1$ are held in the processing-data register 100, the processing-data register 200 and the instruction register 300 respectively. Thus, the first processing data $SOURCE_1$, the second processing data and the instruction $INST_1$ are held in the stage latch circuit $110_1$, the stage latch circuit $210_1$ and the stage latch circuit $310_1$ respectively.

At the next step SA2, the instruction decoder $320_1$ decides the kind of the instruction held in the stage latch circuit $310_1$. In this case, the instruction $INST_1$ is being held in the stage latch circuit $310_1$. Therefore, the instruction decoder $320_1$ proceeds to step SA3. At the step SA3, the instruction decoder $320_1$ decodes the instruction $INST_1$ from the stage latch circuit $310_1$. The operator $120_i$ thus executes the processing according to the instruction $INST_1$ by using the value (the first processing data $SOURCE_1$) of the stage latch circuit $110_1$ and the value (the second processing data) of the stage latch circuit $210_1$.

At the next step SA4, the processing result of the operator $120_1$ is held in the stage latch circuit $110_2$. At this time, the value (the instruction $INST_1$) of the stage latch circuit $310_1$ is held in the stage latch circuit $310_2$. At the next step SA8, the instruction decoder $320_2$ decides the kind of the instruction held in the stage latch circuit $310_2$. In this case, the instruction $INST_1$ is being held in the stage latch circuit $310_2$. Therefore, the instruction decoder $320_2$ proceeds to step SA11.

At the step SA11, the instruction decoder $320_2$ makes the multiplexer $400_2$ select the stage latch circuit $110_2$. Thus, at step SA12, the operator $120_2$ does not operate. At step SA13, the value (the processing result of the operator $120_1$) of the stage latch circuit $110_2$ is held in the stage latch circuit $110_3$ through the bypass line $B_2$ and the multiplexer $400_2$. At the next step SA14, the processing-result register 500 holds the processing result of the operator $120_1$ as the processing result of the pipeline operator.

The operation when the instruction $INST_2$ has been dispatched will be explained next. At the step SA1 shown in FIG. 2, the first processing data $SOURCE_1$, the second processing data and the instruction $INST_2$ are held in the processing-data register 100, the processing-data register 200 and the instruction register 300 respectively. Thus, the first processing data $SOURCE_1$, the second processing data and the instruction $INST_2$ are held in the stage latch circuit $110_1$, the stage latch circuit $210_1$ and the stage latch circuit $310_1$ respectively.

At the next step SA2, the instruction decoder $320_1$ decides the kind of the instruction held in the stage latch circuit $310_1$. In this case, the $INST_2$ is being held in the stage latch circuit $310_1$. Therefore, the instruction decoder $320_1$ proceeds to step SA5. At the step SA5, the instruction decoder $320_1$ converts the instruction $INST_2$ from the stage latch circuit $310_1$ into the through instruction $SRC_1$, and then proceeds to step SA6. At the step SA6, the instruction decoder $320_1$ decodes the through instruction $SRC_1$. Thus, the operator $120_1$ passes the value (the first processing data $SOURCE_1$) of the stage latch circuit $110_1$ through the operator $120_1$.

At the next step SA7, the value (the first processing data $SOURCE_1$) of the stage latch circuit $110_1$ is held in the stage latch circuit $110_2$. At this time, the value (the instruction $INST_2$) of the stage latch circuit $310_1$ is held in the stage latch circuit $310_2$. At the next step SA8, the instruction decoder $320_2$ decides the kind of the instruction held in the stage latch circuit $310_2$. In this case, the $INST_2$ is being held in the stage latch circuit $310_2$. Therefore, the instruction decoder $320_2$ proceeds to step SA9.

At the step SA9, the instruction decoder $320_2$ makes the multiplexer $400_2$ select the stage latch circuit $120_2$. The instruction decoder $320_2$ decodes the instruction $INST_2$ from the stage latch circuit $310_2$. The operator $120_2$ then executes the processing according to the instruction $INST_2$ by using the value (the first processing data $SOURCE_1$) of the stage latch circuit $110_2$. At the next step SA10, the processing result of the stage latch circuit $120_2$ is held in the stage latch circuit $110_3$. At the next step SA14, the processing-result register 500 holds the processing result of the operator $120_2$ as the processing result of the pipeline operator.

As explained above, according to the first embodiment, the instruction decoder $320_1$ converts the instruction other than the instruction $INST_1$ into the through instruction $SRC_1$. The operator $120_1$ passes the first processing data $SOURCE_1$ through this operator. There is provided the bypass line $B_2$ at the second processing stage. Therefore, it is possible to share the stage latch circuit $110_2$ between the operator $120_1$ and the operator $120_2$, and it is also possible to reduce the wiring volume. As a result, according to the first embodiment, the sharing of the stage latch circuit $110_2$ makes it possible to reduce both hardware volume and power consumption.

Figure 3:
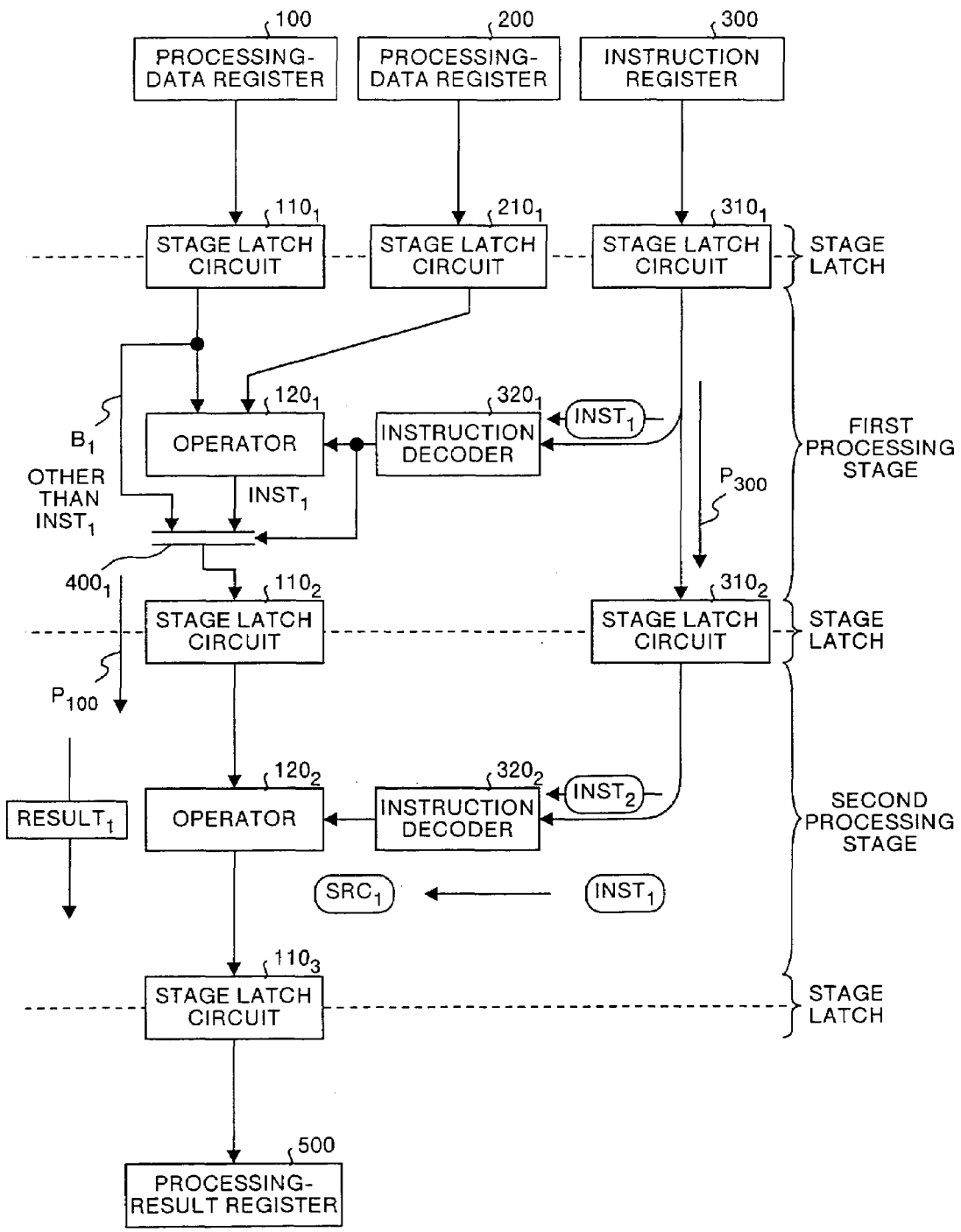
FIG. 3 is a block diagram that shows a structure of a second embodiment of the present invention.

FIG. 3 is a block diagram that shows a structure of a second embodiment of the present invention. In this figure, parts corresponding to those in FIG. 1 are attached with identical reference symbols. However, the functions of the instruction decoder $320_1$ and the instruction decoder $320_2$ shown in FIG. 3 are different from the functions of the instruction decoder $320_1$ and the instruction decoder $320_2$ shown in FIG. 1 as described later. As shown in FIG. 3, a multiplexer $400_1$ and a bypass line $B_1$ are additionally provided at the first processing stage respectively. On the other hand, the multiplexer $400_2$ and the bypass line $B_2$ shown in FIG. 1 are not provided at the second processing stage in FIG. 3.

In FIG. 3, the instruction decoder $320_1$ at the first processing stage decodes an instruction $INST_1$ from a stage latch circuit $310_1$. When the instruction $INST_1$ has been decoded, an operator $120_1$ executes the processing according to the instruction $INST_1$ by using the value of the stage latch circuit $110_1$ and the value of the stage latch circuit $210_1$, and outputs a processing result $RESULT_1$. The bypass line $B_1$ is provided in parallel with the operator $120_1$, and guides the value of the stage latch circuit $110_1$ to pass through this bypass line to a multiplexer $400_1$ without passing through the operator $120_1$.

The multiplexer $400_1$ is a two-input and one-output type changeover unit that is changeover controlled by the instruction decoder $320_1$. The multiplexer $400_1$ outputs one of the processing result $RESULT_1$ of the operator $120_1$ and the value of the stage latch circuit $110_1$. Specifically, the multiplexer $400_1$ outputs the processing result $RESULT_1$ of the operator $120_1$ when the instruction $INST_1$ has been decoded by the instruction decoder $320_1$. On the other hand, the multiplexer $400_1$ outputs the value of the stage latch circuit $110_1$ when the instruction other than the instruction $INST_1$ (for example, the instruction $INST_2$) has been input to the instruction decoder $320_1$.

The instruction decoder $320_2$ decodes the instruction $INST_2$ from the stage latch circuit $310_2$, and controls the operator $120_2$. When the instruction $INST_2$ has been decoded, the operator $120_2$ executes the processing according to the instruction $INST_2$ by using the value (the first processing data) of the stage latch circuit $110_1$, and outputs the processing result to the stage latch circuit $110_3$.

When the instruction other than the instruction $INST_2$ (the instruction $INST_1$ in this case) has been input, the instruction decoder $320_2$ converts this instruction into the through instruction $SRC_1$, and decodes this through instruction $SRC_1$. When the through instruction $SRC_1$ has been input, the operator $120_2$ passes the value (the processing result of $RESULT_1$) of the stage latch circuit $110_2$ through this operator. The stage latch circuit $110_3$ holds the value (the processing result $RESULT_1$) of the stage latch circuit $110_2$ or the processing result of the operator $120_2$ according to the changeover state of the multiplexer $400_1$. A processing-result register $500$ holds a value of the stage latch circuit $110_3$, that is, a processing result (a destination operand) of the pipeline operator.

In the second embodiment, the operator $120_1$ of the first processing stage and the operator $120_2$ of the second processing stage execute the processing respectively according to the instructions (the instruction $INST_1$ and the instruction $INST_2$) that have no mutual relationship, in a similar manner to that of the first embodiment. In other words, when there is no correlation, the processing of the operator $120_1$ and the processing of the operator $120_2$ are carried out independent of each other. Further, in the second embodiment, when the through instruction $SRC_1$ has been decoded at the second processing stage, the processing result $RESULT_1$ of the operator $120_1$ at the first processing stage is passed through.

Figure 4:
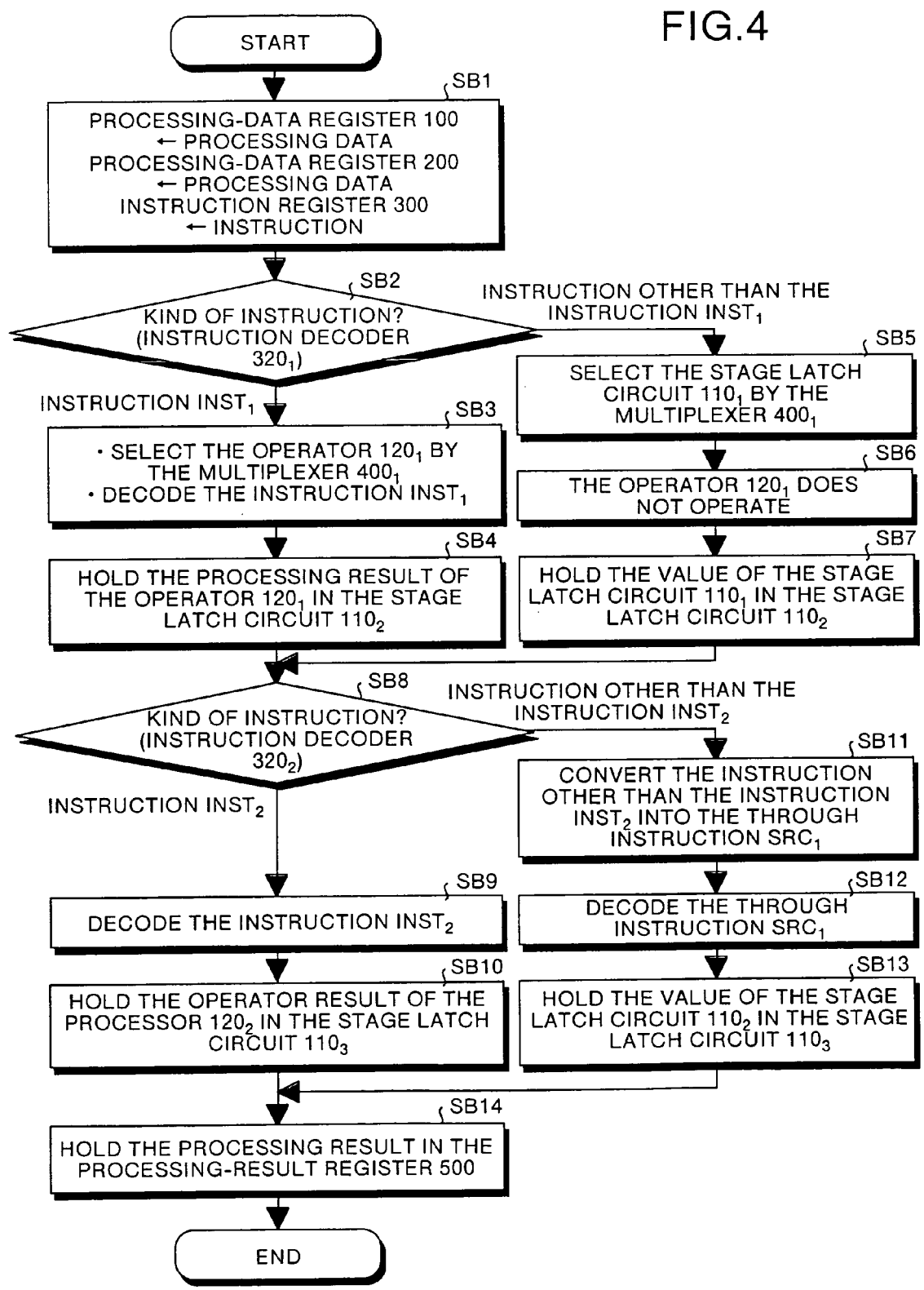
FIG. 4 is a flowchart that explains the operation of the second embodiment.

The operation of the second embodiment will be explained with reference to a flowchart shown in FIG. 4. The operation when the instruction $INST_1$ has been dispatched will be explained first. At step SB1 shown in FIG. 4, the first processing data, the second processing data and the instruction $INST_1$ are held in the processing-data register 100, the processing-data register 200 and the instruction register 300 respectively. Thus, the first processing data, the second processing data and the instruction $INST_1$ are held in the stage latch circuit $110_1$, the stage latch circuit $210_1$ and the stage latch circuit $310_1$ respectively.

At the next step SB2, the instruction decoder $320_1$ decides the kind of the instruction held in the stage latch circuit $310_1$. In this case, the instruction $INST_1$ is being held in the stage latch circuit $310_1$. Therefore, the instruction decoder $320_1$ proceeds to step SB3. At the step SB3, the instruction decoder $320_1$ makes the multiplexer $400_1$ select the operator $120_1$. The instruction decoder $320_1$ decodes the instruction $INST_1$ from the stage latch circuit $310_1$ and controls the operator $120_1$. The operator $120_1$ thus executes the processing according to the instruction $INST_1$ by using the value (the first processing data) of the stage latch circuit $110_1$ and the value (the second processing data) of the stage latch circuit $210_1$. At the next step SB4, the processing result $RESULT_1$ of the operator $120_1$ is held in the stage latch circuit $110_2$ through the multiplexer $400_1$. In parallel with this, the value (the instruction $INST_1$) of the stage latch circuit $310_1$ is held in the stage latch circuit $310_2$.

At the next step SB8, the instruction decoder $320_2$ decides the kind of the instruction held in the stage latch circuit $310_2$. In this case, the instruction other than the instruction $INST_2$, that is, the instruction $INST_1$, is being held in the stage latch circuit $310_2$. Therefore, the instruction decoder $320_2$ proceeds to step SB11. At the step SB11, the instruction decoder $320_2$ decodes the value (the instruction $INST_1$) of the stage latch circuit $310_2$, and converts the instruction $INST_1$ into the through instruction $SRC_1$. The instruction decoder $320_2$ then proceeds to step SB12.

At the step SB12, the instruction decoder $320_2$ decodes the through instruction $SRC_1$. The operator $120_2$ then passes the value (the processing result $RESULT_1$) of the stage latch circuit $110_2$ through this operator. At the next step SB13, the value (the processing result $RESULT_1$) of the stage latch circuit $110_2$ is held in the stage latch circuit $110_3$. At the next step SB14, the processing-result register 500 holds the processing result of the operator $120_1$ as the processing result $RESULT_1$ of the pipeline operator.

The operation when the instruction $INST_2$ has been dispatched will be explained next. At the step SB1 shown in FIG. 4, the first processing data, the second processing data and the instruction $INST_2$ are held in the processing-data register 100, the processing-data register 200 and the instruction register 300 respectively. Thus, the first processing data, the second processing data and the instruction $INST_2$ are held in the stage latch circuit $110_1$, the stage latch circuit $210_1$ and the stage latch circuit $310_1$ respectively.

At the next step SB2, the instruction decoder $320_1$ decides the kind of the instruction held in the stage latch circuit $310_1$. In this case, the $INST_2$ is being held in the stage latch circuit $310_1$. Therefore, the instruction decoder $320_1$ proceeds to step SB5. At the step SB5, the instruction decoder $320_1$ makes the multiplexer $400_1$ select the stage latch circuit $110_1$. At step SB6, the operator $120_1$ does not operate. At step SB7, the value (the first processing data) of the stage latch circuit $110_1$ is held in the stage latch circuit $110_2$ through the bypass line $B_1$ and the multiplexer $400_1$.

At the next step SB8, the instruction decoder $320_2$ decides the kind of the instruction held in the stage latch circuit $310_2$. In this case, the $INST_2$ is being held in the stage latch circuit $310_2$. Therefore, the instruction decoder $320_2$ proceeds to step SB9. At the step SB9, the instruction decoder $320_2$ decodes the instruction $INST_2$ from the stage latch circuit $310_2$. The operator $120_2$ then executes the processing according to the instruction $INST_2$ by using the value (the first processing data) of the stage latch circuit $110_2$. At the next step SB10, the processing result of the operator $120_2$ is held in the stage latch circuit $110_3$. At the next step SB14, the processing-result register 500 holds the processing result of the operator $120_2$ as the processing result of the pipeline operator.

As explained above, according to the second embodiment, the multiplexer $400_1$ is provided at the first processing stage, and the value of the stage latch circuit $110_1$ or the processing result of the operator $120_1$ is held in the stage latch circuit $110_2$. Furthermore, the instruction decoder $320_2$ converts the instruction other than the instruction $INST_2$ into the through instruction $SRC_1$, and the operator $120_2$ passes the processing result $RESULT_1$ through this operator. Therefore, it is possible to reduce both the stage latch circuits and the wiring volume at the downstream of the operator $120_2$. As a result, according to the second embodiment, it is possible to reduce both hardware volume and power consumption.

Figure 5:
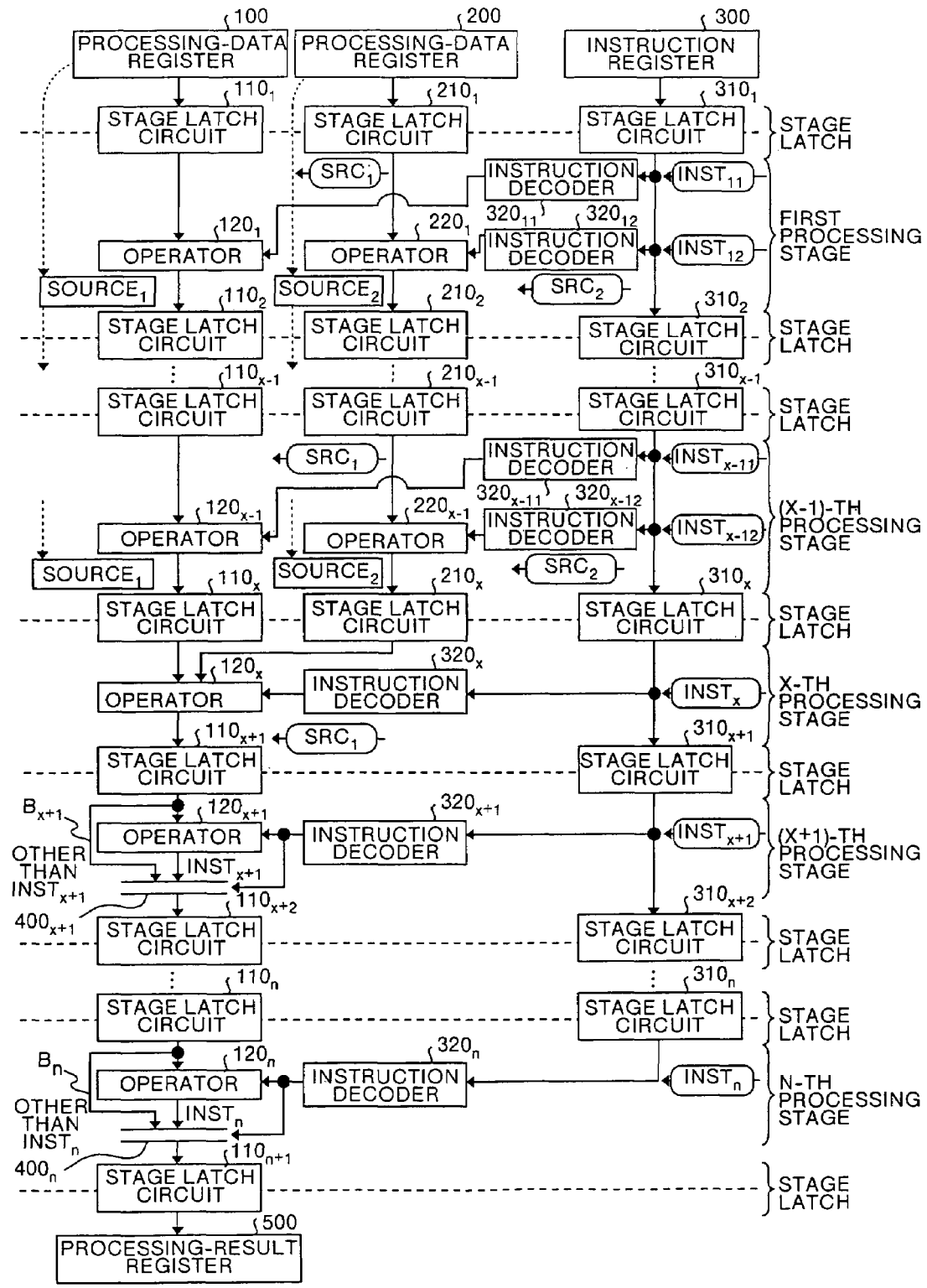
FIG. 5 is a block diagram that shows a structure of a third embodiment of the present invention.

FIG. 5 is a block diagram that shows a structure of a third embodiment of the present invention. In this drawing, parts corresponding to those in FIG. 1 are attached with identical reference symbols. The pipeline operator shown in FIG. 5 has n processing stages including a first processing stage to an n-th processing stage. However, FIG. 5 shows only the first processing stage, the (x−1)-th processing stage (1<x<n), the x-th processing stage, the (x+1)-th processing stage, and the n-th processing stage. All other processing stages are not shown for simplicity of explanation.

According to the pipeline operator of the third embodiment, there are provided a plurality of stage latch circuits for temporarily holding data and instructions at an input stage of the n-stage processing stages, between the processing stages, and at an output stage of the n-stage processing stages, respectively. Specifically, a stage latch circuit $110_1$, a stage latch circuit $210_1$ and a stage latch circuit $310_1$ are provided in parallel at the input stage. A stage latch circuit $110_{n+1}$ is provided at the output stage. The stage latch circuits between the processing stages will be explained later.

As shown in FIG. 5, a processing-data register 100 holds a first processing data (source operand) $SOURCE_1$. A processing-data register 200 holds a second processing data (source operand) $SOURCE_2$. An instruction register 300 holds instructions $INST_{11}$, $INST_{12}$, ..., $INST_{x-11}$, ..., $INST_n$ that are used at the respective processing stages.

At the first processing stage, the stage latch circuit $110_1$ holds the first processing data $SOURCE_1$ from the processing-data register 100, and the stage latch circuit $210_1$ holds the second processing data $SOURCE_2$ from the processing-data register 200. The stage latch circuit $310_1$ is provided corresponding to the instruction register 300, and holds the instruction $INST_{11}$ and the instruction $INST_{12}$ from the instruction register 300. The instruction decoder $320_{11}$ decodes the instruction $INST_{11}$ from the stage latch circuit $310_1$.

When the instruction $INST_{11}$ has been decoded, the operator $120_1$ executes the processing according to the instruction $INST_{11}$, by using the value (the first processing data $SOURCE_1$) of the stage latch circuit $110_1$ and outputs the result of the processing to the stage latch circuit $110_2$. When the instruction other than the instruction $INST_{11}$ has been input, the instruction decoder $320_{11}$ converts this instruction into a through instruction $SRC_1$, and decodes this through instruction $SRC_1$. When the through instruction $SRC_1$ has been input, the operator $120_1$ passes the first processing data $SOURCE_1$ through this operator.

The instruction decoder $320_{12}$ decodes the instruction $INST_{12}$ from the stage latch circuit $310_1$. When the instruction $INST_{12}$ has been decoded, the operator $220_1$ executes the processing according to the instruction $INST_{12}$ by using the value (the second processing data $SOURCE_2$) of the stage latch circuit $210_1$ and outputs the result of the processing to the stage latch circuit $210_2$. When the instruction other than the instruction $INST_{12}$ has been input, the instruction decoder $320_{12}$ converts this instruction into a through instruction $SRC_2$, and decodes this through instruction $SRC_2$. When this through instruction $SRC_2$ has been input, the operator $220_1$ passes the second processing data $SOURCE_2$ through this operator.

The stage latch circuit $110_2$, the stage latch circuit $210_2$ and the stage latch circuit $310_2$ are provided between the first processing stage and the not shown second processing stage. These stage latch circuits hold the output value of the operator $120_1$, the output value of the operator $220_1$ and the output value of the stage latch circuit $310_1$ respectively. The second processing stage to the (x−1)-th processing stage have similar structures to that of the first processing stage.

In other words, at the (x−1)-th processing stage, the stage latch circuit $110_{x-1}$ holds the first processing data $SOURCE_1$ or the processing result of the (x−2)-th processing stage (not shown). The stage latch circuit $210_{x-1}$ holds the second processing data $SOURCE_2$ or the processing result of the (x−2)-th processing stage (not shown). The stage latch circuit $310_{x-1}$ holds the value (the instruction $INST_{11}$, the instruction $INST_{12}$, etc.) of the stage latch circuit at the (x−2)-th processing stage. The instruction decoder $320_{x-11}$ decodes the instruction $INST_{x-11}$ from the stage latch circuit $310_{x-1}$.

When the instruction $INST_{x-11}$ has been decoded, the operator $120_{x-1}$ executes the processing according to the instruction $INST_{x-11}$ by using the value of the stage latch circuit $110_{x-1}$ and outputs the result of the processing to the stage latch circuit $110_x$. When the instruction other than the instruction $INST_{x-11}$ has been input, the instruction decoder $320_{x-11}$ converts this instruction into a through instruction $SRC_1$, and decodes this through instruction $SRC_1$ to the operator $120_{x-1}$. When the through instruction $SRC_1$ has been input, the operator $120_{x-1}$ passes the value of the stage latch circuit $110_{x-1}$ through this operator.

The instruction decoder $320_{x-12}$ decodes the instruction $INST_{x-12}$ from the stage latch circuit $310_{x-1}$. When the instruction $INST_{x-12}$ has been decoded, the operator $220_{x-1}$ executes the processing according to the instruction $INST_{x-12}$ by using the value of the stage latch circuit $210_{x-1}$ and outputs the result of the processing to the stage latch circuit $210_x$. When the instruction other than the instruction $INST_{x-12}$ has been input, the instruction decoder $320_{x-12}$ converts this instruction into a through instruction $SRC_2$, and decodes this through instruction $SRC_2$ to the operator $220_{x-1}$. When this through instruction $SRC_2$ has been input, the operator $220_{x-1}$ passes the value of the stage latch circuit $210_{x-1}$ through this operator.

At the x-th processing stage, the stage latch circuit $110_x$ holds the first processing data $SOURCE_1$ or the processing result of the operator $120_{x-1}$ at the (x−1)-th processing stage. The stage latch circuit $210_x$ holds the second processing data $SOURCE_2$ or the processing result of the operator $220_{x-1}$ at the (x−1)-th processing stage. The stage latch circuit $310_x$ holds the value (the instruction $INST_{11}$, the instruction $INST_{12}$, etc.) of the stage latch circuit $310_{x-1}$. The instruction decoder $320_x$ decodes the instruction $INST_x$ from the stage latch circuit $310_x$.

When the instruction $INST_x$ has been decoded, the operator $120_x$ executes the processing according to the instruction $INST_x$ by using the value of the stage latch circuit $110_x$ and the value of the stage latch circuit $210_x$, and outputs the result of the processing to the stage latch circuit $110_{x+1}$. When the instruction other than the instruction INSTX has been input, the instruction decoder $320_x$ converts this instruction into the through instruction $SRC_1$, and decodes this instruction $SRC_1$ to the operator $120_x$. The operator $120_x$ passes only the value of the stage latch circuit $110_x$ through, out of the value of the stage latch circuit $110_x$ and the value of the stage latch circuit $210_x$.

The structures of the (x+1)-th processing stage to the n-th processing stage are similar to that of the second processing stage shown in FIG. 1. In other words, at the (x+1)-th processing stage, the stage latch circuit $110_{x+1}$ holds the first processing data $SOURCE_1$ or the processing result of the operator $120_x$ at the x-th processing stage. The stage latch circuit $310_{x+1}$ holds the value (the instruction $INST_{11}$, the instruction $INST_{12}$, etc.) of the stage latch circuit $310_x$. The instruction decoder $320_{x+1}$ decodes the instruction $INST_{x+1}$ from the stage latch circuit $310_{x+1}$. When the instruction $INST_{x+1}$ has been decoded, the operator $120_{x+1}$ executes the processing according to the instruction $INST_{x+1}$ by using the value of the stage latch circuit $110_{x+1}$, and outputs the result of the processing. A bypass line $B_{x+1}$ is provided in parallel with the operator $120_{x+1}$, and guides the value of the stage latch circuit $110_{x+1}$ to pass through this bypass line to a multiplexer $400_{x+1}$ without passing through the operator $120_{x+1}$.

The multiplexer $400_{x+1}$ is a two-input and one-output type changeover unit that is changeover controlled by the instruction decoder $320_{x+1}$. The multiplexer $400_{x+1}$ outputs one of the processing result of the operator $120_{x+1}$ and the value of the stage latch circuit $110_{x+1}$. Specifically, the multiplexer $400_{x+1}$ outputs the processing result of the operator $120_{x+1}$ when the instruction $INST_{x+1}$ has been decoded by the instruction decoder $320_{x+1}$. On the other hand, the multiplexer $400_{x+1}$ outputs the value of the stage latch circuit $110_{x+1}$ when the instruction other than the instruction $INST_{x+1}$ has been input to the instruction decoder $320_{x+1}$. The stage latch circuit $110_{x+2}$ holds the processing result of the operator $120_{x+1}$ or the value of the stage latch circuit $110_{x+1}$ according to the changeover state of the multiplexer $400_{x+1}$. The stage latch circuit $110_{x+2}$ and the stage latch circuit $310_{x+2}$ are provided between the (x+1)-th processing stage and the (x+2)-th processing stage (not shown) respectively, and they hold the output of the multiplexer $400_{x+1}$ and the value of the stage latch circuit $310_{x+1}$ respectively. The (x+2)-th processing stage to the n-th processing stage have similar structures to that of the (x+1)-th processing stage.

In other words, at the n-th processing stage, the stage latch circuit $110_n$ holds the first processing data $SOURCE_1$ or the processing result at the (n−1)-th processing stage (not shown). The stage latch circuit $310_n$ holds the value of the stage latch circuit at the (n−1)-th stage. The instruction decoder $320_n$ decodes the instruction $INST_n$ from the stage latch circuit $310_n$. When the instruction $INST_n$ has been decoded, the operator $120_n$ executes the processing according to the instruction $INST_n$ by using the value of the stage latch circuit $110_n$, and outputs the result of the processing. A bypass line $B_n$ is provided in parallel with the operator $120_n$, and guides the value of the stage latch circuit $110_n$ to pass through this bypass line to a multiplexer $400_n$ without passing through the operator $120_n$.

The multiplexer $400_n$ is changeover controlled by the instruction decoder $320_n$. The multiplexer $400_n$ outputs the processing result of the operator $120_n$ when the instruction $INST_n$ has been decoded by the instruction decoder $320_n$. On the other hand, the multiplexer $400_n$ outputs the value of the stage latch circuit $110_n$ when the instruction other than the instruction $INST_n$ has been input to the instruction decoder $320_n$. The stage latch circuit $110_{n+1}$ holds the processing result of the operator $120_n$ or the value of the stage latch circuit $110_n$ according to the changeover state of the multiplexer $400_n$. A processing-result register $500$ holds a value of the stage latch circuit $110_{n+1}$, that is, a processing result (a destination operand) of the pipeline operator.

In the third embodiment, the respective operators at the first processing stage to n-th processing stage execute the processing respectively according to the instructions that have no mutual relationship. In other words, when there is no correlation, the processing of each operator is carried out independent of each other. Further, in the third embodiment, when the through instruction $SRC_1$ and the through instruction $SRC_2$ have been decoded at the first processing stage to the (x−1)-th processing stage, the first processing data $SOURCE_1$ and the second processing data $SOURCE_2$ are passed through.

Figure 6:
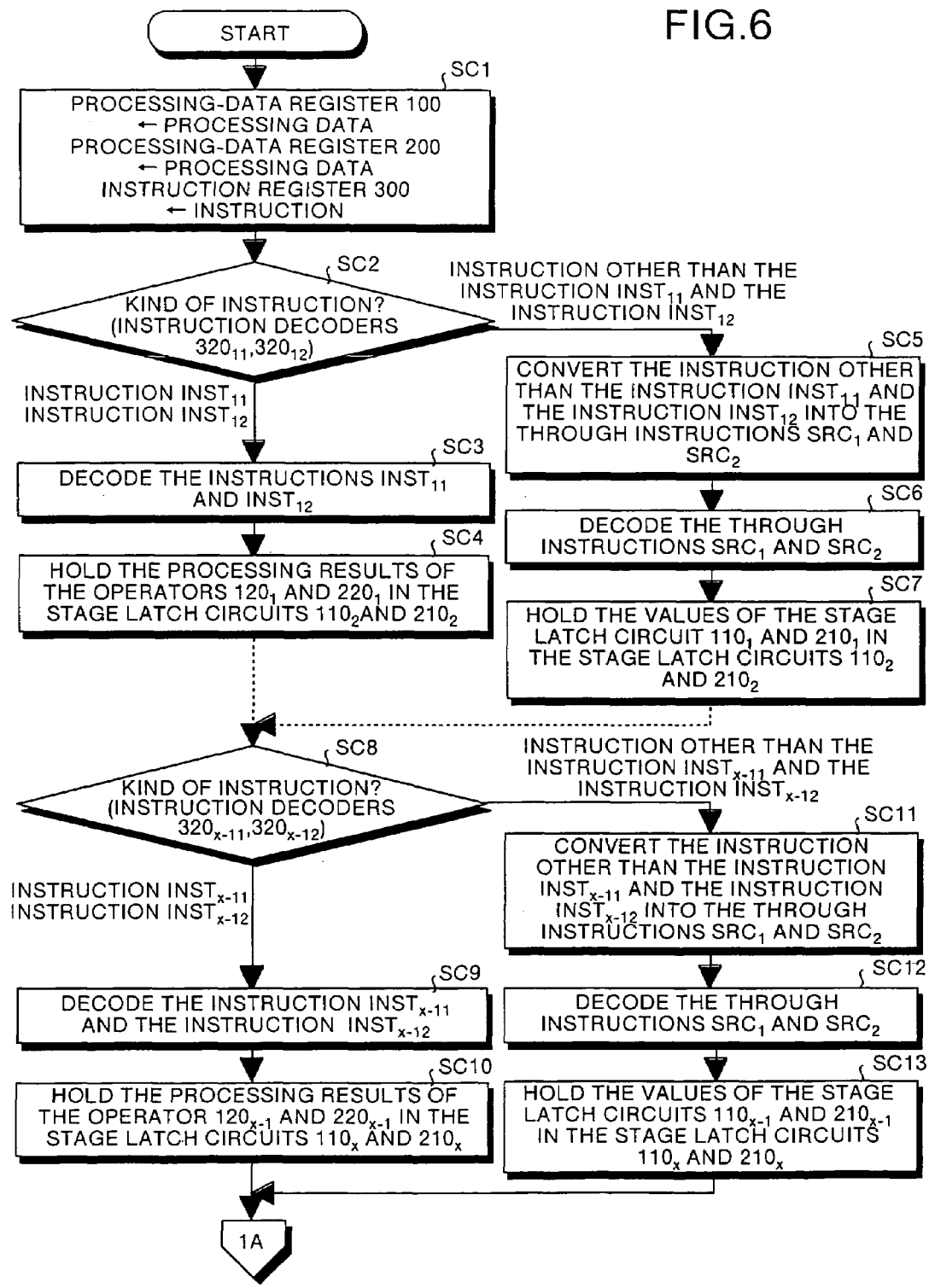
FIG. 6 is a flowchart that explains the operation of the third embodiment.
Figure 7:
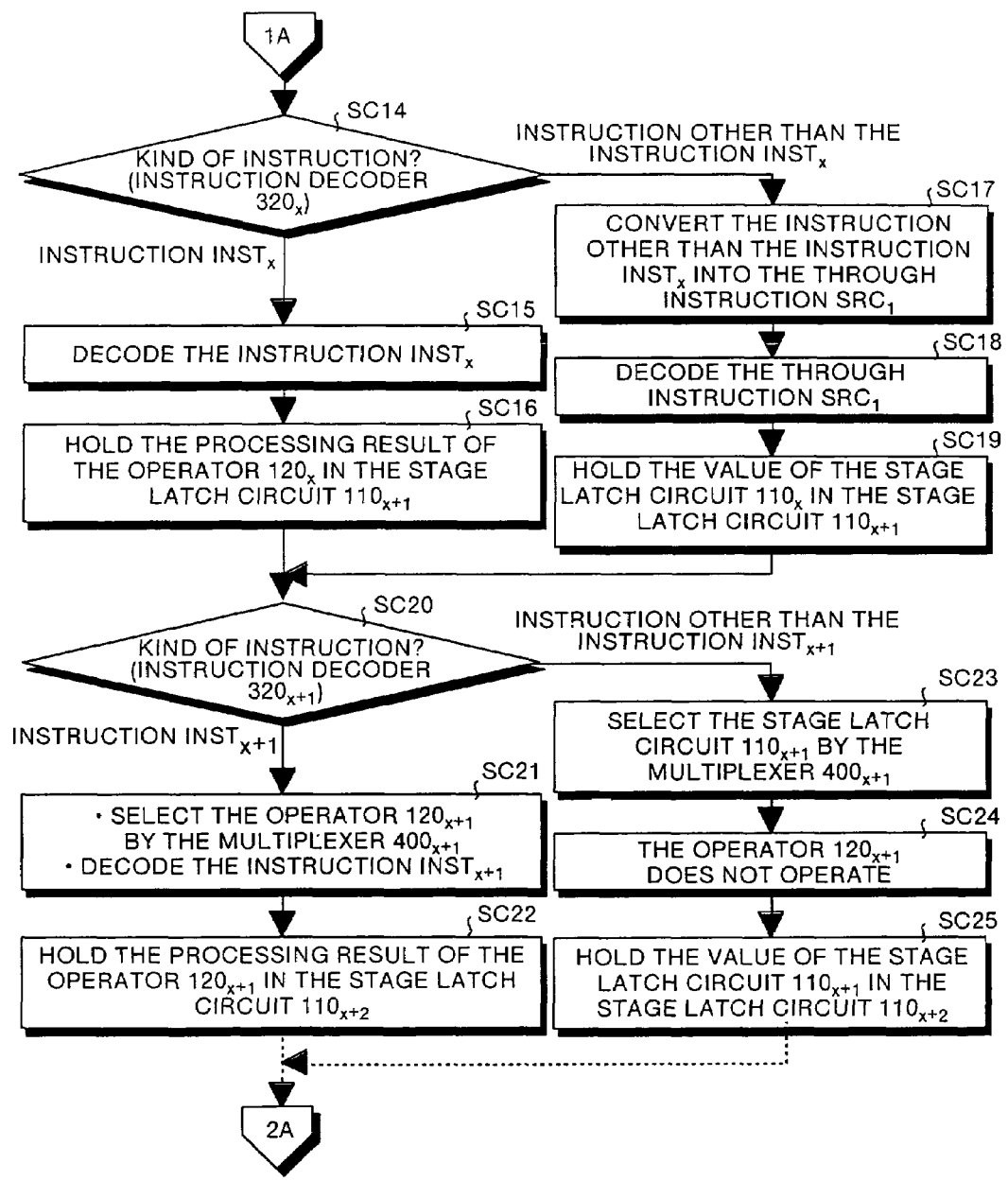
FIG. 7 is a flowchart that explains the operation of the third embodiment.
Figure 8:
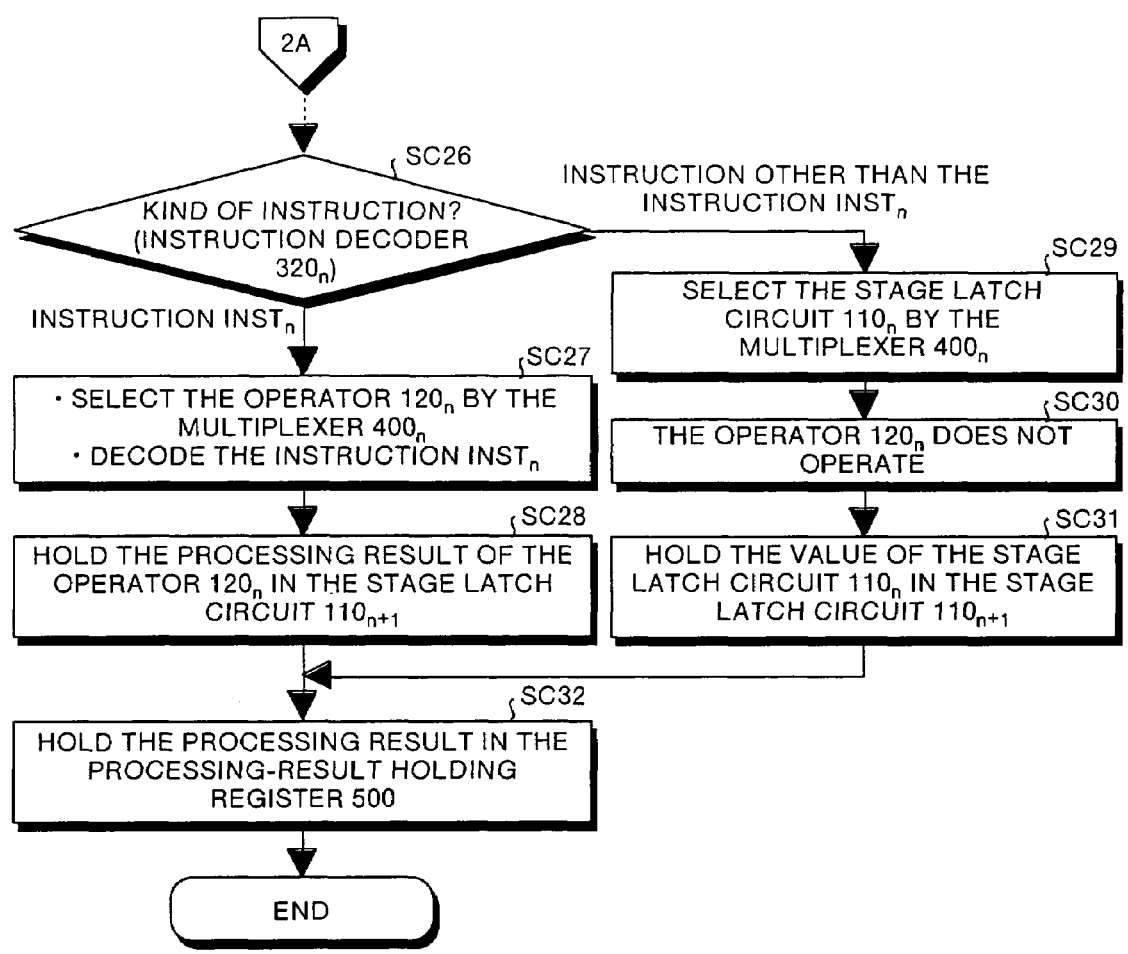
FIG. 8 is a flowchart that explains the operation of the third embodiment.

The operation of the third embodiment will be explained with reference to flowcharts shown in FIG. 6 to FIG. 8. The operation when the instruction $INST_x$ has been dispatched to the operator $120_x$ at the x-th processing stage will be explained first. At step SC1 shown in FIG. 6, the first processing data $SOURCE_1$, the second processing data $SOURCE_2$ and the instruction $INST_x$ are held in the processing-data register $100$, the processing-data register $200$ and the instruction register $300$ respectively. Thus, the first processing data $SOURCE_1$, the second processing data $SOURCE_2$ and the instruction $INST_x$ are held in the stage latch circuit $110_1$, the stage latch circuit $210_1$ and the stage latch circuit $310_1$ respectively.

At the next step SC2, the instruction decoder $320_{11}$ and the instruction decoder $320_{12}$ decide the kind of the instruction held in the stage latch circuit $310_1$. In this case, the instruction $INST_x$ is being held in the stage latch circuit $310_1$. Therefore, the instruction decoder $320_{11}$ and the instruction decoder $320_{12}$ proceed to step SC5. When the instruction $INST_{11}$ and the instruction $INST_{12}$ are being held in the stage latch circuit $310_1$, the instruction decoder $320_{11}$ and the instruction decoder $320_{12}$ proceed to step SC3. At the step SC3, the instruction decoder $320_{11}$ and the instruction decoder $320_{12}$ decode the instruction $INST_{11}$ and the instruction $INST_{12}$ to the operator $120_1$ and the operator $220_1$ respectively. The operator $120_1$ and the operator $220_1$ thus execute the processing according to the instruction $INST_{11}$ and the instruction $INST_{12}$ by using the value (the first processing data $SOURCE_1$) of the stage latch circuit $110_1$ and the value (the second processing data $SOURCE_2$) of the stage latch circuit $210_1$ respectively. At step SC4, the processing result of the operator $120_1$ and the processing result of the operator $220_1$ are held in the stage latch circuit $110_2$ and the stage latch circuit $210_2$ respectively.

At the step SC5, the instruction decoder $320_{11}$ and the instruction decoder $320_{12}$ decode the value (the instruction $INST_x$) of the stage latch circuit $310_1$ respectively, and convert the instruction $INST_x$ into a through instruction $SRC_1$ and a through instruction $SRC_2$ respectively. The instruction decoder $320_{11}$ and the instruction decoder $320_{12}$ then proceed to step SC6. At the step SC6, the instruction decoder $320_{11}$ and the instruction decoder $320_{12}$ decode the through instruction $SRC_1$ and the through instruction $SRC_2$ to the operator $120_1$ and the operator $220_1$ respectively. The operator $120_1$ and the operator $220_1$ then pass the value (the first processing data $SOURCE_1$) of the stage latch circuit $110_1$ and the value (the second processing data $SOURCE_2$) of the stage latch circuit $210_1$ through the respective operators.

At the next step SC7, the value (the first processing data $SOURCE_1$) of the stage latch circuit $110_1$ and the value (the second processing data $SOURCE_2$) of the stage latch circuit $210_1$ are held in the stage latch circuit $110_2$ and the stage latch circuit $210_2$ respectively. The value (the instruction $INST_x$) of the stage latch circuit $310_1$ is held in the stage latch circuit $310_2$. Thereafter, at the second processing stage to the (x−2)-th processing stage (not shown), the through instruction $SRC_1$ and the through instruction $SRC_2$ are decoded respectively. The first processing data $SOURCE_1$ and the second processing data $SOURCE_2$ are then sequentially passed through the respective processing stages, in a similar manner to that of the first processing stage. At the second processing stage to the (x−2)-th processing stage, the instruction $INST_x$ is held sequentially in the stage latch circuits.

At the (x−1)-th processing stage, at step SC8, the instruction $INST_x$ is being held in the stage latch circuit $310_{x-1}$. Therefore, the instruction decoder $320_{x-11}$ and the instruction decoder $320_{x-12}$ proceed to step SC11. When the instruction $INST_{x-11}$ and the instruction $INST_{x-12}$ are being held in the stage latch circuit $310_{x-1}$, the instruction decoder $320_{x-11}$ and the instruction decoder $320_{x-12}$ proceed to step SC9. At the step SC9, instruction decoder $320_{x-11}$ and the instruction decoder $320_{x-12}$ decode the instruction $INST_{x-11}$ and the instruction $INST_{x-12}$ to the operator $120_{x-1}$ and the operator $220_{x-1}$ respectively. The operator $120_{x-1}$ and the operator $220_{x-1}$ then execute the processing corresponding to the instruction $INST_{x-11}$ and the instruction $INST_{x-12}$ by using the value of the stage latch circuit $110_{x-1}$ and the value of the stage latch circuit $210_{x-1}$ respectively. At step SC10, the processing result of the operator $120_{x-1}$ and the processing result of the operator $220_{x-1}$ are held in the stage latch circuit $110_x$ and the stage latch circuit $210_x$ respectively.

At the step SC11, the instruction decoder $320_{x-11}$ and the instruction decoder $320_{x-12}$ decode the value (the instruction $INST_x$) of the stage latch circuit $310_{x-1}$ respectively, and convert the instruction $INST_x$ into a through instruction $SRC_1$ and a through instruction $SRC_2$ respectively. The instruction decoder $320_{x-11}$ and the instruction decoder $320_{x-12}$ then proceed to step SC12. At the step SC12, the instruction decoder $320_{x-11}$ and the instruction decoder $320_{x-12}$ decode the through instruction $SRC_1$ and the through instruction $SRC_2$ to the operator $120_{x-1}$ and the operator $220_{x-1}$ respectively. The operator $120_{x-1}$ and the operator $220_{x-1}$ then pass the value (the first processing data $SOURCE_1$) of the stage latch circuit $110_{x-1}$ and the value (the second processing data $SOURCE_2$) of the stage latch circuit $210_{x-1}$ through the respective operators.

At the next step SC13, the value (the first processing data $SOURCE_1$) of the stage latch circuit $110_{x-1}$ and the value (the second processing data $SOURCE_2$) of the stage latch circuit $210_{x-1}$ are held in the stage latch circuit $110_x$ and the stage latch circuit $210_x$ respectively. The value (the instruction $INST_x$) of the stage latch circuit $310_{x-1}$ is held in the stage latch circuit $310_x$.

At the x-th processing stage, at step SC14 (refer to FIG. 7), the instruction $INST_x$ is being held in the stage latch circuit $310_x$. Therefore, the instruction decoder $320_x$ proceeds to step SC15. When the instruction other than the instruction $INST_x$ is being held in the stage latch circuit $310_x$, the instruction decoder $320_x$ proceeds to step SC17. At the step SC17, instruction decoder $320_x$ converts the instruction other than the instruction $INST_x$ into the through instruction $SRC_1$, and proceeds to step SC18. At the step SC18, the instruction decoder $320_x$ decodes the through instruction $SRC_1$ to the operator $120_x$. The operator $120_x$ then passes the value of the stage latch circuit $110_x$ through. At the next step SC19, the value of the stage latch circuit $110_x$ is held in the stage latch circuit $110_{x+1}$.

At the step SC15, the instruction decoder $320_x$ decodes the instruction $INST_x$ from the stage latch circuit $310_x$ to the operator $120_x$. The operator $120_x$ then executes the processing according to the instruction $INST_x$ by using the value (the first processing data $SOURCE_1$) of the stage latch circuit $110_x$ and the value (the second processing data $SOURCE_2$) of the stage latch circuit $210_x$. At step SC16, the processing result of the operator $120_x$ is held in the stage latch circuit $110_{x+1}$. At this time, the value (the instruction $INST_x$) of the stage latch circuit $310_x$ is held in the stage latch circuit $310_{x+1}$.

At the (x+1)-th processing stage, at step SC20, the instruction $INST_x$ is being held in the stage latch circuit $310_{x-1}$. Therefore, the instruction decoder $320_{x+1}$ proceeds to step SC23. When the instruction $INST_{x+1}$ is being held in the stage latch circuit $310_{x+1}$, the instruction decoder $320_{x+1}$ proceeds to step SC21. At the step SC21, the instruction decoder $320_{x+1}$ makes the multiplexer $400_{x+1}$ select the operator $120_{x+1}$. The instruction decoder $320_{x+1}$ decodes the instruction $INST_{x+1}$ from the stage latch circuit $310_{x+1}$. The operator $120_{x+1}$ then executes the processing according to the instruction $INST_{x+1}$ by using the value of the stage latch circuit $110_{x+1}$. At step SC22, the processing result of the operator $120_{x+1}$ is held in the stage latch circuit $110_{x+2}$.

At the step SC23, the instruction decoder $320_{x+1}$ makes the multiplexer $400_{x+1}$ select the stage latch circuit $110_{x+1}$. Thus, at step SC24, the operator $120_{x+1}$ does not operate. At step SC25, the value (the processing result of the operator $120_x$) of the stage latch circuit $110_{x+1}$ is held in the stage latch circuit $110_{x+2}$ through the bypass line $B_{x+1}$ and the multiplexer $400_{x+1}$. Thereafter, at the (x+2)-th processing stage to the (n−1)-th processing stage (not shown), a stage latch circuit is selected by the multiplexer in a similar manner to that of the (x+1)-th processing stage. The processing result of the operator $120_x$ is sequentially passed through the respective processing stages. At the (x+2)-th processing stage to the (n−1)-th processing stage, the instruction $INST_x$ is sequentially held in the stage latch circuits.

At the n-th processing stage, at step SC26 (refer to FIG. 8), the instruction $INST_x$ is being held in the stage latch circuit $310_n$. Therefore, the instruction decoder $320_n$ proceeds to step SC29. When the instruction $INST_n$ is being held in the stage latch circuit $310_n$, the instruction decoder $320_n$ proceeds to step SC27. At the step SC27, instruction decoder $320_n$ makes the multiplexer $400_n$ select the operator $120_n$. The instruction decoder $320_n$ decodes the instruction $INST_n$ from the stage latch circuit $310_n$. The operator $120_n$ then executes the processing according to the instruction $INST_n$ by using the value of the stage latch circuit $110_n$. At the next step SC28, the processing result of the operator $120_n$ is held in the stage latch circuit $110_{n+1}$.

At the step SC29, the instruction decoder $320_n$ makes the multiplexer $400_n$ select the stage latch circuit $110_n$. Thus, at step SC30, the operator $120_n$ does not operate. At step SC31, the value (the processing result of the operator $120_x$) of the stage latch circuit $110_n$ is held in the stage latch circuit $110_{n+1}$ through the bypass line $B_n$ and the multiplexer $400_n$. At the next step SC32, the processing-result register 500 holds the processing result of the operator $120_x$ as the processing result of the pipeline operator.

Next, the operation when the instruction $INST_{x+1}$ has been dispatched to the operator $120_{x+1}$ at the (x+1)-th processing stage will be explained. At the step SC1 shown in FIG. 6, the first processing data $SOURCE_1$, the second processing data $SOURCE_2$ and the instruction $INST_{x+1}$ are held in the processing-data register 100, the processing-data register 200 and the instruction register 300 respectively. Thus, the first processing data $SOURCE_1$, the second processing data $SOURCE_2$ and the instruction $INST_{x+1}$ are held in the stage latch circuit $110_1$, the stage latch circuit $210_1$ and the stage latch circuit $310_1$ respectively.

Thereafter, at the first processing stage to the (x−1)-th processing stage, the through instruction $SRC_1$ and the through instruction $SRC_2$ are decoded respectively in a similar manner to that of the above-described operation (at the step SC2, the step SC5 to the step SC8, and the step SC11 to the step SC13). In other words, the first processing data $SOURCE_1$ and the second processing data $SOURCE_2$ are sequentially passed through the respective operators. At the first processing stage to the (x−1)-th processing stage, the instruction $INST_{x+1}$ is sequentially held in the stage latch circuits. Therefore, at the x-th processing stage, the stage latch circuit $110_x$, the stage latch circuit $210_x$ and the stage latch circuit $310_x$ hold the first processing data $SOURCE_1$, the second processing data $SOURCE_2$ and the instruction $INST_{x+1}$ respectively.

At the x-th processing stage, at the step SC14 (refer to FIG. 7), the instruction $INST_{x+1}$ is being held in the stage latch circuit $310_x$. Therefore, the instruction decoder $320_x$ proceeds to step SC17. At the step SC17, instruction decoder $320_x$ converts the instruction $INST_{x+1}$ into the through instruction $SRC_1$, and then proceeds to the step SC18. At the step SC18, the instruction decoder $320_x$ decodes the through instruction $SRC_1$ to the operator $120_x$. The operator $120_x$ then passes the value of the stage latch circuit $110_x$ through. At the next step SC19, the value of the stage latch circuit $110_x$ is held in the stage latch circuit $110_{x+1}$. At this time, the value (the instruction $INST_{x+1}$) of the stage latch circuit $310_x$ is held in the stage latch circuit $310_{x+1}$.

At the (x+1)-th processing stage, at the step SC20, the instruction $INST_{x+1}$ is being held in the stage latch circuit $310_{x+1}$. Therefore, the instruction decoder $320_{x+1}$ proceeds to step SC21. At the step SC21, the instruction decoder $320_{x+1}$ makes the multiplexer $400_{x+1}$ select the operator $120_{x+1}$. The instruction decoder $320_{x+1}$ decodes the instruction $INST_{x+1}$ from the stage latch circuit $310_{x+1}$. The operator $120_{x+1}$ then executes the processing according to the instruction $INST_{x+1}$ by using the value of the stage latch circuit $110_{x+1}$. At the next step SC22, the processing result of the operator $120_{x+1}$ is held in the stage latch circuit $110_{x+2}$.

Thereafter, at the (x+2)-th processing stage to the (n−1)-th processing stage (not shown), the processing similar to that of the step SC23 to the SC 25 is carried out. A stage latch circuit is selected by the multiplexer. The processing result of the operator $120_{x+1}$ at the (x+1)-th processing stage is sequentially passed through the respective processing stages. At the (x+2)-th processing stage to the (n−1)-th processing stage, the instruction $INST_{x+1}$ is sequentially held in the stage latch circuits.

At the n-th processing stage, at the step SC26 (refer to FIG. 8), the instruction $INST_{x+1}$ is being held in the stage latch circuit $310_n$. Therefore, the instruction decoder $320_1$ proceeds to the step SC29. At the step SC29, instruction decoder $320_n$ makes the multiplexer $400_n$ select the stage latch circuit $110_n$. At the step SC30, the operator $120_n$ does not operate. At the step SC31, the value (the processing result of the operator $120_{x+1}$) of the stage latch circuit $110_n$ is held in the stage latch circuit $110_{n+1}$ through the bypass line $B_n$ and the multiplexer $400_n$. At the next step SC32, the processing-result register 500 holds the processing result of the operator $120_{x+1}$ as the processing result of the pipeline operator.

As explained above, according to the third embodiment, at the time of executing the processing at the x-th processing stage, the through instruction $SRC_1$ and the through instruction $SRC_2$ are decoded respectively at the first processing stage to the (x−1)-th processing stage. Thus, the first processing data $SOURCE_1$ and the second processing data $SOURCE_2$ are passed through. Therefore, it is possible to reduce both the stage latch circuits and the wiring volume at the first processing stage to the (x−1)-th processing stage from the conventional levels. As a result, according to the third embodiment, it is possible to reduce both hardware volume and power consumption.

Figure 9:
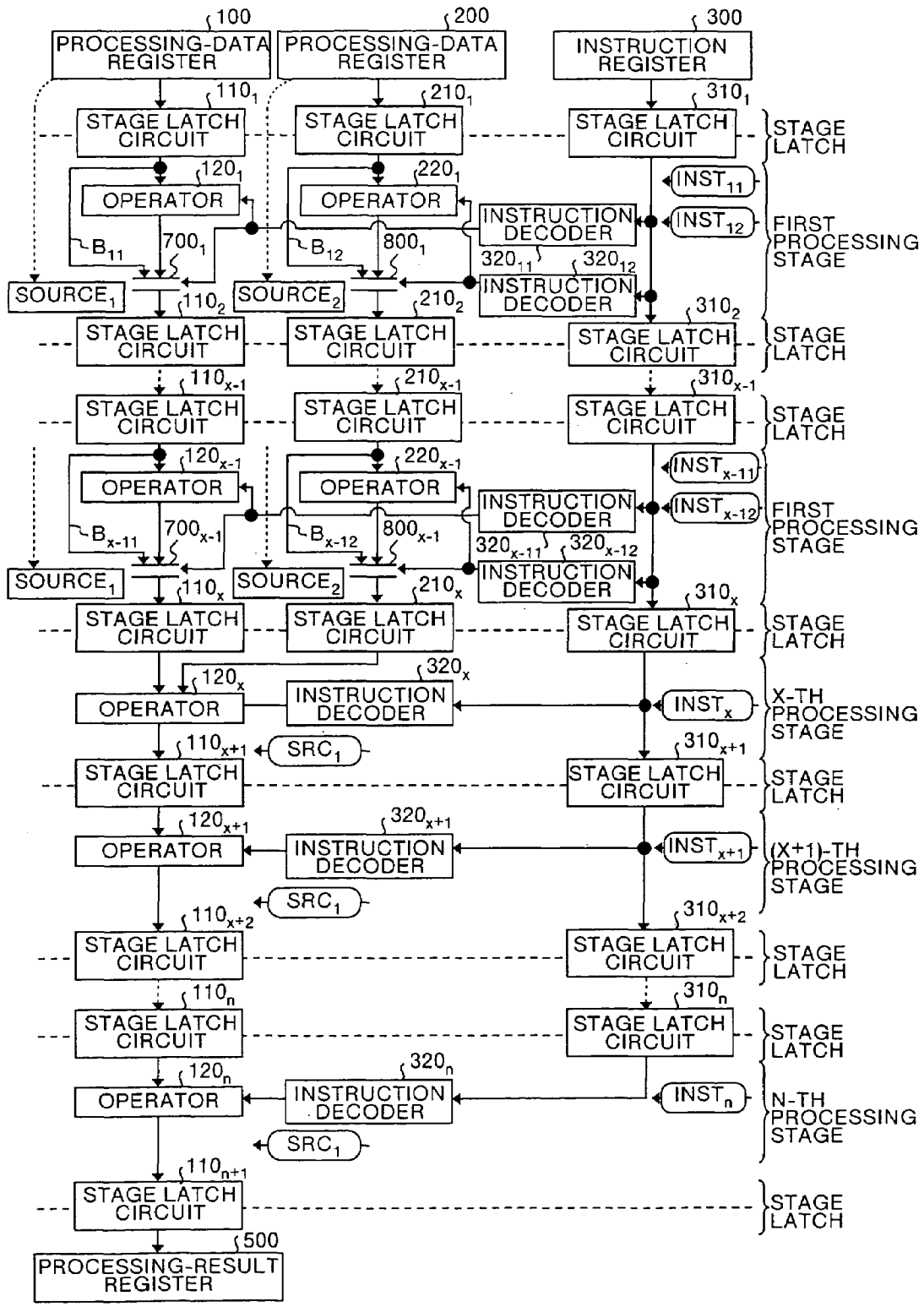
FIG. 9 is a block diagram that shows a structure of a fourth embodiment of the present invention.

FIG. 9 is a block diagram that shows a structure of a fourth embodiment of the present invention. In this figure, parts corresponding to those in FIG. 5 are attached with identical reference symbols. The pipeline operator shown in FIG. 9 has n processing stages including a first processing stage to an n-th processing stage. However, FIG. 9 shows only the first processing stage, the (x−1)-th processing stage (1<x<n), the x-th processing stage, the (x+1)-th processing stage, and the n-th processing stage. All other processing stages are omitted from this drawing.

Further, the instruction decoder $320_{11}$, the instruction decoder $320_{12}$ and others shown in FIG. 9 have different functions to those of the instruction decoder $320_{11}$, the instruction decoder $320_{12}$ and others shown in FIG. 5. As compared with FIG. 5, FIG. 9 has additional components like a multiplexer $700_1$, a multiplexer $800_1$, bypass line $B_{11}$ and a bypass line $B_{12}$ at the first processing stage. Similarly, additional components like a multiplexer $700_{x-1}$, a multiplexer $800_{x-1}$, a bypass line $B_{x-11}$ and a bypass line $B_{x-12}$ at the (x−1)-th processing stage. On the other hand, the multiplexer $400_{x+1}$ and the bypass line $B_{x+1}$ provided at the (x+1)-th processing stage shown in FIG. 5 are not provided in FIG. 9. Similarly, the multiplexer $400_n$ and the bypass line $B_n$ provided at the n-th processing stage shown in FIG. 5 are not provided in FIG. 9.

As shown in FIG. 9, at the first processing stage, the instruction decoder $320_{11}$ decodes the instruction $INST_{11}$ from the stage latch circuit $310_1$. When the instruction $INST_{11}$ has been decoded, the operator $120_1$ executes the processing according to the instruction $INST_{11}$ by using the value (the first processing data $SOURCE_1$) of the stage latch circuit $110_1$. A bypass line $B_{11}$ is provided in parallel with the operator $120_1$, and guides the value of the stage latch circuit $110_1$ to pass through this bypass line to a multiplexer $700_1$ without passing through the operator $120_1$.

The multiplexer $700_1$ is a two-input and one-output type changeover unit that is changeover controlled by the instruction decoder $320_{11}$. The multiplexer $700_1$ outputs one of the processing result of the operator $120_1$ and the value of the stage latch circuit $110_1$. Specifically, the multiplexer $700_1$ outputs the processing result of the operator $120_1$ when the instruction $INST_{11}$ has been decoded by the instruction decoder $320_{11}$. On the other hand, the multiplexer $700_1$ outputs the value of the stage latch circuit $110_1$ when the instruction other than the instruction $INST_{11}$ has been input to the instruction decoder $320_{11}$.

The instruction decoder $320_{12}$ decodes the instruction $INST_{12}$ from the stage latch circuit $310_1$. When the instruction $INST_{12}$ has been decoded, the operator $220_1$ executes the processing according to the instruction $INST_{12}$ by using the value (the second processing data $SOURCE_2$) of the stage latch circuit $210_1$. A bypass line $B_{12}$ is provided in parallel with the operator $220_1$, and guides the value of the stage latch circuit $210_1$ to pass through this bypass line to a multiplexer $800_1$ without passing through the operator $220_1$.

The multiplexer $800_1$ is a two-input and one-output type changeover unit that is changeover controlled by the instruction decoder $320_{12}$. The multiplexer $800_1$ outputs one of the processing result of the operator $220_1$ and the value of the stage latch circuit $210_1$. Specifically, the multiplexer $800_1$ outputs the processing result of the operator $220_1$ when the instruction $INST_{12}$ has been decoded by the instruction decoder $320_{12}$. On the other hand, the multiplexer $800_1$ outputs the value of the stage latch circuit $210_1$ when the instruction other than the instruction $INST_{12}$ has been input to the instruction decoder $320_{12}$. The stage latch circuit $110_2$, the stage latch circuit $210_2$ and the stage latch circuit $310_2$ hold the outputs of the multiplexer $700_1$, the multiplexer $800_1$ and the stage latch circuit $310_1$ respectively. The second processing stage (not shown) to the (x−1)-th processing stage have similar structures to that of the first processing stage.

In other words, at the (x−1)-processing stage, the instruction decoder $320_{x-11}$ decodes the instruction $INST_{x-11}$ from the stage latch circuit $310_{x-1}$. When the instruction $INST_{x-11}$ has been decoded, the operator $120_{x-1}$ executes the processing according to the instruction $INST_{x-11}$ by using the value of the stage latch circuit $110_{x-1}$. A bypass line $B_{x-11}$ guides the value of the stage latch circuit $110_{x-1}$ to pass through this bypass line to a multiplexer $700_{x-1}$ without passing through the operator $120_{x-1}$.

The multiplexer $700_{x-1}$ is changeover controlled by the instruction decoder $320_{x-11}$. The multiplexer $700_{x-1}$ outputs the processing result of the operator $120_{x-1}$ when the instruction $INST_{x-11}$ has been decoded by the instruction decoder $320_{x-11}$. On the other hand, the multiplexer $700_{x-1}$ outputs the value of the stage latch circuit $110_{x-1}$ when the instruction other than the instruction $INST_{x-11}$ has been input to the instruction decoder $320_{x-11}$.

The instruction decoder $320_{x-12}$ decodes the instruction $INST_{x-12}$ from the stage latch circuit $310_{x-1}$. When the instruction $INST_{x-12}$ has been decoded, the operator $220_{x-1}$ executes the processing according to the instruction $INST_{x-12}$ by using the value of the stage latch circuit $210_{x-1}$. A bypass line $B_{x-12}$ guides the value of the stage latch circuit $210_{x-1}$ to pass through this bypass line to a multiplexer $800_{x-1}$ without passing through the operator $220_{x-1}$. When the instruction $INST_{x-12}$ has been decoded by the instruction decoder $320_{x-12}$, the multiplexer $800_{x-1}$ outputs the processing result of the operator $220_{x-1}$. When the instruction other than the instruction $INST_{x-12}$ has been input to the instruction decoder $320_{x-12}$, the multiplexer $800_{x-1}$ outputs the value of the stage latch circuit $210_{x-1}$.

At the x-th-processing stage, the stage latch circuit $110_x$, the stage latch circuit $210_x$ and the stage latch circuit $310_x$ hold the output value of the multiplexer $700_{x-1}$, the output value of the multiplexer $800_{x-1}$ and the value of the stage latch circuit $310_{x-1}$ respectively. The instruction decoder $320_x$ decodes the instruction $INST_x$ from the stage latch circuit $310_x$. When the instruction $INST_x$ has been decoded, the operator $120_x$ executes the processing according to the instruction $INST_x$ by using the value of the stage latch circuit $110_x$ and the value of the stage latch circuit $210_x$, and outputs the processing result to the stage latch circuit $110_{x+1}$. When the instruction other than the instruction $INST_x$ has been input, the instruction decoder $320_x$ converts this into the through instruction $SRC_1$, and decodes the through instruction $SRC_1$ to the operator $120_x$. When the through instruction $SRC_1$ has been decoded, the operator $120_x$ passes only the value of the stage latch circuit $110_x$ out of the value of the stage latch circuit $110_x$ and the value of the stage latch circuit $210_x$, through this operator.

At the (x+1)-th processing stage, the stage latch circuit $110_{x+1}$ holds the value of the stage latch circuit $110_x$ or the processing result of the operator $120_x$. The stage latch circuit $310_{x+1}$ holds the value of the stage latch circuit $310_x$. The instruction decoder $320_{x+1}$ decodes the instruction $INST_{x+1}$ from the stage latch circuit $310_{x+1}$. When the instruction $INST_{x+1}$ has been decoded, the operator $120_{x+1}$ executes the processing according to the instruction $INST_{x+1}$ by using the value of the stage latch circuit $110_{x+1}$, and outputs the processing result to the stage latch circuit $110_{x+2}$. When the instruction other than the instruction $INST_{x+1}$ has been input, the instruction decoder $320_{x+1}$ converts this into the through instruction $SRC_1$, and decodes the through instruction $SRC_1$ to the operator $120_{x+1}$. When the through instruction $SRC_1$ has been decoded, the operator $120_{x+1}$ passes the value of the stage latch circuit $110_{x+1}$ through this operator. Thereafter, the (x+2)-the processing stage (not shown) to the n-th processing stage have similar structures to that of the (x+1)-th processing stage.

At the n-th processing stage, the stage latch circuit $110_n$ holds the value of the stage latch circuit $110(n-1)$-th processing stage (not shown) or the processing result of the operator. The stage latch circuit $310_n$ holds the value of the stage latch circuit at the (n−1)-th processing stage. The instruction decoder $320_n$ decodes the instruction $INST_n$ from the stage latch circuit $310_n$. When the instruction $INST_n$ has been decoded, the operator $120_n$ executes the processing according to the instruction $INST_n$ by using the value of the stage latch circuit $110_n$, and outputs the processing result to the stage latch circuit $110_{n+1}$. When the instruction other than the instruction $INST_n$ has been input, the instruction decoder $320_n$ converts this into the through instruction $SRC_1$, and decodes the through instruction $SRC_1$ to the operator $120_n$. When the through instruction $SRC_1$ has been decoded, the operator $120_n$ passes the value of the stage latch circuit $110_n$ through this operator. A processing-result register $500$ holds a value of the stage latch circuit $110_{n+1}$, that is, a processing result (a destination operand) of the pipeline operator.

In this fourth embodiment, the respective operators at the first processing stage to n-th processing stage execute the processing respectively according to the instructions that have no mutual relationship, in a similar manner to that of the third embodiment. In other words, when there is no correlation, the processing of each operator is carried out independent of each other. Further, in this fourth embodiment, when the through instruction $SRC_1$ has been decoded at the (x+1)-th processing stage to the n-th processing stage, the processing result of the operator $120_x$ at the x-th processing stage is passed through.

Figure 10:
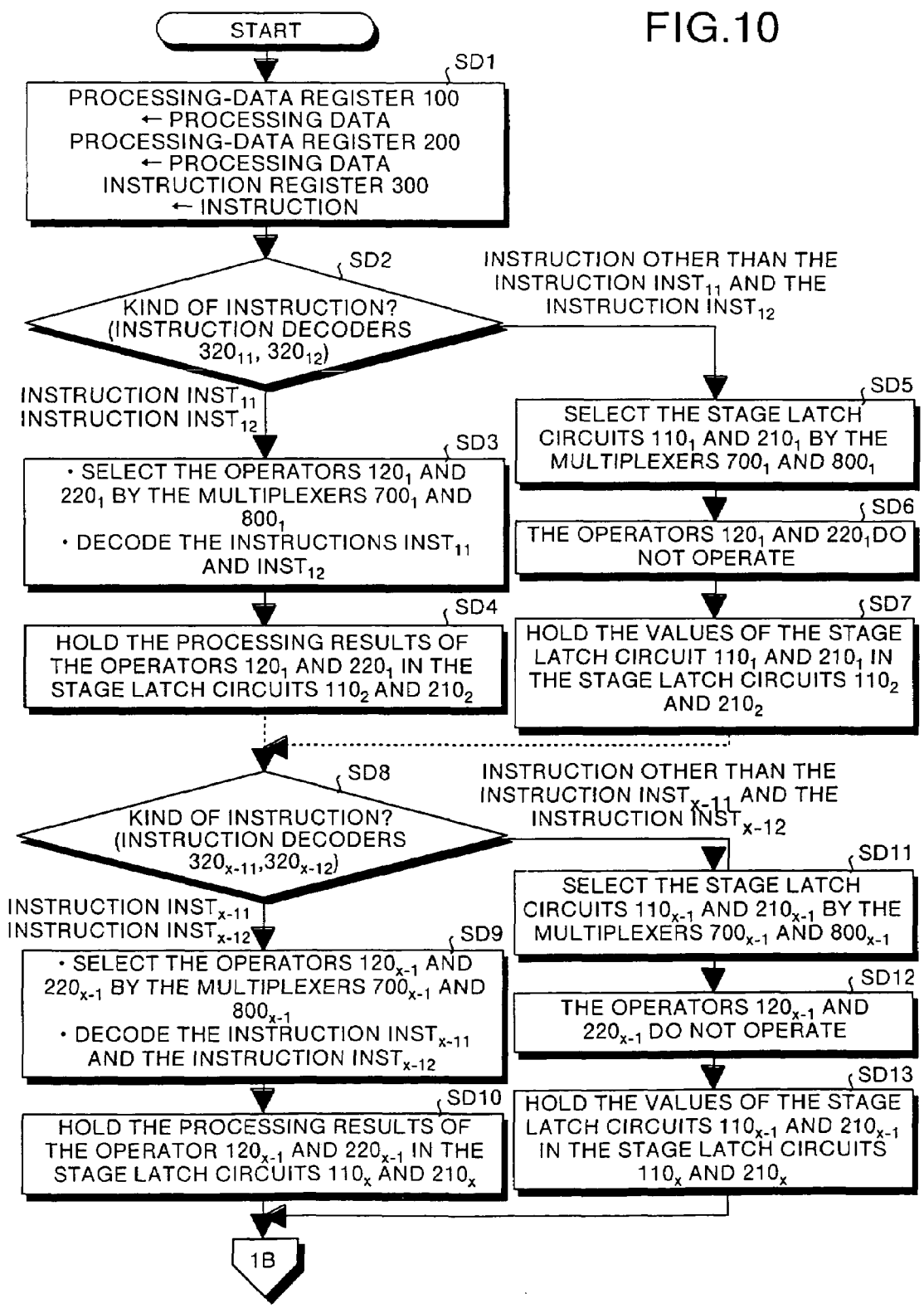
FIG. 10 is a flowchart that explains the operation of the fourth embodiment.
Figure 11:
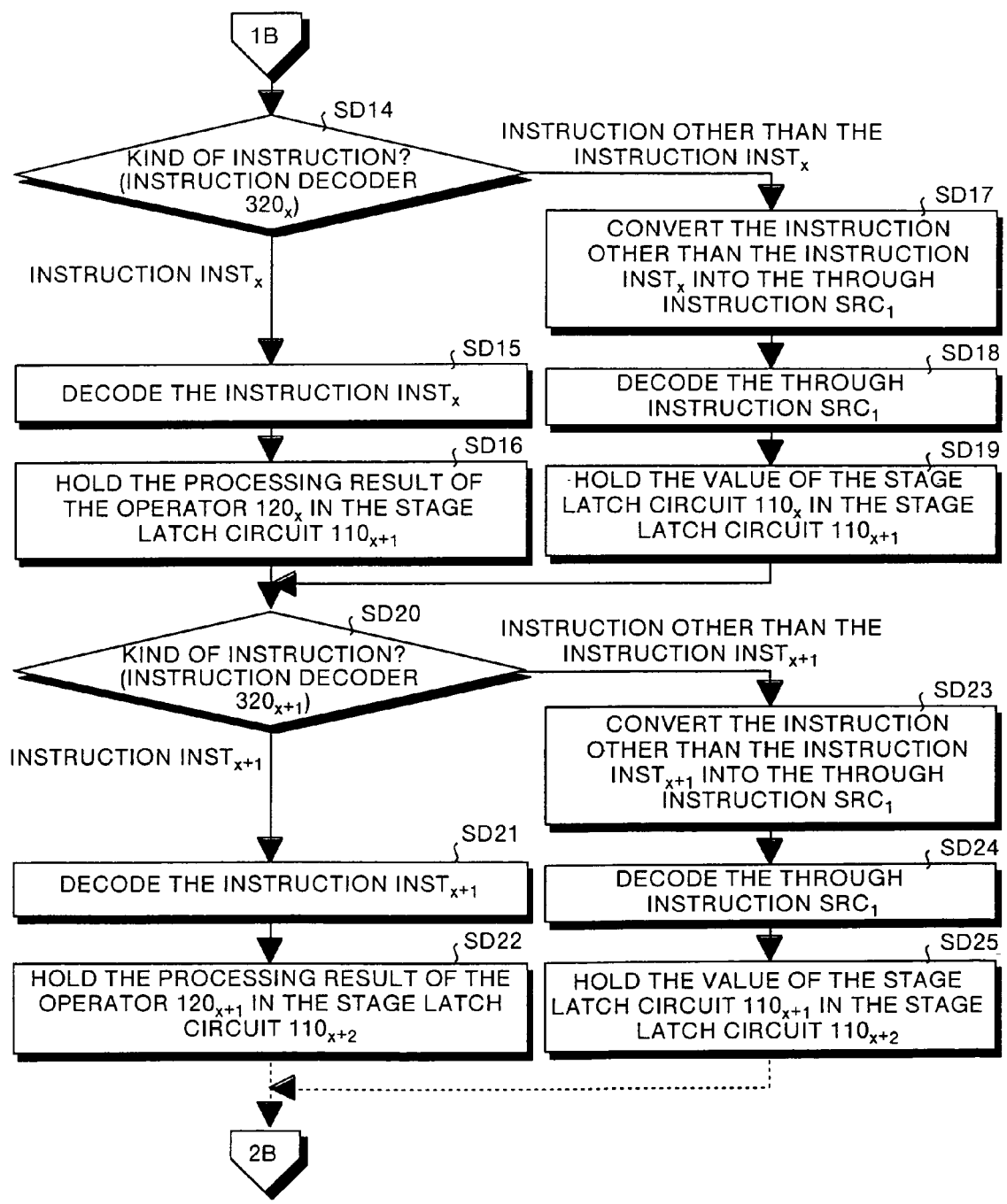
FIG. 11 is a flowchart that explains the operation of the fourth embodiment.
Figure 12:
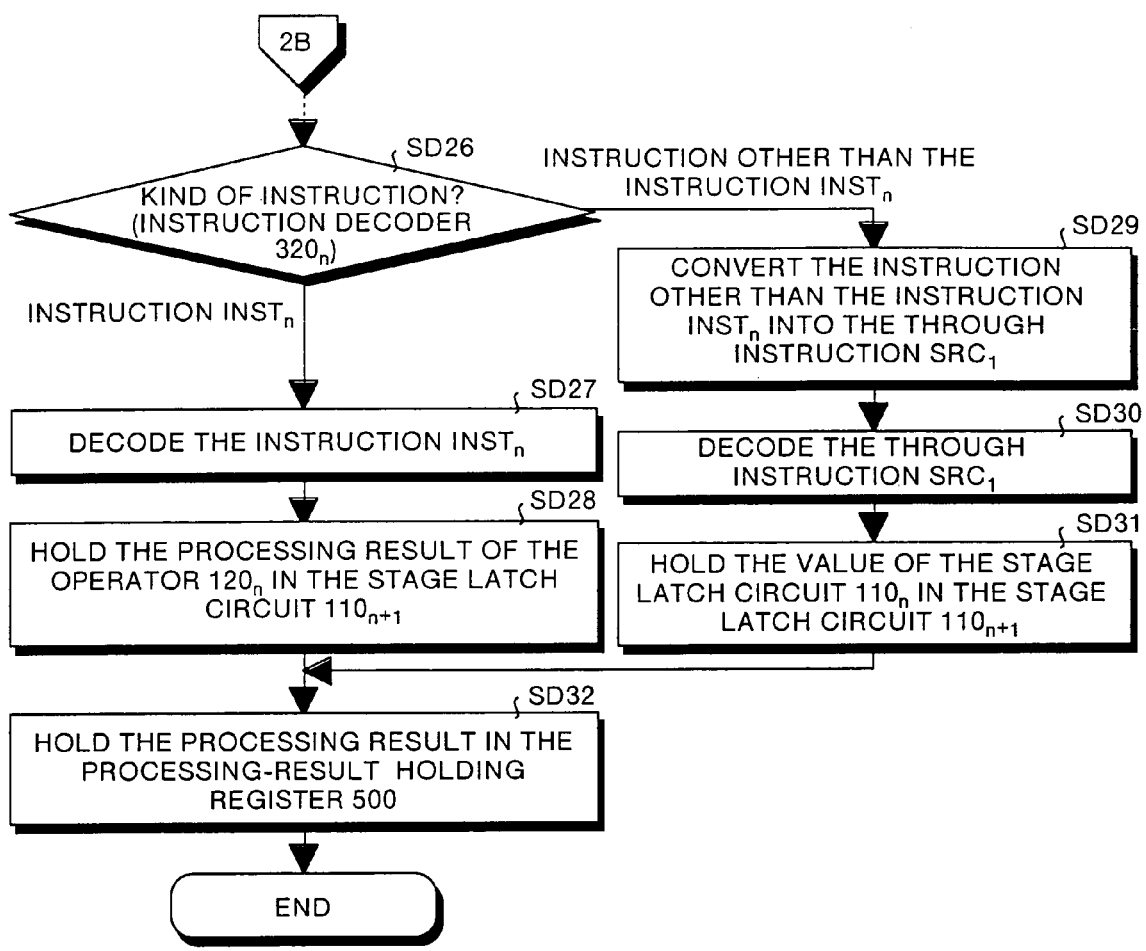
FIG. 12 is a flowchart that explains the operation of the fourth embodiment.

The operation of the fourth embodiment will be explained with reference to flowcharts shown in FIG. 10 to FIG. 12. The operation when the instruction $INST_x$ has been dispatched will be explained first. At step SD1 shown in FIG. 10, the first processing data $SOURCE_1$, the second processing data $SOURCE_2$ and the instruction $INST_x$ are held in the processing-data register $100$, the processing-data register $200$ and the instruction register $300$ respectively. Thus, the first processing data $SOURCE_1$, the second processing data $SOURCE_2$ and the instruction $INST_x$ are held in the stage latch circuit $110_1$, the stage latch circuit $210_1$ and the stage latch circuit $310_1$ respectively.

At the next step SD2, the instruction $INST_x$ is being held in the stage latch circuit $310_1$, and the instruction decoder $320_{11}$ and the instruction decoder $320_{12}$ proceed to step SD5. When the instruction $INST_{11}$ and the instruction $INST_{12}$ are being held in the stage latch circuit $310_1$, the instruction decoder $320_{11}$ and the instruction decoder $320_{12}$ proceed to step SD3. At the step SD3, the instruction decoder $320_{11}$ and the instruction decoder $320_{12}$ make the multiplexer $700_1$ and the multiplexer $800_1$ select the operator $120_1$ and the operator $220_1$.

The instruction decoder $320_{11}$ and the instruction decoder $320_{12}$ decode the instruction $INST_{11}$ and the instruction $INST_{12}$ to the operator $120_1$ and the operator $220_1$ respectively. The operator $120_1$ and the operator $220_1$ thus execute the processing according to the instruction $INST_{11}$ and the instruction $INST_{12}$ by using the value (the first processing data $SOURCE_1$) of the stage latch circuit $110_1$ and the value (the second processing data $SOURCE_2$) of the stage latch circuit $210_1$ respectively. At step SD4, the processing result of the operator $120_1$ and the processing result of the operator $220_1$ are held in the stage latch circuit $110_2$ and the stage latch circuit $210_2$ respectively.

At the step SD5, the instruction decoder $320_{11}$ and the instruction decoder $320_{12}$ make the multiplexer $700_1$ and the multiplexer $800_1$ select the stage latch circuit $110_1$ and the stage latch circuit $210_1$ respectively. At step SD6, the operator $120_1$ and the operator $220_1$ do not operate. At step SD7, the value (the first processing data $SOURCE_1$) of the stage latch circuit $110_1$ is held in the stage latch circuit $110_2$ through the bypass line $B_{11}$ and the multiplexer $700_1$. Similarly, the value (the second processing data $SOURCE_2$) of the stage latch circuit $210_1$ is held in the stage latch circuit $210_2$ through the bypass line $B_{12}$ and the multiplexer $800_1$.

Thereafter, at the second processing stage to the (x−2)-th processing stage (not shown), stage latch circuits are selected by multiplexers in a similar manner to that of the first processing stage. The first processing data $SOURCE_1$ and the second processing data $SOURCE_2$ are then sequentially passed through the respective processing stages. At the second processing stage to the (x−2)-th processing stage, the instruction $INST_x$ is held sequentially in the stage latch circuits.

At the (x−1)-th processing stage, at step SD8, the instruction $INST_x$ is being held in the stage latch circuit $310_{x-1}$. Therefore, the instruction decoder $320_{x-11}$ and the instruction decoder $320_{x-12}$ proceed to step SD11. When the instruction $INST_{x-11}$ and the instruction $INST_{x-12}$ are being held in the stage latch circuit $310_{x-1}$, the instruction decoder $320_{x-11}$ and the instruction decoder $320_{x-12}$ proceed to step SD9. At the step SD9, instruction decoder $320_{x-11}$ and the instruction decoder $320_{x-12}$ make the multiplexer $700_{x-1}$ and the multiplexer $800_{x-1}$ select the operator $120_{x-1}$ and the operator $220_{x-1}$ respectively.

The instruction decoder $320_{x-11}$ and the instruction decoder $320_{x-12}$ decode the instruction $INST_{x-11}$ and the instruction $INST_{x-12}$ to the operator $120_{x-1}$ and the operator $220_{x-1}$ respectively. The operator $120_{x-1}$ and the operator $220_{x-1}$ then execute the processing corresponding to the instruction $INST_{x-11}$ and the instruction $INST_{x-12}$ by using the value of the stage latch circuit $110_{x-1}$ and the value of the stage latch circuit $210_{x-1}$ respectively. At step SD10, the processing result of the operator $120_{x-1}$ and the processing result of the operator $220_{x-1}$ are held in the stage latch circuit $110_x$ and the stage latch circuit $210_x$ respectively.

At the step SD11, the instruction decoder $320_{x-11}$ and the instruction decoder $320_{x-12}$ make the multiplexer $700_{x-1}$ and the multiplexer $800_{x-1}$ select the stage latch circuit $110_{x-1}$ and the stage latch circuit $210_{x-1}$. At step SD12, the operator $120_{x-1}$ the operator $220_{x-1}$ do not operate. At step SD13, the value (the first processing data $SOURCE_1$) of the stage latch circuit $110_{x-1}$ is held in the stage latch circuit $110_x$ through the bypass line $B_{x-11}$ and the multiplexer $700_{x-1}$. Similarly, the value (the second processing data $SOURCE_2$) of the stage latch circuit $210_{x-1}$ is held in the stage latch circuit $110_x$ through the bypass line $B_{x-12}$ and the multiplexer $800_{x-1}$. At this time, the value of the stage latch circuit $310_{x-1}$ is held in the stage latch circuit $310_x$.

At the x-th processing stage, at step SD14 (refer to FIG. 11), the instruction $INST_x$ is being held in the stage latch circuit $310_x$. Therefore, the instruction decoder $320_x$ proceeds to step SD15. When the instruction other than the instruction $INST_x$ is being held in the stage latch circuit $310_x$, the instruction decoder $320_x$ proceeds to step SD17. At the step SD17, instruction decoder $320_x$ converts the instruction other than the instruction $INST_x$ into the through instruction $SRC_1$, and proceeds to step SD18. At the step SD18, the instruction decoder $320_x$ decodes the through instruction $SRC_1$ to the operator $120_x$. The operator $120_x$ then passes the value of the stage latch circuit $110_x$ through. At the next step SD19, the value of the stage latch circuit $110_x$ is held in the stage latch circuit $110_{x+1}$.

At the step SD15, the instruction decoder $320_x$ decodes the instruction $INST_x$ to the operator $120_x$. The operator $120_x$ then executes the processing according to the instruction $INST_x$ by using the value (the first processing data $SOURCE_1$) of the stage latch circuit $110_x$ and the value (the second processing data $SOURCE_2$) of the stage latch circuit $210_x$. At step SD16, the processing result of the operator $120_x$ is held in the stage latch circuit $110_{x+1}$. At this time, the value (the instruction $INST_x$) of the stage latch circuit $310_x$ is held in the stage latch circuit $310_{x+1}$.

At the (x+1)-th processing stage, at step SD20, the instruction $INST_x$ is being held in the stage latch circuit $310_{x+1}$. Therefore, the instruction decoder $320_{x+1}$ proceeds to step SD23. When the instruction $INST_{x+1}$ is being held in the stage latch circuit $310_{x+1}$, the instruction decoder $320_{x+1}$ proceeds to step SD21. At the step SD21, the instruction decoder $320_{x+1}$ decodes the instruction $INST_{x+1}$ to the operator $120_{x+1}$. The operator $120_{x+1}$ then executes the processing according to the instruction $INST_{x+1}$ by using the value of the stage latch circuit $110_{x+1}$. At step SD22, the processing result of the operator $120_{x+1}$ is held in the stage latch circuit $110_{x+2}$.

At the step SD23, the instruction decoder $320_{x+1}$ converts the instruction other than the instruction $INST_{x+1}$ (the instruction $INST_x$) into the through instruction $SRC_1$, and proceeds to step SD24. At the step SD24, the instruction decoder $320_{x+1}$ decodes the through instruction $SRC_1$ to the operator $120_{x+1}$. The operator $120_{x+1}$ then passes the value (the processing result of the operator $120_x$) of the stage latch circuit $110_{x+1}$ through. At the next step SD25, the value of the stage latch circuit $110_{x+1}$ is held in the stage latch circuit $110_{x+2}$. At this time, the value of the stage latch circuit $310_{x+1}$ is held in the stage latch circuit $310_{x+2}$. Thereafter, at the (x+2)-th processing stage to the (n−1)-th processing stage (not shown), the through instruction $SRC_1$ is decoded in a similar manner to that of the (x+1)-th processing stage. Thus, the processing result of the operator $120_x$ is sequentially passed through the respective processing stages. At the (x+2)-th processing stage to the (n−1)-th processing stage, the instruction $INST_x$ is sequentially held in the stage latch circuits.

At the n-th processing stage, at step SD26 (refer to FIG. 12), the instruction $INST_x$ is being held in the stage latch circuit $310_n$. Therefore, the instruction decoder $320_n$ proceeds to step SD29. When the instruction $INST_n$ is being held in the stage latch circuit $310_n$, the instruction decoder $320_n$ proceeds to step SD27. At the step SD27, instruction decoder $320_n$ decodes the instruction $INST_n$ to the operator $120_n$. The operator $120_n$ then executes the processing according to the instruction $INST_n$ by using the value of the stage latch circuit $110_n$. At the next step SD28, the processing result of the operator $120_n$ is held in the stage latch circuit $110_{n+1}$.

At the step SD29, the instruction decoder $320_n$ converts the instruction other than the instruction $INST_n$ into the through instruction $SRC_1$, and proceeds to step SD30. At the step SD30, the instruction decoder $320_n$ decodes the through instruction $SRC_1$ to the operator $120_n$. Then, the operator $120_n$ passes the value (the processing result of the operator $120_x$) of the stage latch circuit $110_n$ through this operator. At step SD31, the value of the stage latch circuit $110_n$ is held in the stage latch circuit $110_{n+1}$. At the next step SD32, the processing-result register 500 holds the processing result of the operator $120_x$ as the processing result of the pipeline operator.

Next, the operation when the instruction $INST_{x+1}$ has been dispatched to the operator $120_{x+1}$ at the (x+1)-th processing stage will be explained. At the step SD1 shown in FIG. 10, the first processing data $SOURCE_1$, the second processing data $SOURCE_2$ and the instruction $INST_{x+1}$ are held in the processing-data register 100, the processing-data register 200 and the instruction register 300 respectively. Thus, the first processing data $SOURCE_1$, the second processing data $SOURCE_2$ and the instruction $INST_{x+1}$ are held in the stage latch circuit $110_1$, the stage latch circuit $210_1$ and the stage latch circuit $310_1$ respectively.

Thereafter, at the first processing stage to the (x−1)-th processing stage, stage latch circuits are selected by multiplexers in a similar manner to that of the above-described operation (at the step SD2, the step SD5 to the step SD8, and the step SD11 to the step SD13). Thus, the first processing data SOURCE$_1$ and the second processing data SOURCE$_2$ are sequentially passed through the respective operators. At the first processing stage to the (x−1)-th processing stage, the instruction INST$_{x+1}$ is sequentially held in the stage latch circuits. Therefore, at the x-th processing stage, the stage latch circuit $110_x$, the stage latch circuit $210_x$ and the stage latch circuit $310_x$ hold the first processing data SOURCE$_1$, the second processing data SOURCE$_2$ and the instruction INST$_{x+1}$ respectively.

At the x-th processing stage, at the step SD14 (refer to FIG. 11), the instruction INST$_{x+1}$ is being held in the stage latch circuit $310_x$. Therefore, the instruction decoder $320_x$ proceeds to step SD17. At the step SD17, instruction decoder $320_x$ converts the instruction INST$_{x+1}$ into the through instruction SRC$_1$, and then proceeds to the step SD18. At the step SD18, the instruction decoder $320_x$ decodes the through instruction SRC$_1$ to the operator $120_x$. The operator $120_x$ then passes the value of the stage latch circuit $110_x$ through. At the next step SD19, the value of the stage latch circuit $110_x$ is held in the stage latch circuit $110_{x+1}$.

At the (x+1)-th processing stage, at the step SD20, the instruction INST$_{x+1}$ is being held in the stage latch circuit $310_{x+1}$. Therefore, the instruction decoder $320_{x+1}$ proceeds to step SD21. At the step SD21, the instruction decoder $320_{x+1}$ decodes the instruction INST$_{x+1}$ to the operator $120_{x+1}$. The operator $120_{x+1}$ then executes the processing according to the instruction INST$_{x+1}$ by using the value of the stage latch circuit $110_{x+1}$. At the next step SD22, the processing result of the operator $120_{x+1}$ is held in the stage latch circuit $110_{x+2}$.

At the n-th processing stage, at the step SD26 (refer to FIG. 12), the instruction INST$_{x+1}$ is being held in the stage latch circuit $310_n$. Therefore, the instruction decoder $320_n$ proceeds to the step SD29. At the step SD29, instruction decoder $320_n$ converts the instruction INST$_{x+1}$ into the through instruction SRC$_1$, and then proceeds to step SD30. At the step SD30, the instruction decoder $320_n$ decodes the through instruction SRC$_1$ to the operator $120_n$. The operator $120_n$ passes the value (the processing result of the operator $120_{x+1}$) of the stage latch circuit $110_n$, through this operator. At step SD31, the value of the stage latch circuit $110_n$ is held in the stage latch circuit $110_{n+1}$. At the next step SD32, the processing-result register 500 holds the processing result of the operator $120_{x+1}$ as the processing result of the pipeline operator.

As explained above, according to the fourth embodiment, at the time of executing the processing at the x-th processing stage, the through instruction SRC$_1$ is decoded at the (x+1)-th processing stages to the n-th processing stage. Thus, the processing results of the operator $120_x$ at the x-th processing stage are passed through. Therefore, it is possible to reduce both the stage latch circuits and the wiring volume at the (x+1)-th processing stage to the n-th processing stage from the conventional levels. As a result, according to the fourth embodiment, it is possible to reduce both hardware volume and power consumption.

In the first embodiment, there has been explained a case where the operator $120_1$ at the first processing stage and the operator $120_2$ at the second processing stage shown in FIG. 1 execute the processing respectively based on the instructions (the instruction INST$_1$ and the instruction INST$_2$) that have no mutual relationship. However, it is also possible to provide a plurality of operators that execute the processing based on the instruction that has a mutual relationship. The instruction having a mutual relationship means the instruction that is dispatched to both the operator $120_1$ and the operator $120_2$ and that makes the operator $120_2$ execute the processing by using a processing result of the operator $120_1$. This case will be explained in detail as a fifth embodiment.

Figure 13:
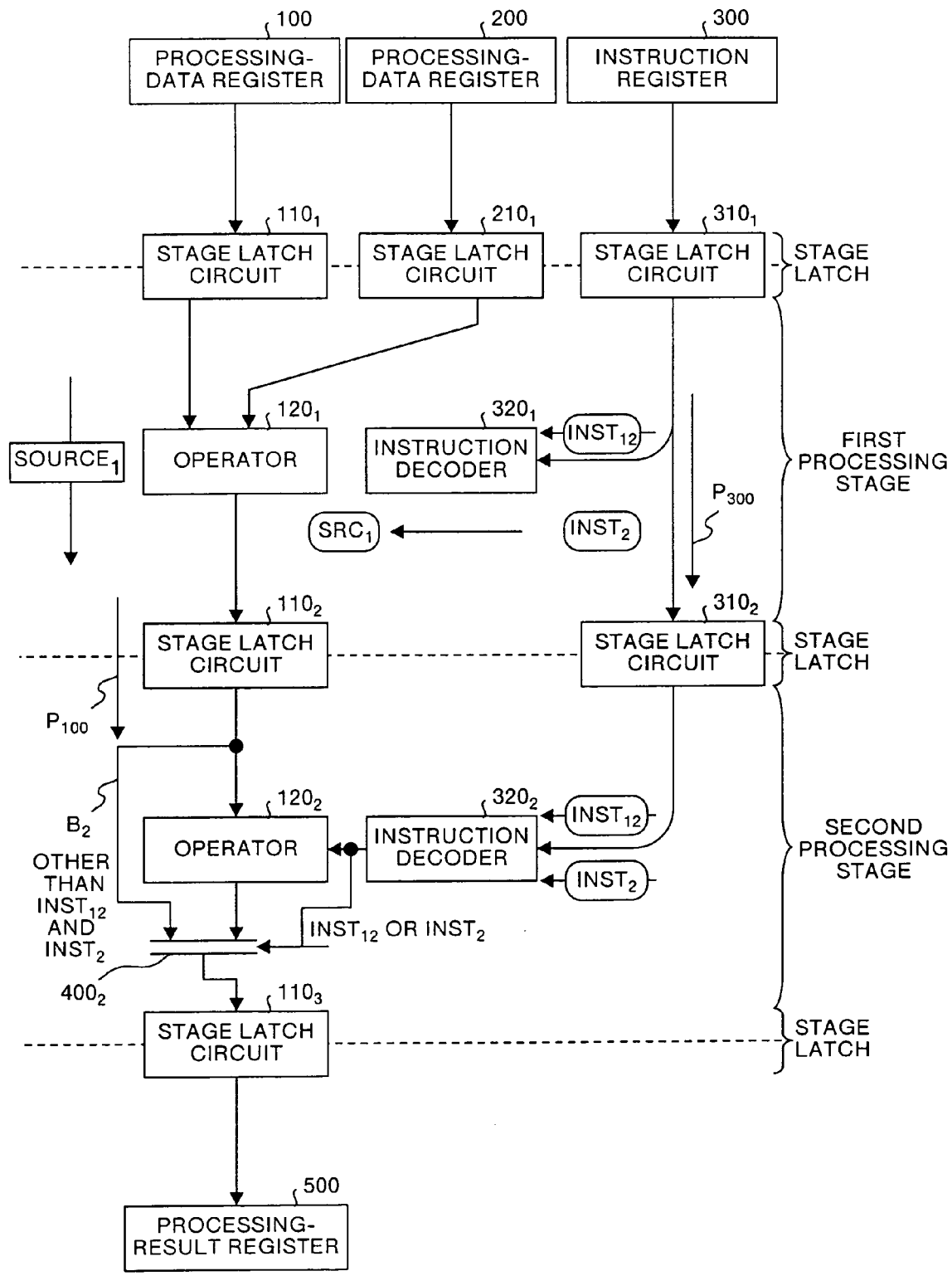
FIG. 13 is a block diagram that shows a structure of a fifth embodiment of the present invention.

FIG. 13 is a block diagram that shows a structure of a fifth embodiment of the present invention. In this figure, parts corresponding to those in FIG. 1 are attached with identical reference symbols and the explanation will be omitted. However, the functions of the instruction decoder $320_1$, the operator $120_1$ at the first processing stage, the instruction decoder $320_2$ and the operator $120_2$ at the second processing stage shown in FIG. 13 are different from the functions of those corresponding parts shown in FIG. 1.

At the first processing stage shown in FIG. 13, the instruction decoder $320_1$ decodes an instruction INST$_{12}$ from the stage latch circuit $310_1$. The instruction INST$_{12}$ is the instruction dispatched to both the operator $120_1$ and the operator $120_2$. This instruction INST$_{12}$ makes the operator $120_2$ execute the processing by using the processing result of the operator $120_1$. In other words, the instruction INST$_{12}$ is the instruction that provides a correlation between the processing of the operator $120_1$ and the processing of the operator $120_2$. When the instruction INST$_{12}$ has been decoded, the operator $120_1$ executes the processing according to the instruction INST$_{12}$ by using the value (the first processing data SOURCE$_1$) of the stage latch circuit $110_1$ and the value (the second processing data) of the stage latch circuit $210_1$. The operator $120_1$ then outputs the result of the processing to the stage latch circuit $110_2$.

When the instruction other than the instruction INST$_{12}$ (the instruction INST$_2$ in this case) has been input, the instruction decoder $320_1$ converts this instruction into a through instruction SRC$_1$, and decodes this through instruction SRC$_1$ to the operator $120_1$. When the through instruction SRC$_1$ has been decoded, the operator $120_1$ passes only the first processing data SOURCE$_1$ through out of the two processing data (the first processing data SOURCE$_1$ and the second processing data).

At the second processing stage, the instruction decoder $320_2$ decodes the instruction INST$_2$ in addition to the instruction INST$_{12}$. In other words, instruction decoder $320_2$ decodes the instruction INST$_{12}$ from the stage latch circuit $310_2$. When the instruction INST$_{12}$ has been decoded, the operator $120_2$ executes the processing according to the instruction INST$_{12}$ by using the value (the processing result of the operator $120_1$) of the stage latch circuit $110_2$, and outputs the processing result.

The instruction decoder $320_2$ decodes the instruction INST$_2$ from the stage latch circuit $310_2$. The instruction INST$_2$ is the instruction to make the operator $120_2$ execute the processing independent of the operator $120_1$. When the instruction INST$_2$ has been decoded, the operator $120_2$ executes the processing according to the instruction INST$_2$ by using the value (the first processing data SOURCE$_1$) of the stage latch circuit $110_2$, and outputs the processing result.

The multiplexer $400_2$ outputs the processing result of the operator $120_2$ when the instruction INST$_{12}$ or the instruction INST$_2$ has been decoded by the instruction decoder $320_2$. On the other hand, the multiplexer $400_2$ outputs the value of the stage latch circuit $110_2$ when the instruction other than the instruction INST$_{12}$ and the instruction INST$_2$ has been input to the instruction decoder $320_2$. The stage latch circuit $110_3$ holds the processing result of the operator $120_2$ or the value of the stage latch circuit $110_2$ according to the changeover state of the multiplexer $400_2$. A processing-result register 500 holds a value of the stage latch circuit $110_3$, that is, a processing result (a destination operand) of the pipeline operator.

Figure 14:
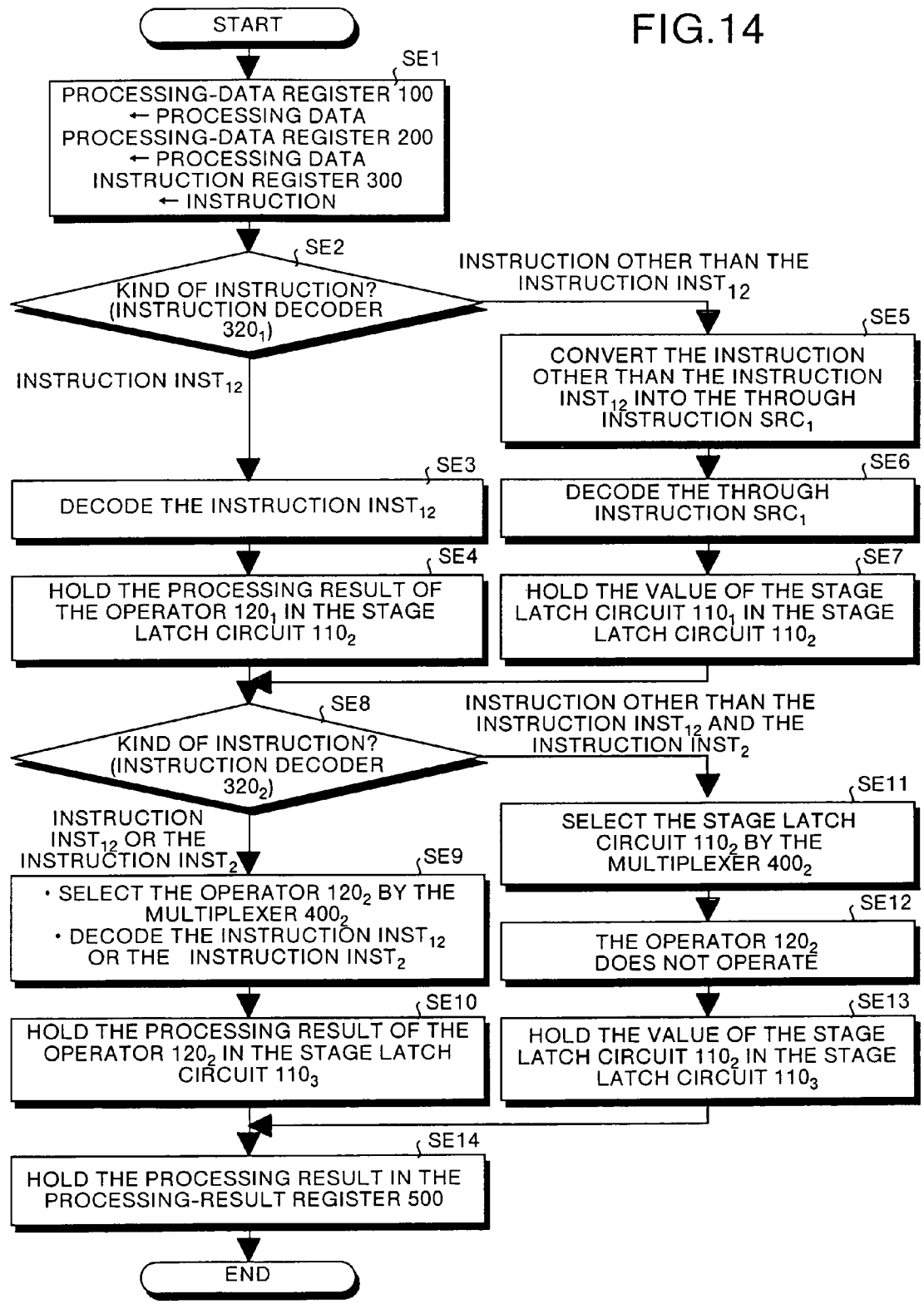
FIG. 14 is a flowchart that explains the operation of the fifth embodiment.

The operation of the fifth embodiment will be explained with reference to a flowchart shown in FIG. 14. The operation when the instruction $INST_{12}$ has been dispatched will be explained first. At step SE1 shown in FIG. 14, the first processing data $SOURCE_1$, the second processing data and the instruction $INST_{12}$ are held in the processing-data register 100, the processing-data register 200 and the instruction register 300 respectively. Thus, the first processing data $SOURCE_1$, the second processing data and the instruction $INST_{12}$ are held in the stage latch circuit $110_1$, the stage latch circuit $210_1$ and the stage latch circuit $310_1$ respectively.

At the next step SE2, the instruction decoder $320_1$ decides the kind of the instruction held in the stage latch circuit $310_1$. In this case, the instruction $INST_{12}$ is being held in the stage latch circuit $310_1$. Therefore, the instruction decoder $320_1$ proceeds to step SE3. At the step SE3, the instruction decoder $320_1$ decodes the instruction $INST_{12}$ from the stage latch circuit $310_1$. The operator $120_1$ thus executes the processing according to the instruction $INST_{12}$ by using the value (the first processing data $SOURCE_1$) of the stage latch circuit $110_1$ and the value (the second processing data) of the stage latch circuit $210_1$.

At the next step SE4, the processing result of the operator $120_1$ is held in the stage latch circuit $110_2$. At this time, the value (the instruction $INST_{12}$) of the stage latch circuit $310_1$ is held in the stage latch circuit $310_2$. At the next step SE8, the instruction $INST_{12}$ is being held in the stage latch circuit $310_2$. Therefore, the instruction decoder $320_2$ proceeds to step SE9. When the instruction other than the instruction $INST_{12}$ and the instruction $INST_2$ is being held in the stage latch circuit $310_2$, the instruction decoder $320_2$ proceeds to step SE11. At the step SE11, the instruction decoder $320_2$ makes the multiplexer $400_2$ select the stage latch circuit $110_2$. Thus, at step SE12, the operator $120_2$ does not operate. At step SE13, the value of the stage latch circuit $110_2$ is held in the stage latch circuit $110_3$ through a bypass line $B_2$ and the multiplexer $400_2$.

At the step SE9, the instruction decoder $320_2$ makes the multiplexer $400_2$ select the operator $120_2$. The instruction decoder $320_2$ decodes the instruction $INST_{12}$ from the stage latch circuit $310_2$. The operator $120_2$ then executes the processing according to the instruction $INST_{12}$ by using the value (the processing result of the operator $120_1$) of the stage latch circuit $110_2$. At the next step SE10, the processing result of the stage latch circuit $120_2$ is held in the stage latch circuit $110_3$. At the next step SE14, the processing-result register 500 holds the processing result of the operator $120_2$ as the processing result of the pipeline operator.

The operation when the instruction $INST_2$ has been dispatched will be explained next. At the step SE1 shown in FIG. 14, the first processing data $SOURCE_1$, the second processing data and the instruction $INST_2$ are held in the processing-data register 100, the processing-data register 200 and the instruction register 300 respectively. Thus, the first processing data $SOURCE_1$, the second processing data and the instruction $INST_2$ are held in the stage latch circuit $110_1$, the stage latch circuit $210_1$ and the stage latch circuit $310_1$ respectively.

At the next step SE2, the $INST_2$ is being held in the stage latch circuit $310_1$. Therefore, the instruction decoder $320_1$ proceeds to step SE5. At the step SE5, the instruction decoder $320_1$ decodes the value (the instruction $INST_2$) of the stage latch circuit $310_1$, and converts the instruction $INST_2$ into the through instruction $SRC_1$, and then proceeds to step SE6. At the step SE6, the instruction decoder $320_1$ decodes the through instruction $SRC_1$ to the operator $120_1$. Thus, the operator $120_1$ passes the value (the first processing data $SOURCE_1$) of the stage latch circuit $110_1$ through this operator.

At the next step SE7, the value (the first processing data $SOURCE_1$) of the stage latch circuit $110_1$ is held in the stage latch circuit $110_2$. At this time, the value (the instruction $INST_1$) of the stage latch circuit $310_1$ is held in the stage latch circuit $310_2$. At the next step SE8, the $INST_2$ is being held in the stage latch circuit $310_2$. Therefore, the instruction decoder $320_2$ proceeds to step SE9.

At the step SE9, the instruction decoder $320_2$ makes the multiplexer $400_2$ select the stage latch circuit $110_2$. The instruction decoder $320_2$ decodes the instruction $INST_2$ from the stage latch circuit $310_2$. The operator $120_2$ then executes the processing according to the instruction $INST_2$ by using the value (the first processing data $SOURCE_1$) of the stage latch circuit $110_2$. At the next step SE10, the processing result of the stage latch circuit $120_2$ is held in the stage latch circuit $110_3$. At the next step SE14, the processing-result register 500 holds the processing result of the operator $120_2$ as the processing result of the pipeline operator.

As explained above, according to the fifth embodiment, the instruction decoder $320_1$ converts the instruction other than the instruction $INST_{12}$ and the instruction $INST_2$ into the through instruction $SRC_1$. The operator $120_1$ passes the first processing data $SOURCE_1$ through this operator. There is provided the bypass line $B_2$ at the second processing stage. Therefore, it is possible to share the stage latch circuit $110_2$ between the operator $120_1$ and the operator $120_2$, and it is also possible to reduce the wiring volume. As a result, according to the fifth embodiment, the sharing of the stage latch circuit $110_2$ makes it possible to reduce both hardware volume and power consumption. Further, according to the fifth embodiment, the operator $120_2$ at the second processing stage can execute the processing independent of the operator $120_1$ at the first processing stage.

In the second embodiment, there has been explained a case where the operator $120_1$ at the first processing stage and the operator $120_2$ at the second processing stage shown in FIG. 3 execute the processing respectively based on the instructions (the instruction $INST_1$ and the instruction $INST_2$) that have no mutual relationship. However, it is also possible to provide a plurality of operators that execute the processing based on the instruction that has a mutual relationship in a similar manner to that of the fifth embodiment. This case will be explained in detail as a sixth embodiment.

Figure 15:
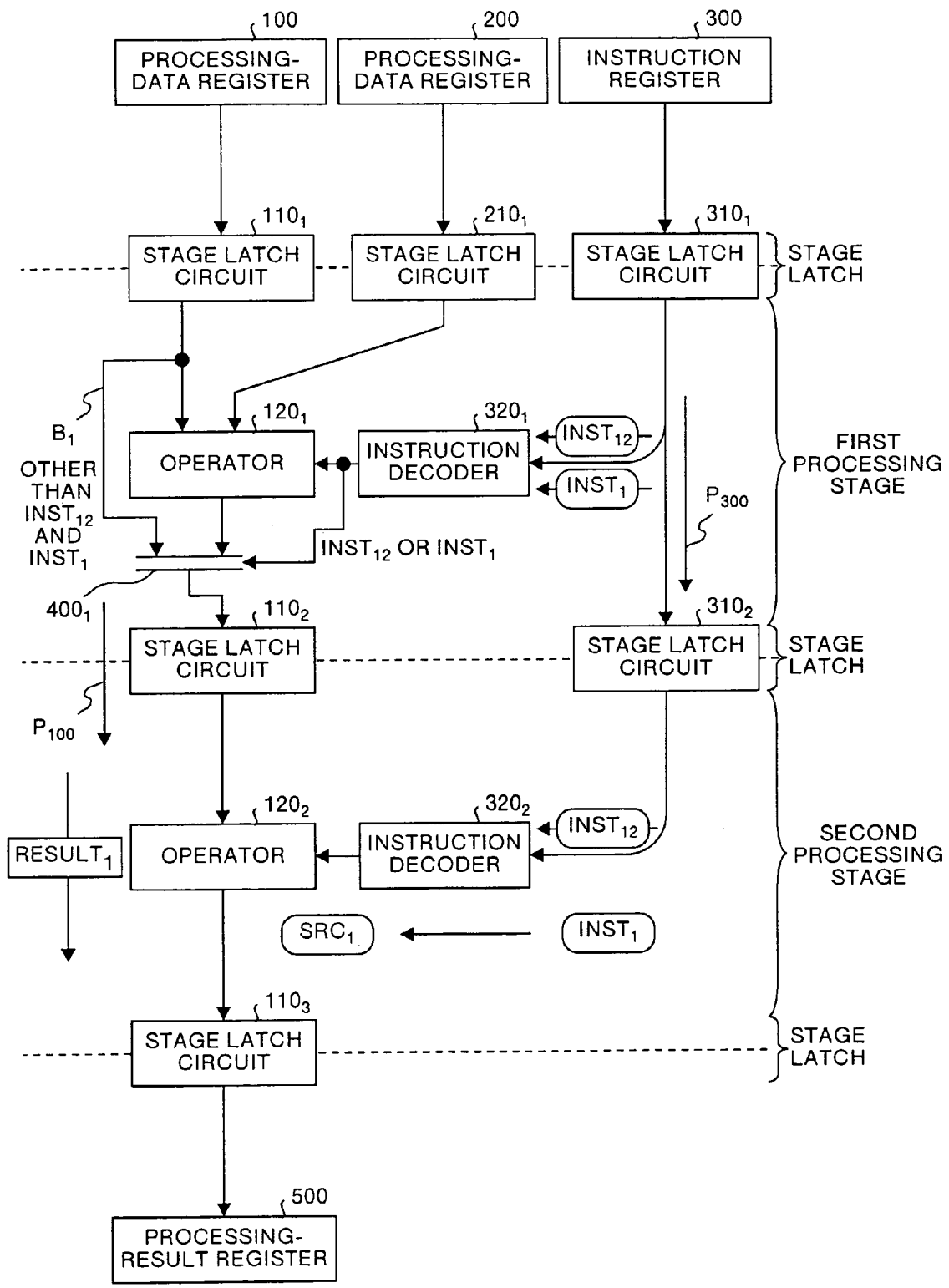
FIG. 15 is a block diagram that shows a structure of a sixth embodiment of the present invention.

FIG. 15 is a block diagram that shows a structure of a sixth embodiment of the present invention. In this drawing, parts corresponding to those in FIG. 3 are attached with identical reference symbols and the explanation will be omitted. However, the functions of the instruction decoder $320_1$, the operator $120_1$ at the first processing stage, the instruction decoder $320_2$ and the operator $120_2$ at the second processing stage shown in FIG. 15 are different from the functions of those parts shown in FIG. 3.

At the first processing stage shown in FIG. 15, the instruction decoder $320_1$ decodes an instruction $INST_{12}$ from the stage latch circuit $310_1$. The instruction $INST_{12}$ is the instruction dispatched to both the operator $120_1$ and the operator $120_2$. This instruction $INST_{12}$ makes the operator $120_2$ execute the processing by using the processing result of the operator $120_1$. In other words, the instruction $INST_{12}$ is the instruction that provides a correlation between the processing of the operator $120_1$ and the processing of the operator $120_2$. When the instruction $INST_{12}$ has been decoded, the operator $120_1$ executes the processing according to the instruction $INST_{12}$ by using the value (the first processing data) of the stage latch circuit $110_1$ and the value (the second processing data) of the stage latch circuit $210_1$. The operator $120_1$ then outputs the processing result $RESULT_1$ to the stage latch circuit $110_2$.

The instruction decoder $320_1$ decodes the instruction $INST_1$ in addition to the instruction $INST_{12}$. The instruction $INST_1$ is the instruction to make the operator $120_1$ execute the processing independent of the operator $120_2$. In other words, instruction decoder $320_1$ decodes the instruction $INST_1$ from the stage latch circuit $310_1$. When the instruction $INST_1$ has been decoded, the operator $120_1$ executes the processing according to the instruction $INST_1$ by using the value (the first processing data) of the stage latch circuit $110_1$ and the value (the second processing data) of the stage latch circuit $210_1$, and outputs the processing result $RESULT_1$.

The multiplexer $400_1$ is changeover controlled by the instruction decoder $320_1$. The multiplexer $400_1$ outputs the processing result $RESULT_1$ of the operator $120_1$ when the instruction $INST_{12}$ or the instruction $INST_1$ has been decoded by the instruction decoder $320_1$. On the other hand, the multiplexer $400_1$ outputs the value of the stage latch circuit $110_1$ when the instruction other than the instruction $INST_{12}$ and the instruction $INST_1$ has been input to the instruction decoder $320_1$.

At the second processing stage, the instruction decoder $320_2$ decodes the instruction $INST_{12}$ from the stage latch circuit $310_2$. When the instruction $INST_{12}$ has been decoded, the operator $120_2$ executes the processing according to the instruction $INST_{12}$ by using the value (the processing result $RESULT_1$) of the stage latch circuit $110_2$, and outputs the processing result to the stage latch circuit $110_3$.

When the instruction other than the instruction $INST_{12}$ has been input, the instruction decoder $320_2$ converts this instruction into the through instruction $SRC_1$, and decodes this through instruction $SRC_1$ to the operator $120_2$. When the through instruction $SRC_1$ has been decoded, the operator $120_2$ passes the value of the stage latch circuit $110_2$ through this operator.

Figure 16:
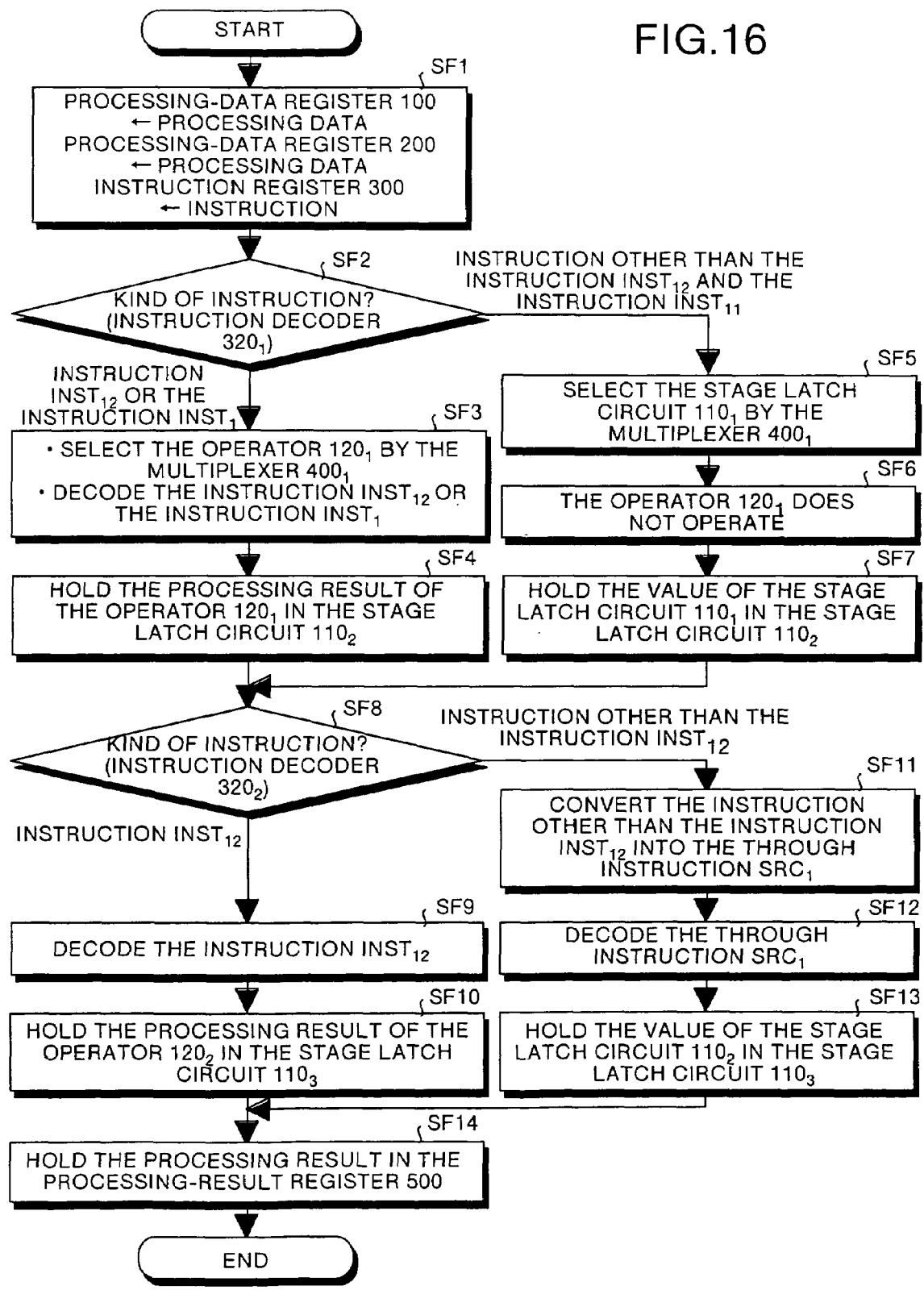
FIG. 16 is a flowchart that explains the operation of the sixth embodiment.

The operation of the fifth embodiment will be explained with reference to a flowchart shown in FIG. 16. The operation when the instruction $INST_{12}$ has been dispatched will be explained first. At step SF1 shown in FIG. 16, the first processing data, the second processing data and the instruction $INST_{12}$ are held in the processing-data register 100, the processing-data register 200 and the instruction register 300 respectively. Thus, the first processing data, the second processing data and the instruction $INST_{12}$ are held in the stage latch circuit $110_1$, the stage latch circuit $210_1$ and the stage latch circuit $310_1$ respectively.

At the next step SF2, the instruction decoder $320_1$ decides the kind of the instruction held in the stage latch circuit $310_1$. In this case, the instruction $INST_{12}$ is being held in the stage latch circuit $310_1$. Therefore, the instruction decoder $320_1$ proceeds to step SF3. When the instruction other than the instruction $INST_{12}$ and the instruction $INST_1$ is being held in the stage latch circuit $310_1$, the instruction decoder $320_1$ proceeds to step SF5. At the step SF5, the instruction decoder $320_1$ makes the multiplexer $400_1$ select the stage latch circuit $110_1$. At step SF6, the operator $120_1$ does not operate. At step SF7, the value (the first processing data) of the stage latch circuit $110_1$ is held in the stage latch circuit $110_2$ through the bypass line $B_1$ and the multiplexer $400_1$.

At the step SF3, the instruction decoder $320_1$ makes the multiplexer $400_1$ select the operator $120_1$. The instruction decoder $320_1$ then decodes the instruction. $INST_{12}$ to the operator $120_1$. The operator $120_1$ thus executes the processing according to the instruction $INST_{12}$ by using the value (the first processing data) of the stage latch circuit $110_1$ and the value (the second processing data) of the stage latch circuit $210_1$. At the next step SF4, the processing result $RESULT_1$ of the operator $120_1$ is held in the stage latch circuit $110_2$ through the multiplexer $400_1$. In parallel with this, the value (the instruction $INST_{12}$) of the stage latch circuit $310_1$ is held in the stage latch circuit $310_2$.

At the next step SF8, the instruction decoder $320_2$ decides the kind of the instruction held in the stage latch circuit $310_2$. In this case, the instruction $INST_{12}$ is being held in the stage latch circuit $310_2$. Therefore, the instruction decoder $320_2$ proceeds to step SF9. At the step SF9, the instruction decoder $320_2$ decodes the instruction $INST_{12}$ to the operator $120_2$. The operator $120_2$ then executes the processing according to the instruction $INST_{12}$ by using the value (the processing result $RESULT_1$) of the stage latch circuit $110_2$. At the next step SF10, the processing result of the operator $120_2$ is held in the stage latch circuit $110_3$. At the next step SF14, the processing-result register 500 holds the processing result of the operator $120_2$ as the processing result of the pipeline operator.

The operation when the instruction $INST_1$ has been dispatched will be explained next. At the step SF1 shown in FIG. 16, the first processing data, the second processing data and the instruction $INST_1$ are held in the processing-data register 100, the processing-data register 200 and the instruction register 300 respectively. Thus, the first processing data, the second processing data and the instruction $INST_1$ are held in the stage latch circuit $110_1$, the stage latch circuit $210_1$ and the stage latch circuit $310_1$ respectively.

At the next step SF2, the $INST_1$ is being held in the stage latch circuit $310_1$. Therefore, the instruction decoder $320_1$ proceeds to step SF3. At the step SF3, the instruction decoder $320_1$ makes the multiplexer $400_1$ select the operator $120_1$. The multiplexer $320_1$ decodes the instruction $INST_1$ to the operator $120_1$. The operator $120_1$ thus executes the processing according to the instruction $INST_1$ by using the value (the first processing data) of the stage latch circuit $110_1$ and the value (the second processing data) of the stage latch circuit $210_1$. At the next step SF4, the processing result $RESULT_1$ of the operator $120_1$ is held in the stage latch circuit $110_2$ through the multiplexer $400_1$. In parallel with this, the value (the instruction $INST_1$) of the stage latch circuit $310_1$ is held in the stage latch circuit $310_2$.

At the next step SF8, the $INST_1$ is being held in the stage latch circuit $310_2$. Therefore, the instruction decoder $320_2$ proceeds to step SF11. At the step SF11, the instruction decoder $320_2$ decodes the value (the instruction $INST_1$) of the stage latch circuit $310_2$, and converts the instruction $INST_1$ into the through instruction $SRC_1$. Then, the instruction decoder $320_2$ proceeds to step SF12. At the step SF12, the instruction decoder $320_2$ decodes the through instruction $SRC_1$ to the operator $120_2$. The operator $120_2$ then passes the value (the processing result $RESULT_1$) of the stage latch circuit $110_2$ through this operator. At the next step SF13, the value (the processing result $RESULT_1$) of the stage latch circuit $110_2$ is held in the stage latch circuit $110_3$. At the next step SF14, the processing-result register 500 holds the processing result $RESULT_1$ of the operator $120_1$ as the processing result of the pipeline operator.

As explained above, according to the sixth embodiment, the multiplexer $400_1$ is provided at the first processing stage, and the value of the stage latch circuit $110_1$ or the processing result of the operator $120_1$ is held in the stage latch circuit $110_2$. At the same time, the instruction decoder $320_2$ converts the instruction other than the instruction $INST_{12}$ into the through instruction $SRC_1$, and the operator $120_2$ passes the processing result $RESULT_1$ of the operator $120_1$ through this operator. Therefore, it is possible to reduce both the stage latch circuits and the wiring volume at the downstream of the operator $120_2$. As a result, according to the sixth embodiment, it is possible to reduce both hardware volume and power consumption. Further, according to the sixth embodiment, the operator $120_1$ at the first processing stage can execute the processing independent of the operator $120_2$ at the second processing stage.

In the third embodiment, there has been explained a case where at the first processing stage to the n-th processing stage shown in FIG. 5, the operators execute the processing based on the instructions that have no mutual relationship. However, it is also possible to provide a plurality of operators that execute the processing based on the instruction that has a mutual relationship. This case will be explained in detail as a seventh embodiment.

Figure 17:
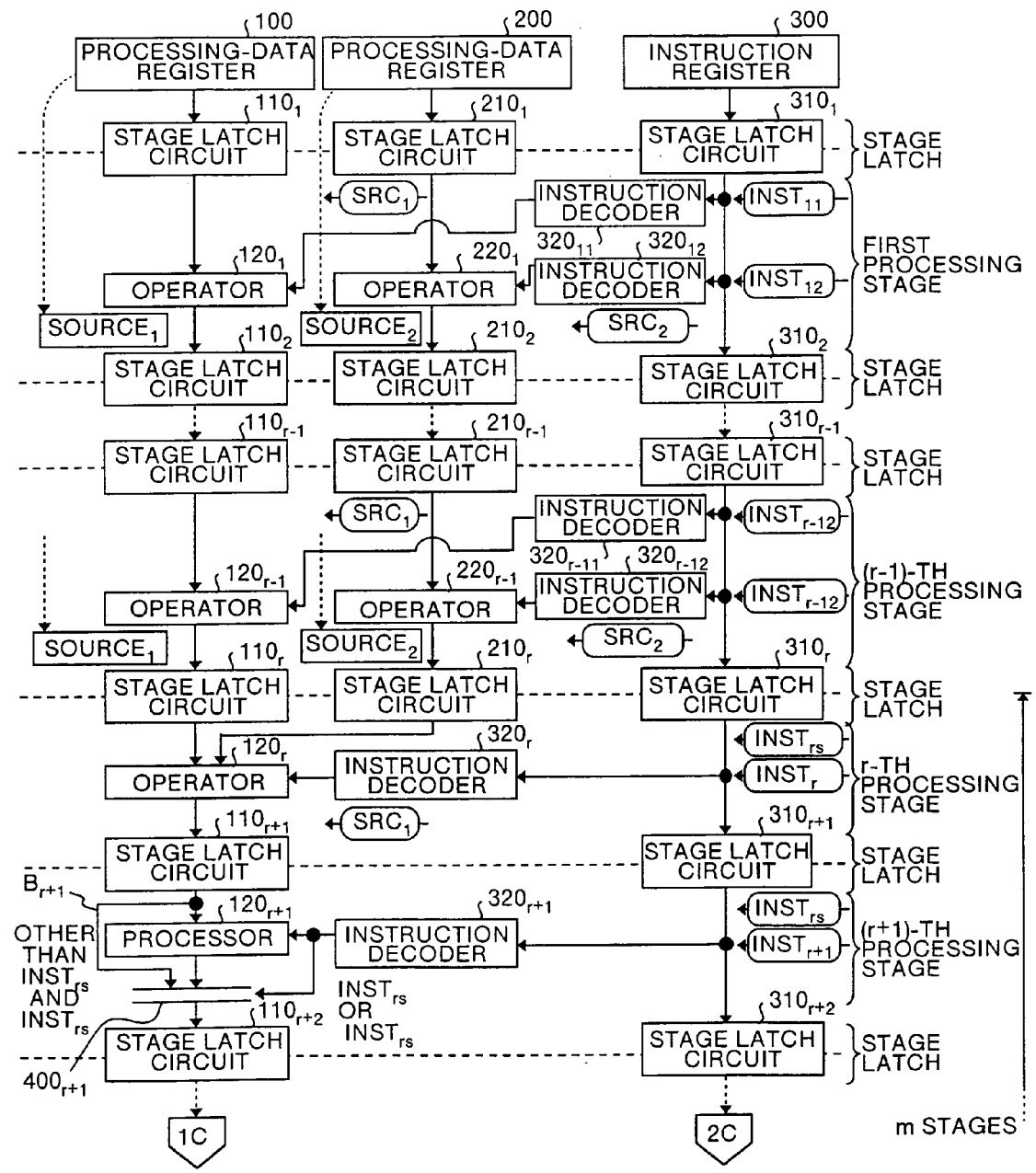
FIG. 17 is a block diagram that shows a structure of a seventh embodiment of the present invention.
Figure 18:
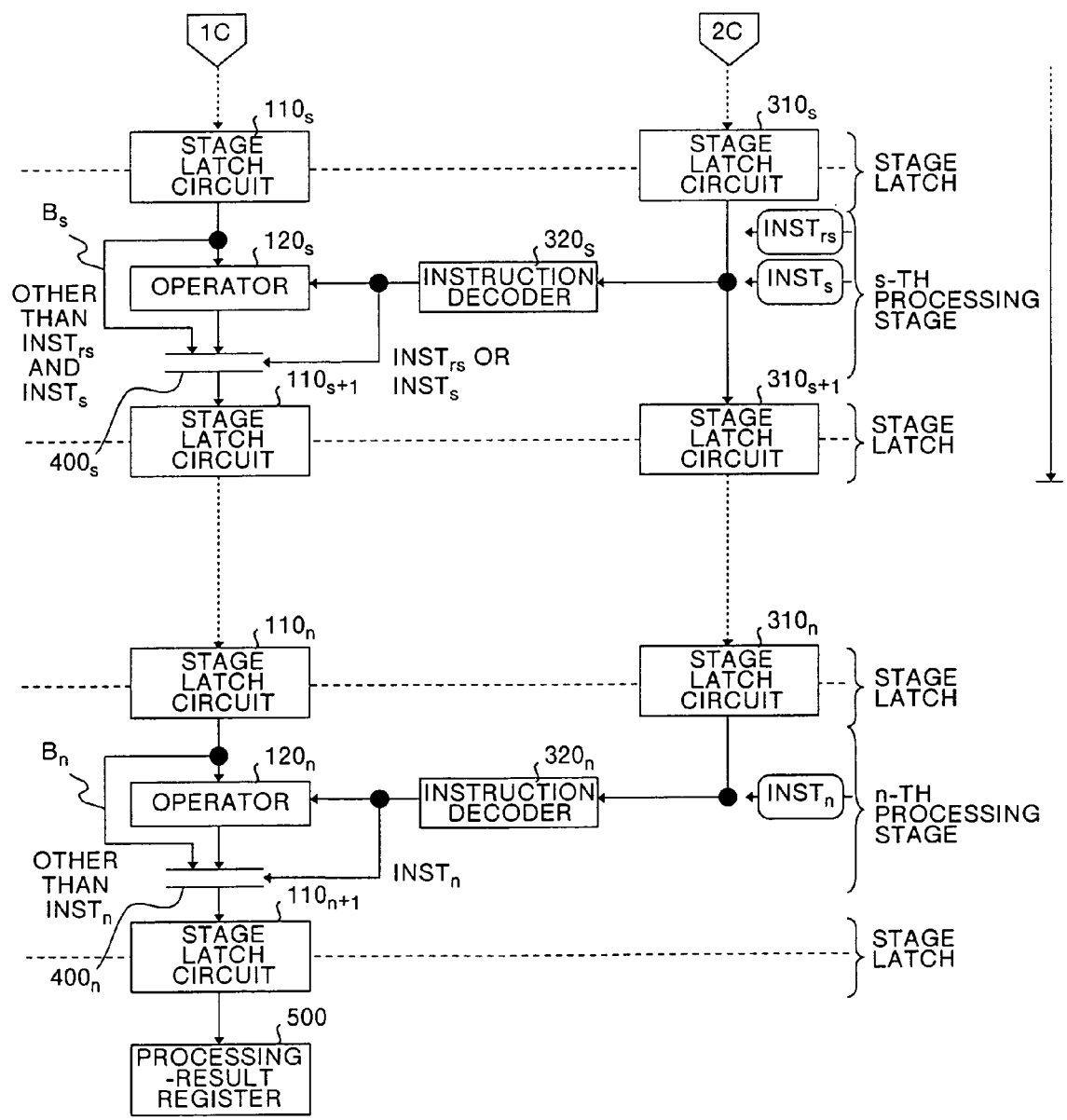
FIG. 18 is a block diagram that shows the structure of the seventh embodiment of the present invention.

FIG. 17 and FIG. 18 are block diagrams that show a structure of a seventh embodiment of the present invention. In these figures, parts corresponding to those in FIG. 5 are attached with identical reference symbols and the explanation will be omitted. FIG. 17 shows (r−1)-th processing stage, r-th processing stage, (r+1)-th processing stage and s-th processing stage (1<r<s<n) in place of the (x−1)-th processing stage to the (x+1)-th processing stage shown in FIG. 5. The structures of the (r−1)-th processing stage, the r-th processing stage, and the (r+1)-th processing stage (the s-th processing stage) shown in FIG. 17 are similar to the structures of the (x−1)-th processing stage, the x-th processing stage and the (x+1)-th processing stage shown in FIG. 5 respectively. However, the functions of the instruction decoders at the (r−1)-th processing stage, the r-th processing stage, and the (r+1)-th processing stage shown in FIG. 17 are different from the functions of the instruction decoders shown in FIG. 5.

In other words, at the (r−1)-th processing stage shown in FIG. 17, the stage latch circuit $110_{x-1}$ holds the first processing data $SOURCE_1$ or the processing result of the (r−2)-th processing stage (not shown). The stage latch circuit $210_{r-1}$ holds the second processing data $SOURCE_2$ or the processing result of the (r−2)-th processing stage (not shown). The stage latch circuit $310_{r-1}$ holds the value of the stage latch circuit at the (r−2)-th processing stage (not shown). The instruction decoder $320_{r-11}$ decodes the instruction $INST_{r-11}$ from the stage latch circuit $310_{r-1}$.

When the instruction $INST_{r-11}$ has been decoded, the operator $120_{r-1}$ executes the processing according to the instruction $INST_{r-11}$ by using the value of the stage latch circuit $110_{r-11}$ and outputs the result of the processing to the stage latch circuit $110_r$. When the instruction other than the instruction $INST_{r-11}$ has been input, the instruction decoder $320_{r-11}$ converts this instruction into a through instruction $SRC_1$, and decodes this through instruction $SRC_1$ to the operator $120_{r-1}$. When the through instruction $SRC_1$ has been decoded, the operator $120_{r-1}$ passes the value of the stage latch circuit $110_{r-1}$ through this operator.

The instruction decoder $320_{r-12}$ decodes the instruction $INST_{r-12}$ from the stage latch circuit $310_{r-1}$. When the instruction $INST_{r-12}$ has been decoded, the operator $220_{r-1}$ executes the processing according to the instruction $INST_{r-12}$ by using the value of the stage latch circuit $210_{r-1}$ and outputs the result of the processing to the stage latch circuit $210_r$. When the instruction other than the instruction $INST_{r-12}$ has been input, the instruction decoder $320_{r-12}$ converts this instruction into a through instruction $SRC_2$, and decodes this through instruction $SRC_2$ to the operator $220_{r-1}$. When this through instruction $SRC_2$ has been decoded, the operator $220_{r-1}$ passes the value of the stage latch circuit $210_{r-1}$ through this operator.

At the r-th processing stage, the stage latch circuit $110_r$ holds the first processing data $SOURCE_1$ or the processing result of the operator $120_{r-1}$ at the (r−1)-th processing stage. The stage latch circuit $210_r$ holds the second processing data $SOURCE_2$ or the processing result of the operator $220_{r-1}$ at the (r−1)-th processing stage. The stage latch circuit $310_r$ holds the value of the stage latch circuit $310_{r-1}$.

The instruction decoder $320_r$ decodes the instruction $INST_{rs}$ from the stage latch circuit $310_r$. The instruction $INST_{rs}$ is the instruction dispatched to the operator $120_r$ to the operator $120_s$ at the r-th processing stage to the s-th processing stage (refer to FIG. 18). This instruction $INST_{rs}$ provides a correlation between the processing of the operator $120_r$ and the processing of the operator $120_s$. The number of stages from the r-th processing stage to the s-th processing stage is m (s−r+1).

In other words, the instruction $INST_{rs}$ is the instruction for providing a correlation of the processing between the m processing stages (the r-th processing stage to the s-th processing stage) among the n processing stages (the first processing stage to the n-th processing stage) shown in FIG. 17 and FIG. 18. When the instruction $INST_{rs}$ has been decoded, the operator $120_r$ executes the processing according to the instruction $INST_{rs}$ by using the value (the first processing data $SOURCE_1$) of the stage latch circuit $110_r$ and the value (the second processing data $SOURCE_2$) of the stage latch circuit $210_r$, and outputs the result of the processing to the stage latch circuit $110_{r+1}$.

The instruction decoder $320_r$ decodes the instruction $INST_r$ from the stage latch circuit $310_r$. The instruction $INST_r$ is the instruction to make the operator $120_r$ execute the processing independent of the operators at other processing stages. When the instruction $INST_r$ has been decoded, the operator $120_r$ executes the processing according to the instruction $INST_r$ by using the value of the stage latch circuit $110_r$, and outputs the processing result.

When the instruction other than the instruction $INST_{rs}$ and the instruction $INST_r$ has been input, the instruction decoder $320_r$ converts this instruction into the through instruction $SRC_1$, and decodes this instruction $SRC_1$ to the operator $120_r$. When the through instruction $SRC_1$ has been decoded, the operator $120_r$ passes only the value of the stage latch circuit $110_r$ through, out of the value of the stage latch circuit $110_r$ and the value of the stage latch circuit $210_r$.

The structures of the (r+1)-th processing stage through the s-th processing stage to the (n−1)-th processing stage (not shown) are similar to that of the (x+1)-th processing stage shown in FIG. 5. However, the functions of the instruction decoder $320_{r+1}$ to the instruction decoder $320_s$ shown in FIG. 17 and FIG. 18 are different from the function of the instruction decoder $320_{x+1}$ shown in FIG. 5 as described later.

At the (r+1)-th processing stage, the stage latch circuit $110_{r+1}$ holds the first processing data $SOURCE_1$ or the processing result of the operator $120_r$ at the r-th processing stage. The stage latch circuit $310_{r+1}$ holds the value of the stage latch circuit $310_r$. The instruction decoder $320_{r+1}$ decodes the instruction $INST_{rs}$ from the stage latch circuit $310_{r+1}$. When the instruction $INST_{rs}$ has been decoded, the operator $120_{r+1}$ executes the processing according to the instruction $INST_{rs}$ by using the value (the processing result of the operator $120_r$) of the stage latch circuit $110_{r+1}$, and outputs the processing result to the multiplexer $400_{r+1}$.

The instruction decoder $320_{r+1}$ decodes the instruction $INST_{r+1}$ from the stage latch circuit $310_{r+1}$. The instruction $INST_{r+1}$ is the instruction to make the operator $120_{r+1}$ execute the processing independent of the operators at other processing stages. When the instruction $INST_{r+1}$ has been decoded, the operator $120_{r+1}$ executes the processing according to the instruction $INST_{r+1}$ by using the value of the stage latch circuit $110_{r+1}$, and outputs the processing result. A bypass line $B_{r+1}$ is provided in parallel with the operator $120_{r+1}$, and guides the value of the stage latch circuit $110_{r+1}$ to pass through this bypass line to a multiplexer $400_{r+1}$ without passing through the operator $120_{r+1}$.

The multiplexer $400_{r+1}$ is changeover controlled by the instruction decoder $320_{r+1}$. The multiplexer $400_{r+1}$ outputs one of the processing result of the operator $120_{r+1}$ and the value of the stage latch circuit $110_{r+1}$. Specifically, the multiplexer $400_{r+1}$ outputs the processing result of the operator $120_{r+1}$ when the instruction $INST_{rs}$ or the instruction $INST_{r+1}$ has been decoded by the instruction decoder $320_{r+1}$. On the other hand, the multiplexer $400_{r+1}$ outputs the value of the stage latch circuit $110_{r+1}$ when the instruction other than the instruction $INST_{rs}$ and the instruction $INST_{r+1}$ has been input to the instruction decoder $320_{r+1}$. The stage latch circuit $110_{r+2}$ holds the processing result of the operator $120_{r+1}$ or the value of the stage latch circuit $110_{r+1}$ according to the changeover state of the multiplexer $400_{r+1}$. The stage latch circuit $110_{r+2}$ and the stage latch circuit $310_{r+2}$ are provided between the (r+1)-th processing stage and the (r+2)-th processing stage (not shown) respectively, and they hold the output of the multiplexer $400_{r+1}$ and the value of the stage latch circuit $310_{r+1}$ respectively. The (r+2)-th processing stage to the s-th processing stage have similar structures to that of the (r+1)-th processing stage.

In other words, at the s-th processing stage shown in FIG. 18, the stage latch circuit $110_s$ holds the first processing data $SOURCE_1$ or the processing result of the operator at the (s−1)-th processing stage (not shown). The stage latch circuit $310_s$ holds the value of the stage latch circuit $310_{s−1}$ (not shown). The instruction decoder $320_s$ decodes the instruction $INST_{rs}$ from the stage latch circuit $310_s$. When the instruction $INST_{rs}$ has been decoded, the operator $120_s$ executes the processing according to the instruction $INST_{rs}$ by using the value of the stage latch circuit $110_s$, and outputs the processing result to the multiplexer $400_s$.

The instruction decoder $320_s$ decodes the instruction $INST_s$ from the stage latch circuit $310_s$. The instruction $INST_s$ is the instruction to make the operator $120_s$ execute the processing independent of the operators at other processing stages. When the instruction $INST_s$ has been decoded, the operator $120_s$ executes the processing according to the instruction $INST_s$ by using the value of the stage latch circuit $110_s$, and outputs the processing result. A bypass line $B_s$ is provided in parallel with the operator $120_s$, and guides the value of the stage latch circuit $110_s$ to pass through this bypass line to the multiplexer $400_s$ without passing through the operator $120_s$.

The multiplexer $400_s$ is changeover controlled by the instruction decoder $320_s$. The multiplexer $400_s$ outputs the processing result of the operator $120_s$ or the value of the stage latch circuit $110_s$. Specifically, the multiplexer $400_s$ outputs the processing result of the operator $120_s$ when the instruction $INST_{rs}$ or the instruction $INST_s$ has been decoded by the instruction decoder $320_s$. On the other hand, the multiplexer $400_s$ outputs the value of the stage latch circuit $110_s$ when the instruction other than the instruction $INST_{rs}$ and the instruction $INST_s$ has been input to the instruction decoder $320_s$. The stage latch circuit $110_{s+1}$ holds the processing result of the operator $120_s$ or the value of the stage latch circuit $110_s$ according to the changeover state of the multiplexer $400_s$. The stage latch circuit $110_{s+1}$ and the stage latch circuit $310_{s+1}$ are provided between the s-th processing stage and the (s+1)-th processing stage (not shown) respectively, and they hold the output of the multiplexer $400_s$ and the value of the stage latch circuit $310_s$ respectively.

Figure 19:
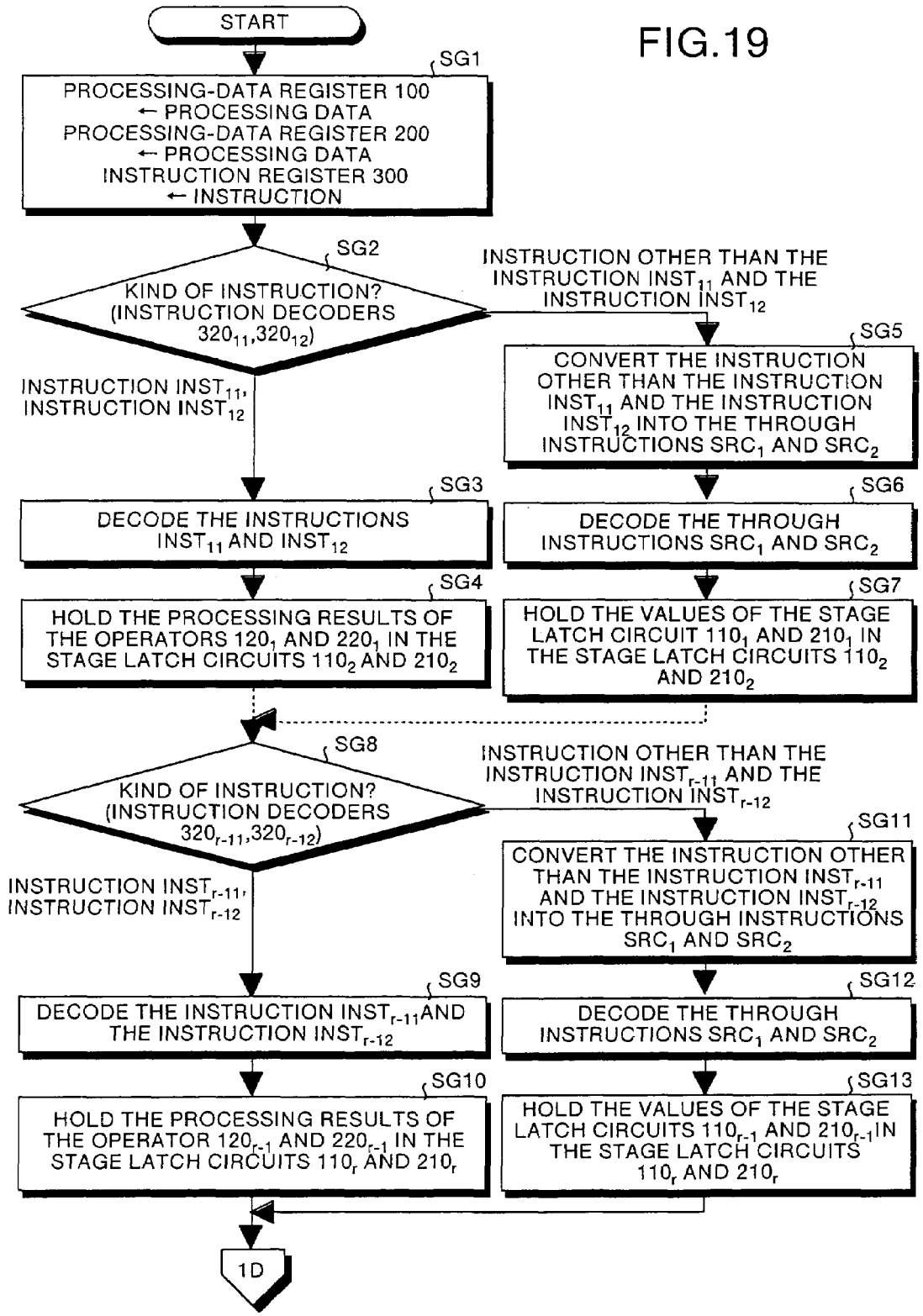
FIG. 19 is a flowchart that explains the operation of the seventh embodiment.
Figure 20:
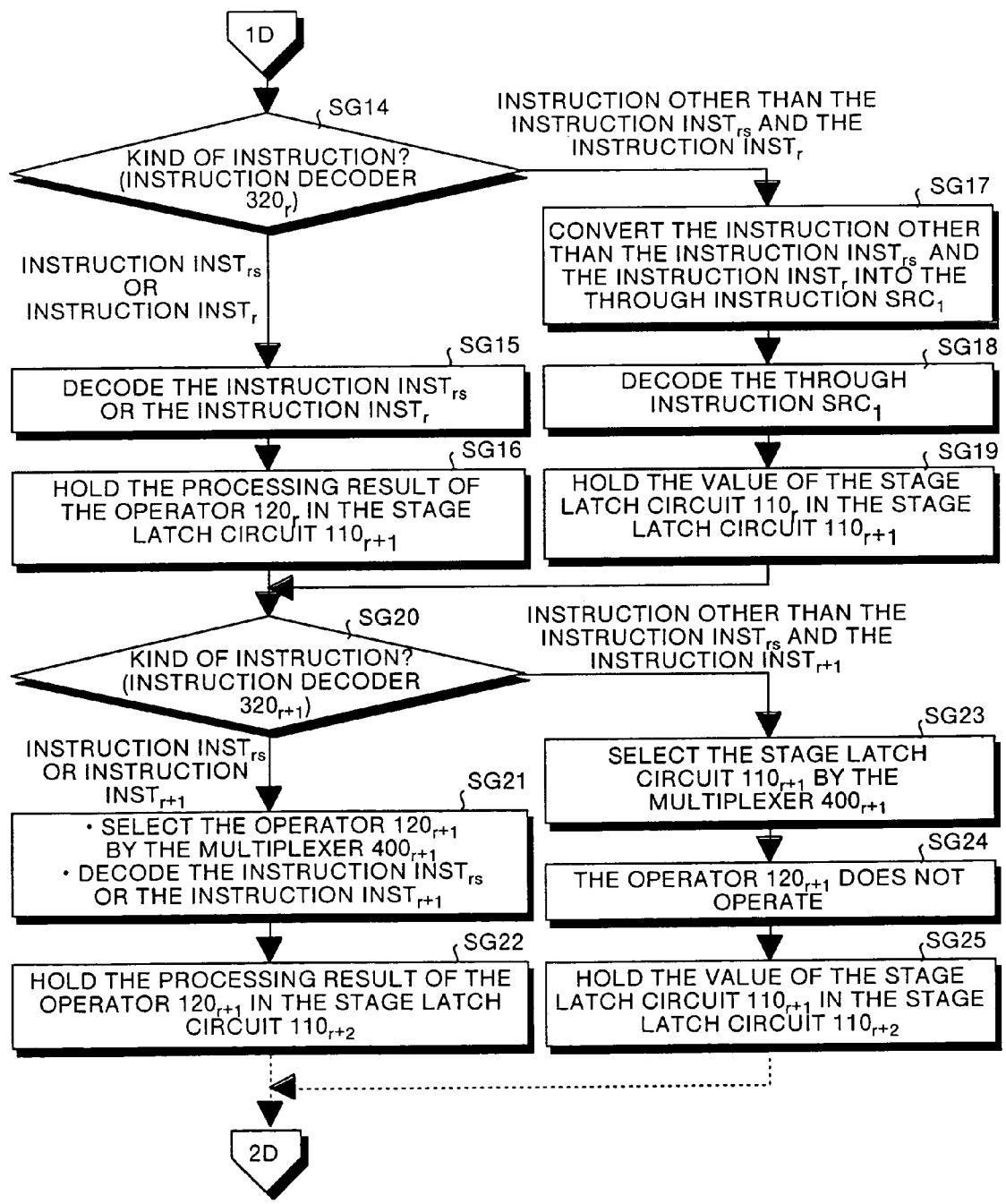
FIG. 20 is a flowchart that explains the operation of the seventh embodiment.
Figure 21:
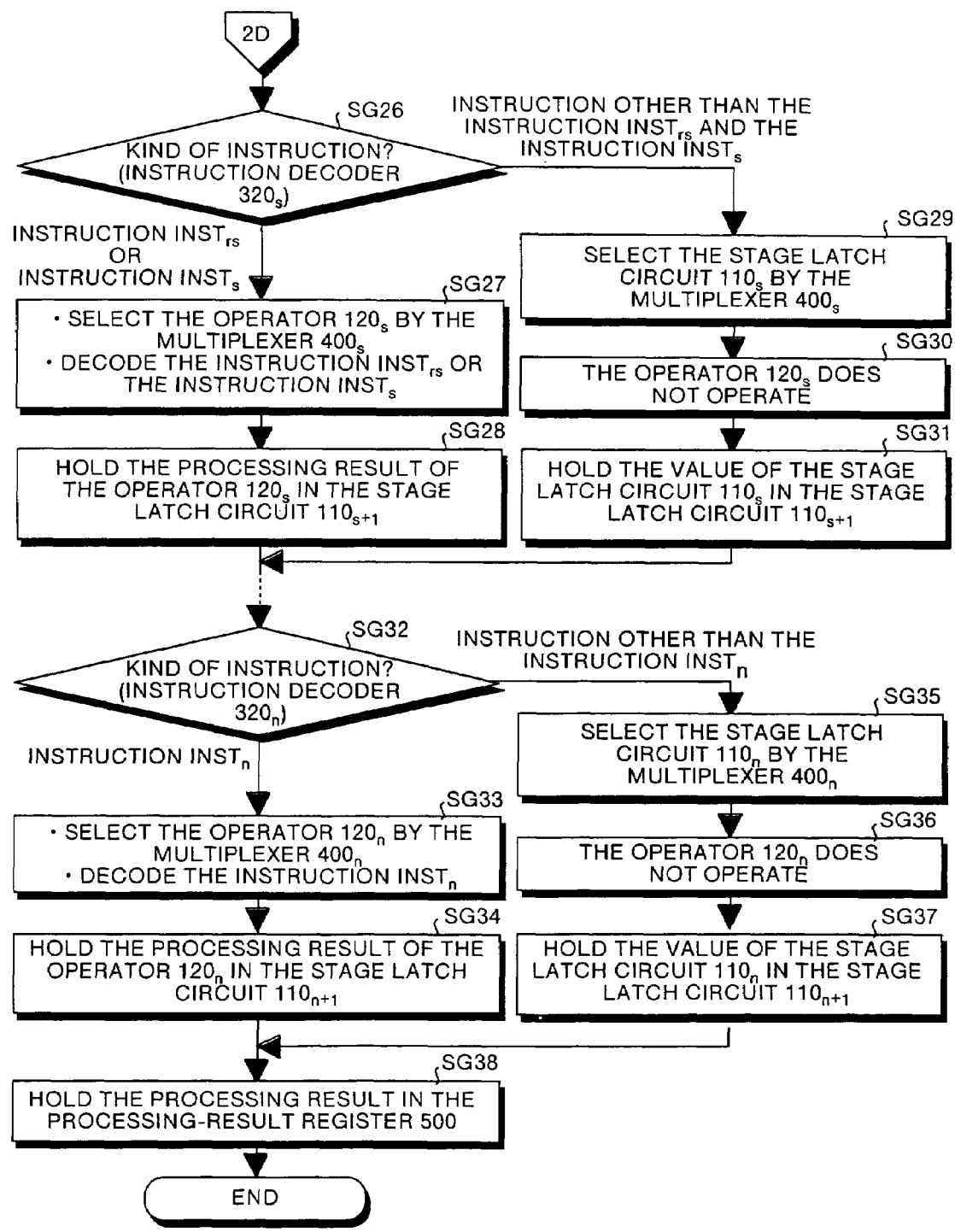
FIG. 21 is a flowchart that explains the operation of the seventh embodiment.

The operation of the seventh embodiment will be explained with reference to flowcharts shown in FIG. 19 to FIG. 21. The operation when the instruction $INST_{rs}$ has been dispatched to the operator $120_r$ at the r-th processing stage to the operator $120_s$ at the s-th processing stage will be explained first. At step SG1 shown in FIG. 19, the first processing data $SOURCE_1$, the second processing data $SOURCE_2$ and the instruction $INST_{rs}$ are held in the processing-data register 100, the processing-data register 200 and the instruction register 300 respectively. Thus, the first processing data $SOURCE_1$, the second processing data $SOURCE_2$ and the instruction $INST_{rs}$ are held in the stage latch circuit $110_1$, the stage latch circuit $210_1$ and the stage latch circuit $310_1$ respectively.

At the next step SG2, the instruction decoder $320_{11}$ and the instruction decoder $320_{12}$ decide the kind of the instruction held in the stage latch circuit $310_1$. In this case, the instruction $INST_{rs}$ is being held in the stage latch circuit $310_1$. Therefore, the instruction decoder $320_{11}$ and the instruction decoder $320_{12}$ proceed to step SG5. When the instruction $INST_{11}$ and the instruction $INST_{12}$ are being held in the stage latch circuit $310_1$, the instruction decoder $320_{11}$ and the instruction decoder $320_{12}$ proceed to step SG3. In this case, the processing similar to that of the step SC3 and the step SC4 (refer to FIG. 6) is carried out at the step SG3 and at step SG4 respectively.

At the step SG5, the instruction decoder $320_{11}$ and the instruction decoder $320_{12}$ convert the instruction $INST_{rs}$ into the through instruction $SRC_1$ and the through instruction $SRC_2$ respectively. The instruction decoder $320_{11}$ and the instruction decoder $320_{12}$ then proceed to step SG6. At the step SG6, the instruction decoder $320_{11}$ and the instruction decoder $320_{12}$ decode the through instruction $SRC_1$ and the through instruction $SRC_2$ to the operator $120_1$ and the operator $220_1$ respectively. The operator $120_1$ and the operator $220_1$ then pass the value (the first processing data $SOURCE_1$) of the stage latch circuit $110_1$ and the value (the second processing data $SOURCE_2$) of the stage latch circuit $210_1$ through the respective operators.

At the next step SG7, the value (the first processing data $SOURCE_1$) of the stage latch circuit $110_1$ and the value (the second processing data $SOURCE_2$) of the stage latch circuit $210_1$ are held in the stage latch circuit $110_2$ and the stage latch circuit $210_2$ respectively. The value (the instruction $INST_{rs}$) of the stage latch circuit $310_1$ is held in the stage latch circuit $310_2$. Thereafter, at the second processing stage to the (r−2)-th processing stage (not shown), the through instruction $SRC_1$ and the through instruction $SRC_2$ are decoded respectively. The first processing data $SOURCE_1$ and the second processing data $SOURCE_2$ are then sequentially passed through the respective processing stages, in a similar manner to that of the first processing stage. At the second processing stage to the (r−2)-th processing stage, the instruction $INST_{rs}$ is held sequentially in the stage latch circuits.

At the (r−1)-th processing stage, at step SG8, the instruction $INST_{rs}$ is being held in the stage latch circuit $310_{r−1}$. Therefore, the instruction decoder $320_{r−11}$ and the instruction decoder $320_{r−12}$ proceed to step SG11. When the instruction $INST_{r-11}$ and the instruction $INST_{r-12}$ are being held in the stage latch circuit $310_{r-1}$, the instruction decoder $320_{r-11}$ and the instruction decoder $320_{r-12}$ proceed to step SG9. At the step SG9, instruction decoder $320_{r-11}$ and the instruction decoder $320_{r-12}$ decode the instruction $INST_{r-11}$ and the instruction $INST_{r-12}$ to the operator $120_{r-1}$ and the operator $220_{r-1}$ respectively. The operator $120_{r-1}$ and the operator $220_{r-1}$ then execute the processing corresponding to the instruction $INST_{r-11}$ and the instruction $INST_{r-12}$ by using the value of the stage latch circuit $110_{r-1}$ and the value of the stage latch circuit $210_{r-1}$ respectively. At step SG10, the processing result of the operator $120_{r-1}$ and the processing result of the operator $220_{r-1}$ are held in the stage latch circuit $110_r$ and the stage latch circuit $210_r$ respectively.

At the step SG11, the instruction decoder $320_{r-11}$ and the instruction decoder $320_{r-12}$ decode the instruction $INST_{rs}$ into the through instruction $SRC_1$ and the through instruction $SRC_2$ respectively. The instruction decoder $320_{r-11}$ and the instruction decoder $320_{r-12}$ then proceed to step SG12. At the step SG12, the instruction decoder $320_{r-11}$ and the instruction decoder $320_{r-12}$ decode the through instruction $SRC_1$ and the through instruction $SRC_2$ to the operator $120_{r-1}$ and the operator $220_{r-1}$ respectively. The operator $120_{r-1}$ and the operator $220_{r-1}$ then pass the value (the first processing data $SOURCE_1$) of the stage latch circuit $110_{r-1}$ and the value (the second processing data $SOURCE_2$) of the stage latch circuit $210_{r-1}$ through the respective operators.

At the next step SG13, the value (the first processing data $SOURCE_1$) of the stage latch circuit $110_{r-1}$ and the value (the second processing data $SOURCE_2$) of the stage latch circuit $210_{r-1}$ are held in the stage latch circuit $110_r$ and the stage latch circuit $210_r$ respectively. The value (the instruction $INST_{rs}$) of the stage latch circuit $310_{r-1}$ is held in the stage latch circuit $310_r$.

At the r-th processing stage, at step SG14 (refer to FIG. 20), the instruction $INST_{rs}$ is being held in the stage latch circuit $310_r$. Therefore, the instruction decoder $320_r$ proceeds to step SG15. When the instruction other than the instruction $INST_{rs}$ and the instruction $INST_r$ is being held in the stage latch circuit $310_r$, the instruction decoder $320_r$ proceeds to step SG17. At the step SG17, instruction decoder $320_r$ converts the instruction other than the instruction $INST_{rs}$ and the instruction $INST_r$ into the through instruction $SRC_1$, and proceeds to step SG18. At the step SG18, the instruction decoder $320_r$ decodes the through instruction $SRC_1$ to the operator $120_r$. The operator $120_r$ then passes the value of the stage latch circuit $110_r$ through. At the next step SG19, the value of the stage latch circuit $110_r$ is held in the stage latch circuit $110_{r+1}$.

At the step SG15, the instruction decoder $320_r$ decodes the instruction $INST_{rs}$ to the operator $120_1$. The operator $120_r$ then executes the processing according to the instruction $INST_{rs}$ by using the value (the first processing data $SOURCE_1$) of the stage latch circuit $110_r$ and the value (the second processing data $SOURCE_2$) of the stage latch circuit $210_r$. At step SG16, the processing result of the operator $120_r$ is held in the stage latch circuit $110_{r+1}$. At this time, the value (the instruction $INST_{rs}$) of the stage latch circuit $310_r$ is held in the stage latch circuit $310_{r+1}$.

At the (r+1)-th processing stage, at step SG20, the instruction $INST_{rs}$ is being held in the stage latch circuit $310_{r+1}$. Therefore, the instruction decoder $320_{r+1}$ proceeds to step SG21. When the instruction $INST_{rs}$ and the instruction $INST_{r+1}$ are being held in the stage latch circuit $310_{r+1}$, the instruction decoder $320_{r+1}$ proceeds to step SG23. At the step SG23, the instruction decoder $320_{r+1}$ makes the multiplexer $400_{r+1}$ select the stage latch circuit $110_{r+1}$. At step SG24, the operator $120_{x+1}$ does not operate. At step SG25, the value of the stage latch circuit $110_{r+1}$ is held in the stage latch circuit $110_{r+2}$ through the bypass line $B_{r+1}$ and the multiplexer $400_{r+1}$.

At the step SG21, the instruction decoder $320_{r+1}$ makes the multiplexer $400_{r+1}$ select the operator $120_{r+1}$. The instruction decoder $320_{r+1}$ decodes the value of the stage latch circuit $310_{r+1}$, and then decodes the instruction $INST_{rs}$ to the operator $120_{r+1}$. The operator $120_{r+1}$ then executes the processing according to the instruction $INST_{rs}$ by using the value of the stage latch circuit $110_{r+1}$. At the next step SG22, the processing result of the operator $120_{r+1}$ is held in the stage latch circuit $110_{r+2}$. Thereafter, at the (r+2)-th processing stage to the (s−1)-th processing stage (not shown), the instruction $INST_{rs}$ is decoded and a stage latch circuit is selected by the multiplexer in a similar manner to that of the (r+1)-th processing stage. At each processing stage, each operator executes the processing based on the instruction $INST_{rs}$. At the (r+2)-th processing stage to the (s−1)-th processing stage, the instruction $INST_{rs}$ is sequentially held in the stage latch circuits.

At the s-th processing stage shown in FIG. 18, at step SG26 (refer to FIG. 21), the instruction $INST_{rs}$ is being held in the stage latch circuit $310_s$. Therefore, the instruction decoder $320_s$ proceeds to step SG27. When the instruction other than the instruction $INST_{rs}$ and the instruction $INST_s$ is being held in the stage latch circuit $310_s$, the instruction decoder $320_s$ proceeds to step SG29. At the step SG29, instruction decoder $320_s$ makes the multiplexer $400_s$ select the stage latch circuit $110_s$. Thus, at step SG30, the operator $120_s$ does not operate. At step SG31, the value of the stage latch circuit $110_s$ is held in the stage latch circuit $110_{s+1}$ through the bypass line $B_s$ and the multiplexer $400_s$.

At the step SG27, instruction decoder $320_s$ makes the multiplexer $400_s$ select the operator $120_s$. The instruction decoder $320_s$ decodes the instruction $INST_{rs}$ to the operator $120_s$. The operator $120_s$ then executes the processing according to the instruction $INST_{rs}$ by using the value (the processing result of the operator at the (s−1)-th processing stage) of the stage latch circuit $110_s$. At the next step SG28, the processing result of the operator $120_s$ is held in the stage latch circuit $110_{s+1}$. The processing result of the operator $120_s$ is based on the respective processing by the operator $120_r$ to the operator $120_s$. Thereafter, at the (s+2)-th processing stage to the (n−1)-th processing stage (not shown), a stage latch circuit is selected by the multiplexer. Thus, the processing result of the operator $120_s$ is sequentially passed through each processing stage. At the (s+2)-th processing stage to the (n-1)-th processing stage, the instruction $INST_{rs}$ is sequentially held in the stage latch circuits.

At the n-th processing stage, at step SG32, the instruction $INST_{rs}$ is being held in the stage latch circuit $310_n$. Therefore, the instruction decoder $320_n$ proceeds to step SG35. When the instruction $INST_n$ is being held in the stage latch circuit $310_n$, the instruction decoder $320_n$ proceeds to step SG33. At the step SG33, the instruction decoder $320_n$ makes the multiplexer $400_n$ select the operator $120_n$, and decodes the instruction $INST_n$ to the operator $120_n$. The operator $120_n$ then executes the processing according to the instruction $INST_n$ by using the value of the stage latch circuit $110_n$. At the next step SG34, the processing result of the operator $120_n$ is held in the stage latch circuit $110_{n+1}$.

At the step SG35, the instruction decoder $320_n$ makes the multiplexer $400_n$ select the operator $120_n$. Thus, the operator $120_n$ does not operate at step SG36. At step SG37, the value (the processing result of the operator $120_s$) of the stage latch circuit $110_n$ is held in the stage latch circuit $110_{n+1}$ through the bypass line $B_n$ and the multiplexer $400_n$. At the next step SG38, the processing-result register 500 holds the processing result of the operator $120_s$, the processing result of the pipeline operator.

Next, there will be explained the operation in the case where an instruction has been dispatched (hereinafter to be referred to as an instruction $INST_x$) to make an operator at one processing stage (hereinafter to be referred to as an x-th processing stage) execute the processing independent of other operators among the m processing stages (the r-th processing stage to the s-th processing stage) shown in FIG. 17 and FIG. 18. As one example, there will be explained the case where the x-th processing stage and the instruction $INST_x$ are the (r+1)-th processing stage and the instruction $INST_{r+1}$ shown in FIG. 17 respectively. At step SG1 shown in FIG. 19, the first processing data $SOURCE_1$, the second processing data $SOURCE_2$ and the instruction $INST_{r+1}$ are held in the processing-data register 100, the processing-data register 200 and the instruction register 300 respectively. Thus, the first processing data $SOURCE_1$, the second processing data $SOURCE_2$ and the instruction $INST_{r+1}$ are held in the stage latch circuit $110_1$, the stage latch circuit $210_1$ and the stage latch circuit $310_1$ respectively.

At the next step SG2, the instruction decoder $320_{11}$ and the instruction decoder $320_{12}$ decide the kind of the instruction held in the stage latch circuit $310_1$. In this case, the instruction $INST_{r+1}$ is being held in the stage latch circuit $310_1$. Therefore, the instruction decoder $320_{11}$ and the instruction decoder $320_{12}$ proceed to the step SG5. At the step SG5 to the step SG7, the through instruction $SRC_1$ and the through instruction $SRC_2$ are decoded respectively, and the first processing data $SOURCE_1$ and the second processing data $SOURCE_2$ are held in the stage latch circuit $110_2$ and the stage latch circuit $210_2$ respectively, in a similar manner to that described above. The instruction $INST_{r+1}$ is held in the stage latch circuit $310_2$.

Thereafter, at the second processing stage to the (r−2)-th processing stage (not shown), the through instruction $SRC_1$ and the through instruction $SRC_2$ are decoded respectively, in a similar manner to that of the first processing stage. The first processing data $SOURCE_1$ and the second processing data $SOURCE_2$ are then sequentially passed through the respective processing stages. At the second processing stage to the (r−2)-th processing stage, the instruction $INST_{r+1}$ is held sequentially in the stage latch circuits.

At the (r−1)-th processing stage, at the step SG8, the instruction $INST_{r+1}$ is being held in the stage latch circuit $310_{r-1}$. Therefore, the instruction decoder $320_{r-11}$ and the instruction decoder $320_{r-12}$ proceed to step SG11. At the step SG11 to the step SG13, the through instruction $SRC_1$ and the through instruction $SRC_2$ are decoded respectively. Further, the first processing data $SOURCE_1$ and the second processing data $SOURCE_2$ are held in the stage latch circuit $110_r$ and the stage latch circuit $210_r$ respectively, in a similar manner to that described above. The instruction $INST_{r+1}$ is held in the stage latch circuit $310_r$.

At the r-th processing stage, at the step SG14 (refer to FIG. 20), the instruction $INST_{r+1}$ is being held in the stage latch circuit $310_r$. Therefore, the instruction decoder $320_r$ proceeds to the step SG17. At the step SG17 to the step SG19, the through instruction $SRC_1$ is decoded, and the first processing data $SOURCE_1$ is held in the stage latch circuit $110_{r+1}$, in a similar manner to that described above. The instruction $INST_{r+1}$ is held in the stage latch circuit $310_{r+1}$.

At the (r+1)-th processing stage, at the step SG20, the instruction $INST_{r+1}$ is being held in the stage latch circuit $310_{r+1}$. Therefore, the instruction decoder $320_{r+1}$ proceeds to the step SG21. At the step SG21, the instruction decoder $320_{r+1}$ makes the multiplexer $400_{r+1}$ select the operator $120_{r+1}$. The instruction decoder $320_{r+1}$ decodes the value of the stage latch circuit $310_{r+1}$, and then decodes the instruction $INST_{r+1}$ to the operator $120_{r+1}$. The operator $120_{r+1}$ then executes the processing according to the instruction $INST_{r+1}$ by using the value of the stage latch circuit $110_{r+1}$. At the next step SG22, the processing result of the operator $120_{r+1}$ is held in the stage latch circuit $110_{r+2}$. Thereafter, at the (r+2)-th processing stage to the (s−1)-th processing stage (not shown), a stage latch circuit is selected by the multiplexer. The processing result of the operator $120_{r+1}$ at the (r+1)-th processing stage is sequentially passed through each processing stage. At the (r+2)-th processing stage to the (s−1)-th processing stage, the instruction $INST_{r+1}$ is sequentially held in the stage latch circuits.

At the s-th processing stage, at the step SG26 (refer to FIG. 21), the instruction $INST_{r+1}$ is being held in the stage latch circuit $310_s$. Therefore, the instruction decoder $320_s$ proceeds to the step SG29. At the step SG29 to the step SG31, the stage latch circuit $110_s$ is selected by the multiplexer $400_s$ in a similar manner to that explained above. Further, the processing result of the operator $120_{r+1}$ at the (r+1)-th processing stage is held in the stage latch circuit $110_{s+1}$. Thereafter, at the (s+1)-th processing stage to the (n−1)-th processing stage (not shown), a stage latch circuit is selected by the multiplexer. The processing result of the operator $120_{r+1}$ at the (r+1)-th processing stage is sequentially passed through each processing stage. At the (s+1)-th processing stage to the (n−1)-th processing stage, the instruction $INST_{r+1}$ is sequentially held in the stage latch circuits.

At the n-th processing stage, at the step SG32, the instruction $INST_{r+1}$ is being held in the stage latch circuit $310_n$. Therefore, the instruction decoder $320_n$ proceeds to the step SG35. At the step SG35 to the step SG38, the stage latch circuit $110_n$ is selected by the multiplexer $400_n$ in a similar manner to that explained above. Thus, the processing-result register 500 holds the processing result of the operator $120_{r+1}$ at the (r+1)-th processing stage.

As explained above, according to the seventh embodiment, at the time of executing the processing at the r-th processing stage to the s-th processing stage, the through instruction $SRC_1$ and the through instruction $SRC_2$ are decoded respectively at the first processing stage to the (r−1)-th processing stage. Thus, the first processing data $SOURCE_1$ and the second processing data $SOURCE_2$ are passed through. Therefore, it is possible to reduce both the stage latch circuits and the wiring volume at the first processing stage to the (r−1)-th processing stage from the conventional levels. As a result, according to the seventh embodiment, it is possible to reduce both hardware volume and power consumption. Further, according to the seventh embodiment, it is possible to make one operator at one processing stage execute the processing independent of other operators among the r-th processing stage to the s-th processing stage.

In the seventh embodiment, there has been explained a case where one operator at one processing stage executes the processing independent of other operators among the m processing stages from the r-th processing stage to the s-th processing stage shown in FIG. 17 and FIG. 18. However, it is also possible to make only one operator at one specific processing stage execute the processing. Further, in the seventh embodiment, it is also possible to make each of the operators at the x-th processing stage to the (x+p)-th processing stage execute the processing independent of other operators among the m processing stages from the r-th processing stage to the s-th processing stage ($p \leq s-r$).

In the fourth embodiment, there has been explained a case where at the first processing stage to the n-th processing stage shown in FIG. 9, the operators execute the processing based on the instructions that have no mutual relationship. However, it is also possible to provide a plurality of operators that execute the processing based on the instruction that has a mutual relationship. This case will be explained in detail as an eighth embodiment.

Figure 22:
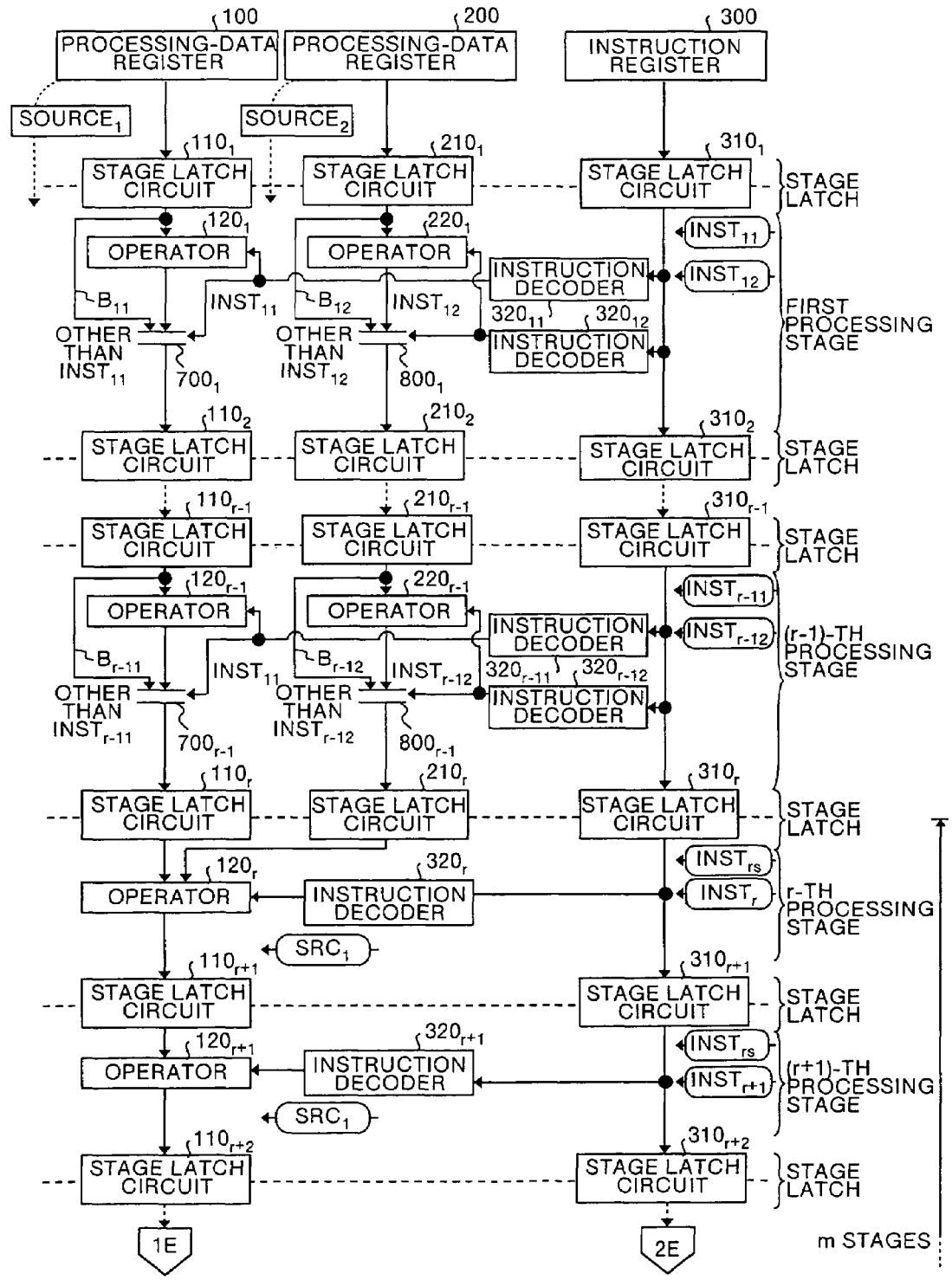
FIG. 22 is a block diagram that shows a structure of an eighth embodiment of the present invention.
Figure 23:
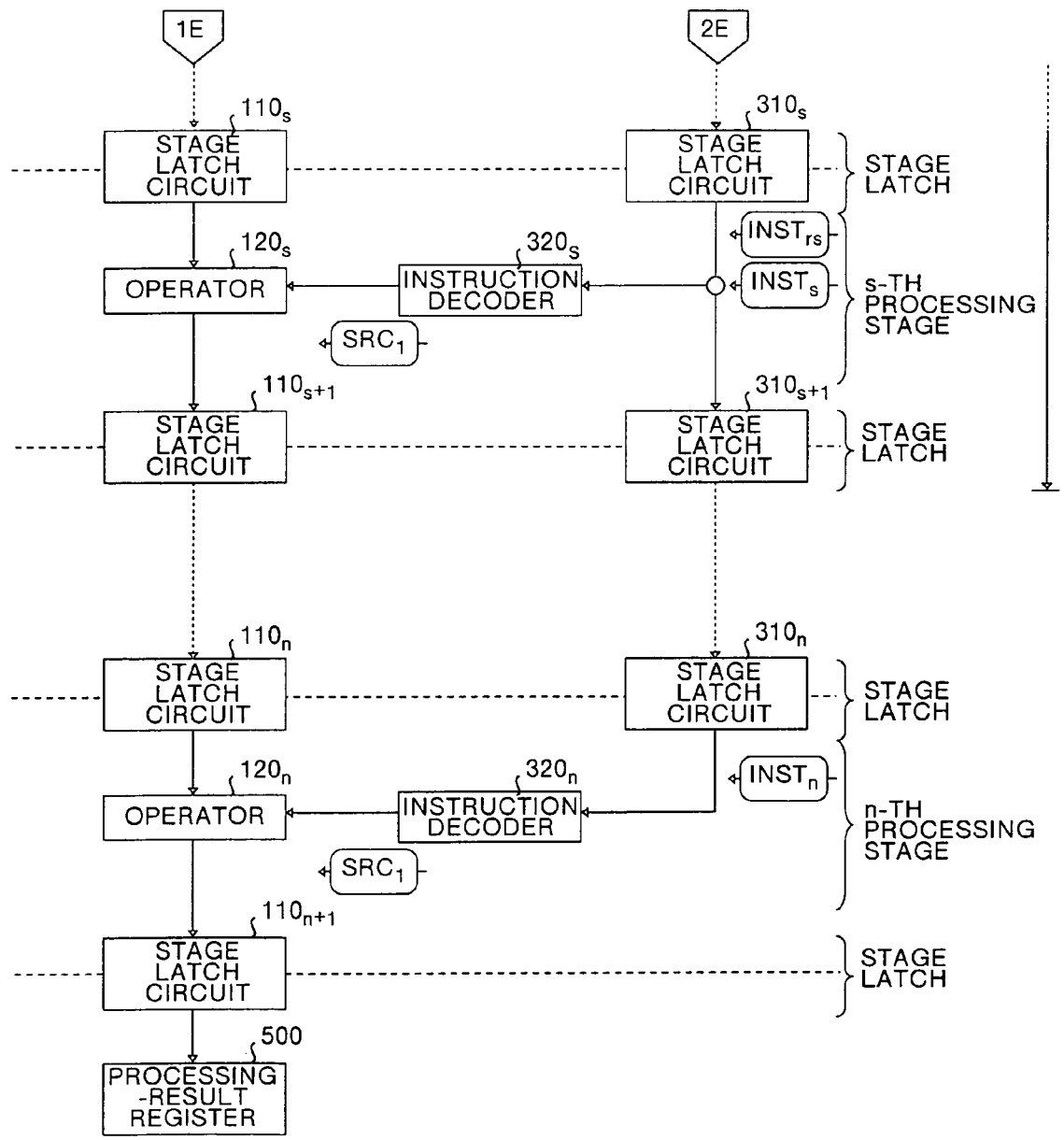
FIG. 23 is a block diagram that shows the structure of the eighth embodiment.

FIG. 22 and FIG. 23 are block diagrams that show a structure of an eighth embodiment of the present invention. In these figures, parts corresponding to those in FIG. 9 are attached with identical reference symbols and the explanation will be omitted. FIG. 22 and FIG. 23 show (r−1)-th processing stage, r-th processing stage, (r+1)-th processing stage and s-th processing stage ($1<r<s<n$) in place of the (x−1)-th processing stage to the (x+1)-th processing stage shown in FIG. 9. The structures of the (r−1)-th processing stage, the r-th processing stage, and the (r+1)-th processing stage (the s-th processing stage) shown in FIG. 22 and FIG. 23 are similar to the structures of the (x−1)-th processing stage, the x-th processing stage and the (x+1)-th processing stage shown in FIG. 9 respectively. However, the functions of the instruction decoders at the (r−1)-th processing stage, the r-th processing stage, and the (r+1)-th processing stage (the s-th processing stage) shown in FIG. 22 and FIG. 23 are different from the functions of the instruction decoders shown in FIG. 9.

In other words, at the (r−1)-th processing stage shown in FIG. 22, the stage latch circuit $110_{r-1}$ holds the first processing data $SOURCE_1$ or the processing result of the (r−2)-th processing stage (not shown). The stage latch circuit $210_{r-1}$ holds the second processing data $SOURCE_2$ or the processing result of the (r−2)-th processing stage (not shown). The stage latch circuit $310_{r-1}$ holds the value of the stage latch circuit at the (r−2)-th processing stage (not shown). The instruction decoder $320_{r-11}$ decodes the instruction $INST_{r-11}$ from the stage latch circuit $310_{r-1}$. When the instruction $INST_{r-11}$ has been decoded, the operator $120_{r-1}$ executes the processing according to the instruction $INST_{r-11}$ by using the value of the stage latch circuit $110_{r-1}$. A bypass line $B_{r-11}$ guides the value of the stage latch circuit $110_{r-1}$ to pass through this bypass line to a multiplexer $700_{r-1}$ without passing through the operator $120_{r-1}$.

The multiplexer $700_{r-1}$ is changeover controlled by the instruction decoder $320_{r-11}$. The multiplexer $700_{r-1}$ outputs the processing result of the operator $120_{r-1}$ when the instruction $INST_{r-11}$ has been decoded by the instruction decoder $320_{r-11}$. On the other hand, the multiplexer $700_{r-1}$ outputs the value of the stage latch circuit $110_{r-1}$ when the instruction other than the instruction $INST_{r-11}$ has been input to the instruction decoder $320_{r-11}$.

The instruction decoder $320_{r-12}$ decodes the instruction $INST_{r-12}$ from the stage latch circuit $310_{r-1}$. When the instruction $INST_{r-12}$ has been decoded, the operator $220_{r-1}$ executes the processing according to the instruction $INST_{r-12}$ by using the value of the stage latch circuit $210_{r-1}$. A bypass line $B_{r-12}$ guides the value of the stage latch circuit $210_{r-1}$ to pass through this bypass line to a multiplexer $800_{r-1}$ without passing through the operator $220_{r-1}$. The multiplexer $800_{r-1}$ outputs the processing result of the operator $220_{r-1}$ when the instruction $INST_{r-12}$ has been decoded by the instruction decoder $320_{r-12}$. On the other hand, the multiplexer $800_{r-1}$ outputs the value of the stage latch circuit $210_{r-1}$ when the instruction other than the instruction $INST_{r-12}$ has been input to the instruction decoder $320_{r-12}$.

At the r-th processing stage, the stage latch circuit $110_r$, the stage latch circuit $210_r$, and the stage latch circuit $310_r$ hold the output value of the multiplexer $700_{r-1}$ the output value of the multiplexer $800_{r-1}$ and the value of the stage latch circuit $310_{r-1}$ respectively. The instruction decoder $320_r$ decodes the instruction $INST_{rs}$ from the stage latch circuit $310_r$. The instruction $INST_{rs}$ is the instruction dispatched to the operator $120_r$ to the operator $120_s$ at the r-th processing stage to the s-th processing stage (refer to FIG. 23) in a similar manner to that of the seventh embodiment. This instruction $INST_{rs}$ provides a correlation between the processing of the operator $120_r$ and the processing of the operator $120_s$. The number of stages from the r-th processing stage to the s-th processing stage is m ($s-r+1$).

In other words, the instruction $INST_{rs}$ is the instruction for providing a correlation of the processing between the m processing stages (the r-th processing stage to the s-th processing stage) among the n processing stages (the first processing stage to the n-th processing stage). When the instruction $INST_{rs}$ has been decoded, the operator $120_r$ executes the processing according to the instruction $INST_{rs}$ by using the value (the first processing data $SOURCE_1$) of the stage latch circuit $110_r$ and the value (the second processing data $SOURCE_2$) of the stage latch circuit $210_r$, and outputs the result of the processing to the stage latch circuit $110_{r+1}$.

The instruction decoder $320_r$ decodes the instruction $INST_r$ from the stage latch circuit $310_r$. The instruction $INST_r$ is the instruction to make the operator $120_r$ execute the processing independent of the operators at other processing stages. When the instruction $INST_r$ has been decoded, the operator $120_r$ executes the processing according to the instruction $INST_r$ by using the value of the stage latch circuit $110_r$, and outputs the processing result.

When the instruction other than the instruction $INST_{rs}$ and the instruction $INST_r$ has been input, the instruction decoder $320_r$ converts this instruction into the through instruction $SRC_1$, and decodes this instruction $SRC_1$ to the operator $120_r$. When the through instruction $SRC_1$ has been decoded, the operator $120_r$ passes only the value of the stage latch circuit $110_r$ through, out of the value of the stage latch circuit $110_r$ and the value of the stage latch circuit $210_r$.

The structures of the (r+1)-th processing stage to the s-th processing stage are similar to that of the (x+1)-th processing stage shown in FIG. 9. However, the functions of the instruction decoder $320_{r+1}$ to the instruction decoder $320_s$ shown in FIG. 22 and FIG. 23 are different from the function of the instruction decoder $320_{x+1}$ shown in FIG. 9 as described later.

At the (r+1)-th processing stage, the stage latch circuit $110_{r+1}$ holds the value of the stage latch circuit $110_r$ or the processing result of the operator $120_r$. The stage latch circuit $310_{r+1}$ holds the value of the stage latch circuit $310_r$. The instruction decoder $320_{r+1}$ decodes the instruction $INST_{rs}$ from the stage latch circuit $310_{r+1}$. When the instruction $INST_{rs}$ has been decoded, the operator $120_{r+1}$ executes the processing according to the instruction $INST_{rs}$ by using the value of the stage latch circuit $110_{r+1}$, and outputs the processing result to the stage latch circuit $110_{r+2}$.

The instruction decoder $320_{r+1}$ decodes the instruction $INST_{r+1}$ from the stage latch circuit $310_{r+1}$. The instruction $INST_{r+1}$ is the instruction to make the operator $120_{r+1}$ execute the processing independent of the operators at other processing stages. When the instruction $INST_{r+1}$ has been decoded, the operator $120_{r+1}$ executes the processing according to the instruction $INST_{r+1}$ by using the value of the stage latch circuit $110_{r+1}$, and outputs the processing result.

When the instruction other than the instruction $INST_{rs}$ and the instruction $INST_{r+1}$ has been input, the instruction decoder $320_{r+1}$ converts this instruction into a through instruction $SRC_1$, and decodes this through instruction $SRC_1$ to the operator $120_{r+1}$. When the through instruction $SRC_1$ has been decoded, the operator $120_{r+1}$ passes the value of the stage latch circuit $110_{r+1}$ through this operator. The (r+2)-th processing stage (not shown) to the s-th processing stage have similar structures to that of the (r+1)-th processing stage.

In other words, at the s-th processing stage shown in FIG. 23, the stage latch circuit $110_s$ holds the value of the stage latch circuit at the (s−1)-th processing stage (not shown) or the processing result of the operator. The instruction decoder $320_s$ decodes the instruction $INST_{rs}$ from the stage latch circuit $310_s$. When the instruction $INST_{rs}$ has been decoded, the operator $120_s$ executes the processing according to the instruction $INST_{rs}$ by using the value of the stage latch circuit $110_s$, and outputs the processing result to the stage latch circuit $110_{s+1}$.

The instruction decoder $320_s$ decodes the instruction $INST_s$ from the stage latch circuit $310_s$. The instruction $INST_s$ is the instruction to make the operator $120_s$ execute the processing independent of the operators at other processing stages. When the instruction $INST_s$ has been decoded, the operator $120_s$ executes the processing according to the instruction $INST_s$ by using the value of the stage latch circuit $110_s$, and outputs the processing result.

When the instruction other than the instruction $INST_{rs}$ and the instruction $INST_s$ has been input, the instruction decoder $320_s$ converts this instruction into the through instruction $SRC_1$, and decodes this through instruction $SRC_1$ to the operator $120_s$. When the through instruction $SRC_1$ has been decoded, the operator $120_s$ passes the value of the stage latch circuit $110_s$ through this operator. The stage latch circuit $110_{s+1}$ and the stage latch circuit $310_{s+1}$ hold the output value of the operator $120_s$ and the value of the stage latch circuit $310_s$ respectively.

Figure 24:
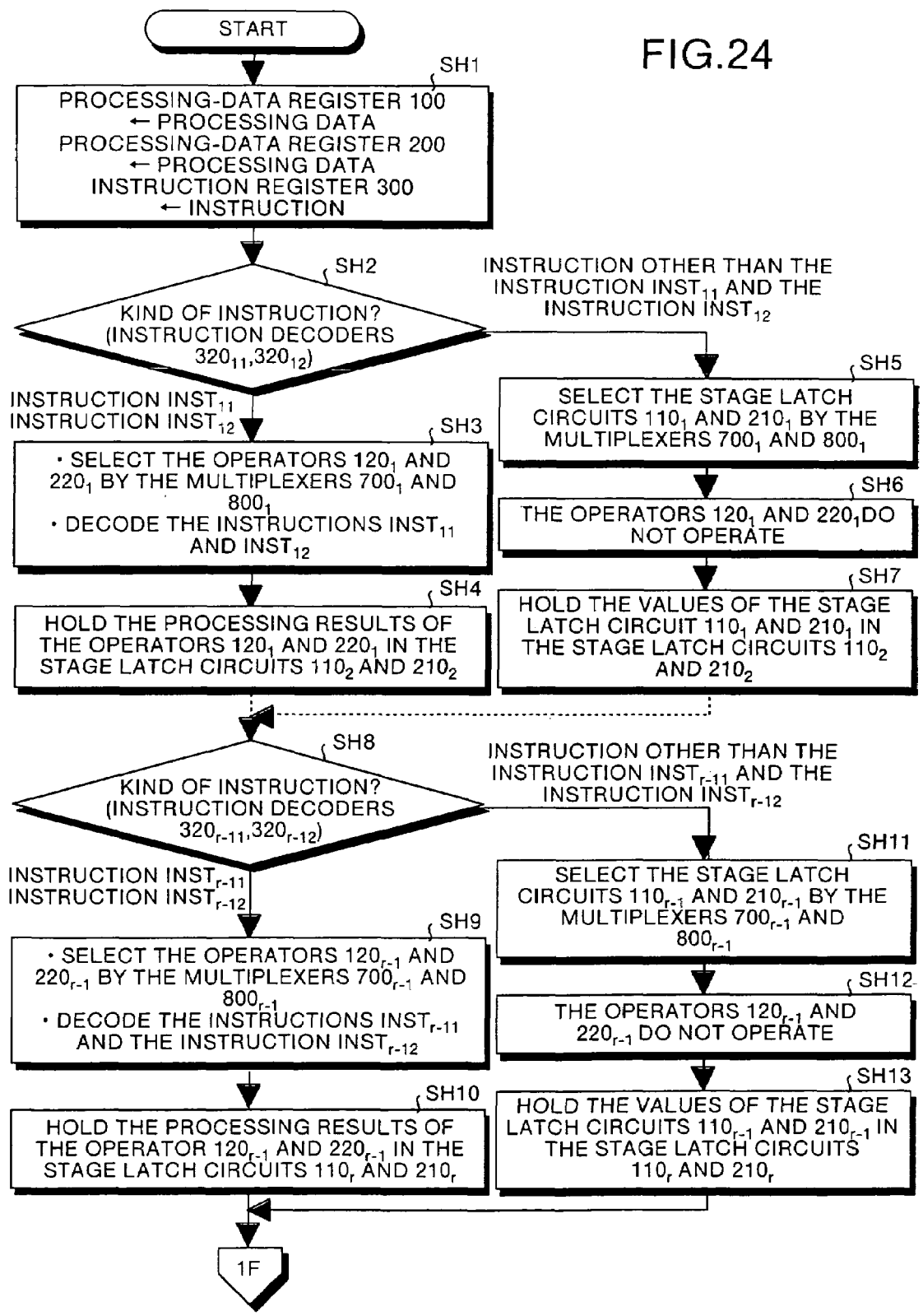
FIG. 24 is a flowchart that explains the operation of the eighth embodiment.
Figure 25:
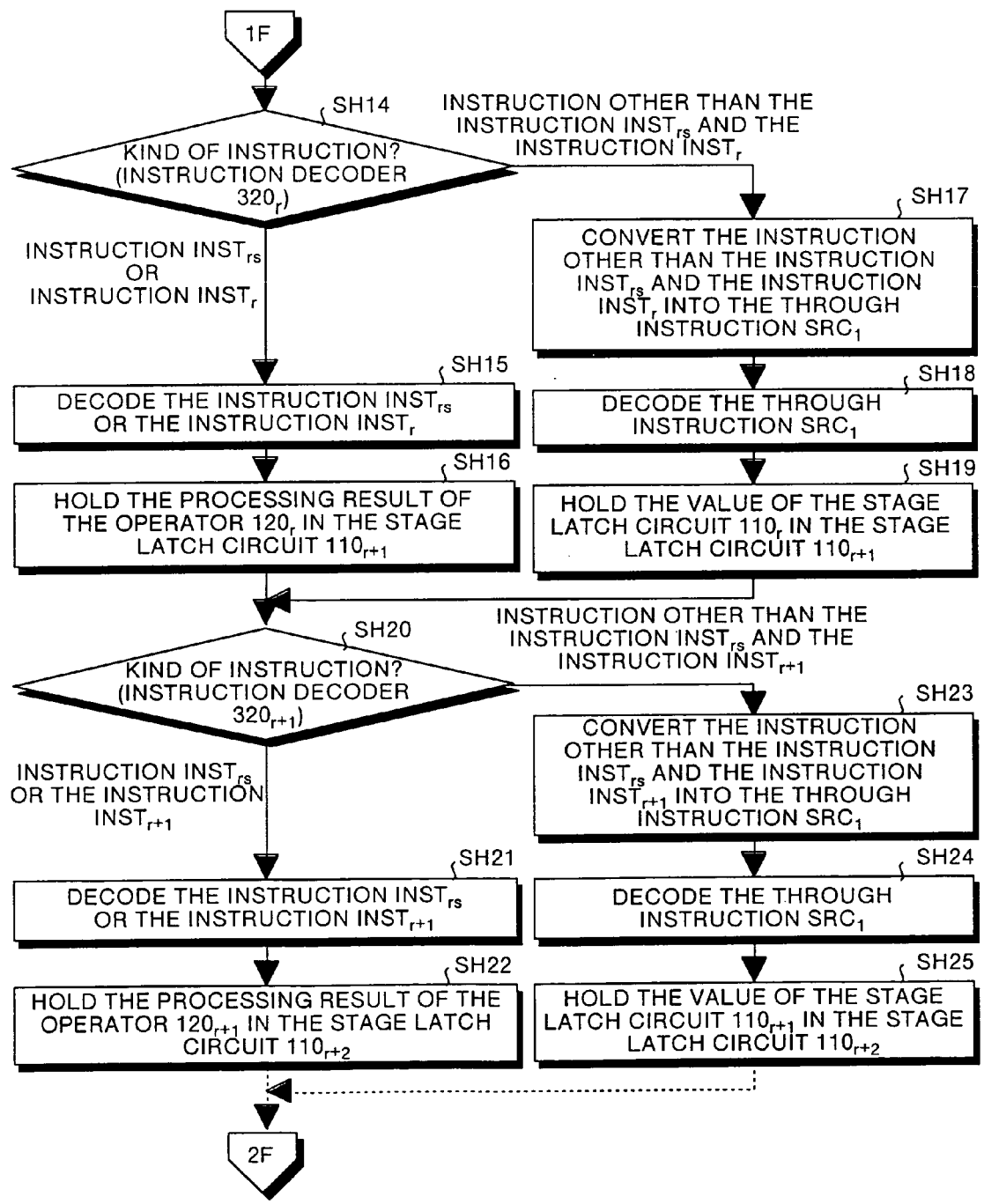
FIG. 25 is a flowchart that explains the operation of the eighth embodiment.
Figure 26:
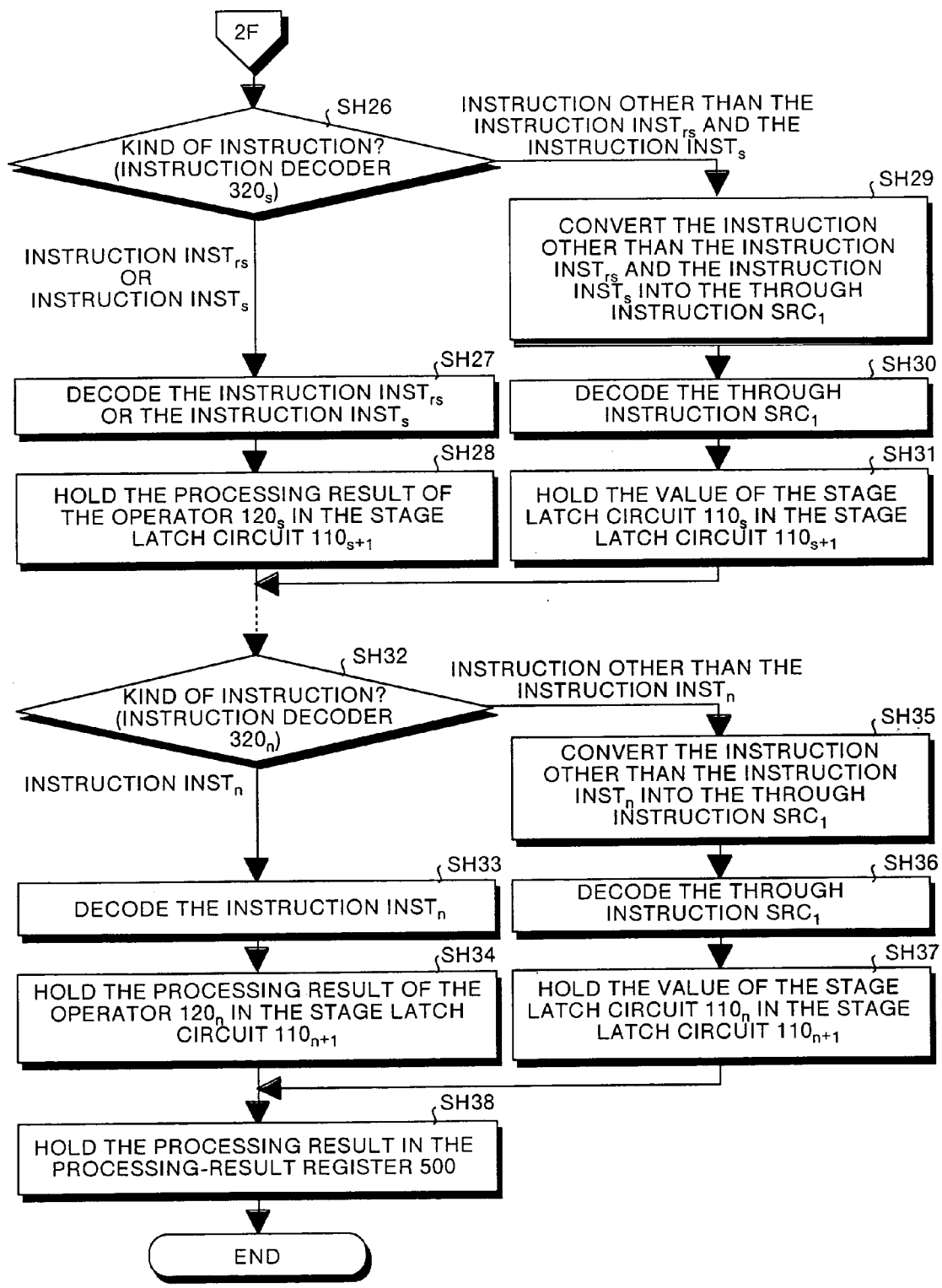
FIG. 26 is a flowchart that explains the operation of the eighth embodiment.

The operation of the eighth embodiment will be explained with reference to flowcharts shown in FIG. 24 to FIG. 26. The operation when the instruction $INST_{rs}$ has been dispatched to the operator $120_r$ at the r-th processing stage to the operator $120_s$ at the s-th processing stage will be explained first. At step SH1 shown in FIG. 24, the first processing data $SOURCE_1$, the second processing data $SOURCE_2$ and the instruction $INST_{rs}$ are held in the processing-data register 100, the processing-data register 200 and the instruction register 300 respectively. Thus, the first processing data $SOURCE_1$, the second processing data $SOURCE_2$ and the instruction $INST_{rs}$ are held in the stage latch circuit $110_1$, the stage latch circuit $210_1$ and the stage latch circuit $310_1$ respectively.

At the next step SH2, the instruction decoder $320_{11}$ and the instruction decoder $320_{12}$ decide the kind of the instruction held in the stage latch circuit $310_1$. In this case, the instruction $INST_{rs}$ is being held in the stage latch circuit $310_1$. Therefore, the instruction decoder $320_{11}$ and the instruction decoder $320_{12}$ proceed to step SH5. When the instruction $INST_{11}$ and the instruction $INST_{12}$ are being held in the stage latch circuit $310_1$, the instruction decoder $320_{11}$ and the instruction decoder $320_{12}$ proceed to step SH3. In this case, the processing similar to that of the step SD3 and the step SD4 (refer to FIG. 10) is carried out at the step SH3 and at step SH4 respectively.

At the step SH5, the instruction decoder $320_{11}$ and the instruction decoder $320_{12}$ make the multiplexer $700_1$ and the multiplexer $800_1$ select the stage latch circuit $110_1$ and the stage latch circuit $210_1$ respectively. At step SH6, the operator $120_1$ and the operator $220_1$ do not operate. At the next step SH7, the value (the first processing data $SOURCE_1$) of the stage latch circuit $110_1$ is held in the stage latch circuit $110_2$ through a bypass line $B_{11}$ and the multiplexer $700_1$. Similarly, the value (the second processing data $SOURCE_2$) of the stage latch circuit $210_1$ is held in the stage latch circuit $210_2$ through a bypass line $B_{12}$ and the multiplexer $800_1$. The instruction $INST_{rs}$ is held in the stage latch circuit $310_2$.

Thereafter, at the second processing stage to the (r−2)-th processing stage (not shown), stage latch circuits are selected by multiplexer, in a similar manner to that of first processing stage. The first processing data $SOURCE_1$ and the second processing data $SOURCE_2$ are then sequentially passed through the respective processing stages. At the second processing stage to the (r−2)-th processing stage, the instruction $INST_{rs}$ is held sequentially in the stage latch circuits.

At the (r−1)-th processing stage, at step SH8, the instruction $INST_{rs}$ is being held in the stage latch circuit $310_{r-1}$. Therefore, the instruction decoder $320_{r-11}$ and the instruction decoder $320_{r-12}$ proceed to step SH11. When the instruction $INST_{r-11}$ and the instruction $INST_{r-12}$ are being held in the stage latch circuit $310_{r-1}$, the instruction decoder $320_{r-11}$ and the instruction decoder $320_{r-12}$ proceed to step SH9. At the step SH9, the instruction decoder $320_{r-11}$ and the instruction decoder $320_{r-12}$ make the multiplexer $700_{r-1}$ and the multiplexer $800_{r-1}$ select the operator $120_{r-1}$ and the operator $220_{r-1}$ respectively.

The instruction decoder $320_{r-11}$ and the instruction decoder $320_{r-12}$ decode the instruction $INST_{r-11}$ and the instruction $INST_{r-12}$ to the operator $120_{r-1}$ and the operator $220_{r-1}$ respectively. The operator $120_{r-1}$ and the operator $220_{r-1}$ then execute the processing corresponding to the instruction $INST_{r-11}$ and the instruction $INST_{r-12}$ by using the value of the stage latch circuit $110_{r-1}$ and the value of the stage latch circuit $210_{r-1}$ respectively. At the next step SH10, the processing result of the operator $120_{r-1}$ and the processing result of the operator $220_{r-1}$ are held in the stage latch circuit $110_r$ and the stage latch circuit $210_r$ respectively.

At the step SH11, the instruction decoder $320_{r-11}$ and the instruction decoder $320_{r-12}$ make the multiplexer $700_{r-1}$ and the multiplexer $800_{r-1}$ select the stage latch circuit $110_{r-1}$ and the stage latch circuit $210_{r-1}$ respectively. At step SH12, the operator $120_{r-1}$ and the operator $220_{r-1}$ do not operate. At step SH13, the value (the first processing data $SOURCE_1$) of the stage latch circuit $110_{r-1}$ is held in the stage latch circuit $110_r$ through the bypass line $B_{r-11}$ and the multiplexer $700_{r-1}$. Similarly, the value (the second processing data $SOURCE_2$) of the stage latch circuit $210_{r-1}$ is held in the stage latch circuit $210_r$ through the bypass line $B_{r-12}$ and the multiplexer $800_{r-1}$.

At the next r-th processing stage, at step SH14 (refer to FIG. 25), the instruction $INST_{rs}$ is being held in the stage latch circuit $310_r$. Therefore, the instruction decoder $320_r$ proceeds to step SH15. When the instruction other than the instruction $INST_{rs}$ and the instruction $INST_r$ is being held in the stage latch circuit $310_r$, the instruction decoder $320_r$ proceeds to step SH17. At the step SH17, instruction decoder $320_r$ converts the instruction other than the instruction $INST_{rs}$ and the instruction $INST_r$ into the through instruction $SRC_1$, and proceeds to step SH18. At the step SH18, the instruction decoder $320_r$ decodes the through instruction $SRC_1$ to the operator $120_r$. The operator $120_r$ then passes the value of the stage latch circuit $110_r$ through. At the next step SH19, the value of the stage latch circuit $110_r$ is held in the stage latch circuit $110_{r+1}$.

At the step SH15, the instruction decoder $320_r$ decodes the instruction $INST_{rs}$ to the operator $120_r$. The operator $120_r$ then executes the processing according to the instruction $INST_{rs}$ by using the value (the first processing data $SOURCE_1$) of the stage latch circuit $110_r$ and the value (the second processing data $SOURCE_2$) of the stage latch circuit $210_r$. At step SH16, the processing result of the operator $120_r$ is held in the stage latch circuit $110_{r+1}$. At this time, the value (the instruction $INST_{rs}$) of the stage latch circuit $310_r$ is held in the stage latch circuit $310_{r+1}$.

At the (r+1)-th processing stage, at step SH20, the instruction $INST_{rs}$ is being held in the stage latch circuit $310_{r+1}$. Therefore, the instruction decoder $320_{r+1}$ proceeds to step SH21. When the instruction other than the instruction $INST_{rs}$ and the instruction $INST_{r+1}$ is being held in the stage latch circuit $310_{r+1}$, the instruction decoder $320_{r+1}$ proceeds to step SH23. At the step SH23, the instruction decoder $320_{r+1}$ converts the instruction other than the instruction $INST_{rs}$ and the instruction $INST_{r+1}$ into the through instruction $SRC_1$, and proceeds to step SH24. At the step SH24, the instruction decoder $320_{r+1}$ decodes the through instruction $SRC_1$ to the operator $120_{r+1}$. Thus, the operator $120_{r+1}$ passes the value of the stage latch circuit $110_{r+1}$ through this operator. At step SH25, the value of the stage latch circuit $110_{r+1}$ is held in the stage latch circuit $110_{r+2}$.

At the step SH21, the instruction decoder $320_{r+1}$ decodes the instruction $INST_{rs}$ to the operator $120_{r+1}$. The operator $120_{r+1}$ then executes the processing according to the instruction $INST_{rs}$ by using the value (the processing result of the operator $120_r$ at the r-th processing stage) of the stage latch circuit $110_{r+1}$. At the next step SH22, the processing result of the operator $120_{r+1}$ is held in the stage latch circuit $110_{r+2}$. At this time, the value (the instruction $INST_{rs}$) of the stage latch circuit $310_{r+1}$ is held in the stage latch circuit $310_{r+2}$. Thereafter, at the (r+2)-th processing stage to the (s−1)-th processing stage (not shown), the instruction $INST_{rs}$ is decoded in a similar manner to that of the (r+1)-th processing stage. At each processing stage, each operator executes the processing based on the instruction $INST_{rs}$. At the (r+2)-th processing stage to the (s−1)-th processing stage, the instruction $INST_{rs}$ is sequentially held in the stage latch circuits.

At the s-th processing stage shown in FIG. 23, at step SH26 (refer to FIG. 26), the instruction $INST_{rs}$ is being held in the stage latch circuit $310_s$. Therefore, the instruction decoder $320_s$ proceeds to step SH27. When the instruction other than the instruction $INST_{rs}$ and the instruction $INST_s$ is being held in the stage latch circuit $310_s$, the instruction decoder $320_s$ proceeds to step SH29. At the step SH29, the instruction decoder $320_s$ converts the instruction other than the instruction $INST_{rs}$ and the instruction $INST_s$ into the through instruction $SRC_1$, and proceeds to step SH30. At the step SH30, the instruction decoder $320_s$ decodes the through instruction $SRC_1$ to the operator $120_s$. Thus, the operator $120_s$ passes the value of the stage latch circuit $110_s$ through this operator. At step SH31, the value of the stage latch circuit $110_s$ is held in the stage latch circuit $110_{s+1}$.

At the step SH27, the instruction decoder $320_s$ decodes the instruction $INST_{rs}$ to the operator $120_s$. The operator $120_s$ then executes the processing according to the instruction $INST_{rs}$ by using the value (the processing result of the operator at the (s−1)-th processing stage) of the stage latch circuit $110_s$. At the next step SH28, the processing result of the operator $120_s$ is held in the stage latch circuit $110_{s+1}$. At this time, the value (the instruction $INST_{rs}$) of the stage latch circuit $310_s$ is held in the stage latch circuit $310_{s+1}$. Thereafter, at the (s+1)-th processing stage to the (n−1)-th processing stage (not shown), the through instruction $SRC_1$ is decoded. The processing result of the operator $120_s$ is sequentially passed through each processing stage. At the (s+1)-th processing stage to the (n−1)-th processing stage, the instruction $INST_{rs}$ is sequentially held in the stage latch circuits.

At the n-th processing stage, at step SH32, the instruction $INST_{rs}$ is being held in the stage latch circuit $310_n$. Therefore, the instruction decoder $320_n$ proceeds to step SH35. When the instruction $INST_n$ is being held in the stage latch circuit $310_n$, the instruction decoder $320_n$ proceeds to step SH33. At the step SH33, the instruction decoder $320_n$ decodes the instruction $INST_n$ to the operator $120_n$. The operator $120_n$ then executes the processing according to the instruction $INST_n$ by using the value of the stage latch circuit $110_n$. At the next step SH34, the processing result of the operator $120_n$ is held in the stage latch circuit $110_{n+1}$.

At the step SH35, the instruction decoder $320_n$ converts the instruction $INST_{rs}$ into the through instruction $SRC_1$, and proceeds to step SH36. At the step SH36, the instruction decoder $320_n$ decodes the through instruction $SRC_1$ to the operator $120_n$. The operator $120_n$ then passes the value (the processing result of the operator $120_s$) of the stage latch circuit $110_n$ through. At the next step SH37, the value of the stage latch circuit $110_n$ is held in the stage latch circuit $110_{n+1}$. At the next step SH38, the processing-result register 500 holds the processing result of the operator $120_s$ as the processing result of the pipeline operator.

Next, there will be explained the operation in the case where an instruction has been dispatched (hereinafter to be referred to as an instruction $INST_x$) to make an operator at one processing stage (hereinafter to be referred to as an x-th processing stage) execute the processing independent of other operators among the m processing stages (the r-th processing stage to the s-th processing stage) shown in FIG. 22 and FIG. 23. As one example, there will be explained the case where the x-th processing stage and the instruction $INST_x$ are the (r+1)-th processing stage and the instruction $INST_{r+1}$ shown in FIG. 22 respectively. At step SH1 shown in FIG. 24, the first processing data $SOURCE_1$, the second processing data $SOURCE_2$ and the instruction $INST_{r+1}$ are held in the processing-data register 100, the processing-data register 200 and the instruction register 300 respectively. Thus, the first processing data $SOURCE_1$, the second processing data $SOURCE_2$ and the instruction $INST_{r+1}$ are held in the stage latch circuit $110_1$, the stage latch circuit $210_1$ and the stage latch circuit $310_1$ respectively.

At the next step SH2, the instruction decoder $320_{11}$ and the instruction decoder $320_{12}$ decide the kind of the instruction held in the stage latch circuit $310_1$. In this case, the instruction $INST_{r+1}$ is being held in the stage latch circuit $310_1$. Therefore, the instruction decoder $320_{11}$, and the instruction decoder $320_{12}$ proceed to the step SH5. At the step SH5 to the step SH7, the stage latch circuit $110_1$ and the stage latch circuit $210_1$ are selected by the multiplexer $700_1$ and the multiplexer $800_1$ respectively in a similar manner to that described above. Thus, the first processing data $SOURCE_1$ and the second processing data $SOURCE_2$ are held in the stage latch circuit $110_2$ and the stage latch circuit $210_2$ respectively. The instruction $INST_{r+1}$ is held in the stage latch circuit $310_2$.

Thereafter, at the second processing stage to the (r−2)-th processing stage (not shown), the stage latch circuits are selected by the multiplexers in a similar manner to that of the first processing stage. Thus, the first processing data $SOURCE_1$ and the second processing data $SOURCE_2$ are sequentially passed through the respective processing stages. At the second processing stage to the (r−2)-th processing stage, the instruction $INST_{r+1}$ is held sequentially in the stage latch circuits.

At the (r−1)-th processing stage, at the step SH8, the instruction $INST_{r+1}$ is being held in the stage latch circuit $310_{r-1}$. Therefore, the instruction decoder $320_{r-11}$ and the instruction decoder $320_{r-12}$ proceed to step SH11. At the step SH11 to the step SH13, the stage latch circuit $110_{r-1}$ and the stage latch circuit $210_{r-1}$ are selected by the multiplexer $700_{r-1}$ and the multiplexer $800_{r-1}$, in a similar manner to that described above. Thus, the first processing data $SOURCE_1$ and the second processing data $SOURCE_2$ are held in the stage latch circuit $110_r$ and the stage latch circuit $210_r$ respectively. The value (the instruction $INST_{r+1}$) of the stage latch circuit $110_{r-1}$ is held in the stage latch circuit $310_r$.

At the r-th processing stage, at the step SH14 (refer to FIG. 25), the instruction $INST_{r+1}$ is being held in the stage latch circuit $310_r$. Therefore, the instruction decoder $320_r$ proceeds to the step SH17. At the step SH17 to the step SH19, the instruction $INST_{r+1}$ is converted into the through instruction $SRC_1$, and the value (the first processing data $SOURCE_1$) of the stage latch circuit $110_r$ is held in the stage latch circuit $110_{r+1}$, in a similar manner to that described above. The value (the instruction $INST_{r+1}$) of the stage latch circuit $310_r$ is held in the stage latch circuit $310_{r+1}$.

At the (r+1)-th processing stage, at the step SH20, the instruction $INST_{r+1}$ is being held in the stage latch circuit $310_{r+1}$. Therefore, the instruction decoder $320_{r+1}$ proceeds to the step SH21. At the step SH21, the instruction decoder $320_{r+1}$ decodes the instruction $INST_{r+1}$ to the operator $120_{r+1}$. The operator $120_{r+1}$ then executes the processing according to the instruction $INST_{r+1}$ by using the value (the first processing data $SOURCE_1$) of the stage latch circuit $110_{r+1}$. At the next step SH22, the processing result of the operator $120_{r+1}$ is held in the stage latch circuit $110_{r+2}$. The value (the instruction $INST_{r+1}$) of the stage latch circuit $310_{r+1}$ is held in the stage latch circuit $310_{r+2}$. Thereafter, at the (r+2)-th processing stage to the (s−1)-th processing stage (not shown), the through instruction $SRC_1$ is decoded at each processing stage. The processing result of the operator $120_{r+1}$ is sequentially passed through each processing stage.

At the s-th processing stage shown in FIG. 23, at the step SH26 (refer to FIG. 26), the instruction $INST_{r+1}$ is being held in the stage latch circuit $310_s$. Therefore, the instruction decoder $320_s$ proceeds to the step SH29. At the step SH29 to the step SH31, the through instruction $SRC_1$ is decoded in a similar manner to that explained above, and the value (the processing result of the operator $120_{r+1}$) of the stage latch circuit $110_s$ is held in the stage latch circuit $110_{s+1}$. Thereafter, at the (s+1)-th processing stage to the (n−1)-th processing stage (not shown), the through instruction $SRC_1$ is decoded, and the processing result of the operator $120_{r+1}$ is sequentially passed through each processing stage. At the (s+1)-th processing stage to the (n−1)-th processing stage, the instruction $INST_{r+1}$ is sequentially held in the stage latch circuits.

At the n-th processing stage, at the step SH32, the instruction $INST_{r+1}$ is being held in the stage latch circuit $310_1$. Therefore, the instruction decoder $320_n$ proceeds to the step SH35. At the step SH35 to the step SH37, the through instruction $SRC_1$ is decoded in a similar manner to that explained above. Thus, the value (the processing result of the operator $120_{r+1}$) of the stage latch circuit $110_n$ is held in the stage latch circuit $110_{n+1}$. At the next step SH38, the processing-result register 500 holds the processing result of the operator $120_{r+1}$ as the processing result of the pipeline operator.

As explained above, according to the eighth embodiment, at the time of executing the processing at the x-th processing stage, the through instruction $SRC_1$ is decoded at the (x+1)-th processing stage to the n-th processing stage respectively. Thus, the processing result of the operator $120x$ at the x-th processing stage is passed through. Therefore, it is possible to reduce both hardware volume and power consumption at the (x+1)-th processing stage to the n-th processing stage. Further, according to the eighth embodiment, it is possible to make one operator at one processing stage execute the processing independent of other operators among the r-th processing stage to the s-th processing stage.

In the eighth embodiment, there has been explained a case where one operator at one processing stage executes the processing independent of other operators among the m processing stages from the r-th processing stage to the s-th processing stage shown in FIG. 22 and FIG. 23. However, it is also possible to make only one operator at one specific processing stage execute the processing. Further, in the eighth embodiment, it is also possible to make each of the operators at the (x−p)-th processing stage to the x-th processing stage execute the processing independent of other operators among the m processing stages from the r-th processing stage to the s-th processing stage (p≦s−r).

The first to the eighth embodiments relating to the present invention have been explained above with reference to the drawings. However, the detailed structures are not limited to the above embodiments. Any other modifications including design changes which are within the gist and scope of the present invention are all included in the present invention. For example, in each of the first to the eighth embodiments, one example of combination of the number of processing stages, stage latch circuits, operators, instruction decoders, and multiplexers respectively has been explained. Therefore, in the first to the eighth embodiments, it is also possible to change the number of stages, parts and combinations according to the need when the through instruction $SRC_1$ (and/or the through instruction $SRC_2$) is used.

As explained above, according to the present invention, the processing data held in the upstream latching unit is passed through the first processing unit at the time of decoding the instruction to the second processing unit. Therefore, it is possible to reduce the sharing of the latching unit and to reduce the wiring between the first processing unit and the second processing unit. As a result, there is an effect that the hardware volume and power consumption can be reduced.

Further, according to the present invention, the processing result of the first latching unit held in the upstream latching unit is passed through the second processing unit at the time of decoding the instruction to the first processing unit. Therefore, it is possible to reduce the latching unit and to reduce the wiring at the downstream of the second processing unit. As a result, there is an effect that the hardware volume and power consumption can be reduced.

Further, according to the present invention, the processing data held in the upstream latching units are passed through the first processing unit to the (x−1)-th processing unit at the time of decoding the instruction to the x-th processing unit. Therefore, it is possible to reduce both the stage latch circuits and the wiring at the first processing stage to the (x−1)-th processing stage from the conventional levels. As a result, there is an effect that the hardware volume and power consumption can be reduced.

Further, according to the present invention, the processing result of the x-th latching unit held in the upstream latching unit is passed through the (x+1)-th processing unit to the n-th processing unit at the time of decoding the instruction to the x-th processing unit. Therefore, it is possible to reduce both the stage latch circuits and the wiring in the (x+1)-th processing unit to the n-th processing stage from the conventional levels. As a result, there is an effect that the hardware volume and power consumption can be reduced.

Further, according to the present invention, the processing data held in the upstream latching unit is passed through the first processing unit at the time of decoding the instruction to the second processing unit. Therefore, there is an effect that it is possible to reduce the sharing of the latching unit and to reduce the wiring between the first processing unit and the second processing unit. As a result, there is an effect that the hardware volume and power consumption can be reduced. Further, the invention has an effect that the second processing unit can execute the processing independent of the first processing unit.

Further, according to the present invention, the processing result of the first processing unit held in the upstream latching unit is passed through the second processing unit at the time of decoding the instruction to the first processing unit. Therefore, it is possible to reduce the latching unit and to reduce the wiring at the downstream of the second processing unit. As a result, there is an effect that the hardware volume and power consumption can be reduced. Further, the invention has an effect that the first processing unit can execute the processing independent of the second processing unit.

Further, according to the present invention, the processing data held in the upstream latching units are passed through the first processing unit to the (x−1)-th processing unit at the time of decoding the instruction to the x-th processing unit. Therefore, it is possible to reduce both the stage latch circuits and the wiring in the first processing unit to the (x−1)-th processing unit from the conventional levels. As a result, there is an effect that the hardware volume and power consumption can be reduced. Further, the invention has an effect that the x-th processing unit in the r-th processing unit to the s-th processing unit can execute the processing independent of other processing units.

Further, according to the present invention, the processing data held in the upstream latching units are passed through the first processing unit to the (x−1)-th processing unit at the time of decoding the instruction to the x-th processing unit to the (x+p)-th processing unit. Therefore, it is possible to reduce both the stage latch circuits and the wiring in the first processing unit to the (x−1)-th processing unit from the conventional levels. As a result, there is an effect that the hardware volume and power consumption can be reduced. Further, the invention has an effect that the x-th processing unit to the (x+p)-th processing unit in the r-th processing unit to the s-th processing unit can execute the processing independent of other processing units.

Further, according to the present invention, the processing result of the x-th processing unit held in the upstream latching unit is passed through the (x+1)-th processing unit to the n-th processing unit at the time of decoding the instruction to the x-th processing unit. Therefore, it is possible to reduce both the stage latch circuits and the wiring in the (x+1)-th processing unit to the n-th processing unit from the conventional levels. As a result, there is an effect that the hardware volume and power consumption can be reduced. Further, the invention has an effect that the x-th processing unit in the r-th processing unit to the s-th processing unit can execute the processing independent of other processing units.

Further, according to the present invention, the processing results of the (x−p)-th processing unit to the x-th processing unit held in the upstream latching units are passed through the (x+1)-th processing unit to the n-th processing unit at the time of decoding the instructions to the (x−p)-th processing unit to the x-th processing unit. Therefore, it is possible to reduce both the stage latch circuits and the wiring in the (x+1)-th processing unit to the n-th processing unit from the conventional levels. As a result, there is an effect that the hardware volume and power consumption can be reduced. Further, the invention has an effect that the (x−p)-th processing unit to the x-th processing unit in the r-th processing unit to the s-th processing unit can execute the processing independent of other processing units.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A processor execution pipeline, comprising:
   a first instruction decoding unit that determines at least a kind of instruction in a current processing stage, decodes a first instruction into a first control signal, and decodes all other instructions with the exception of the first instruction into a second control signal as a through instruction upon determining at least the kind of instruction;
   a first processing unit provided in the current processing stage and connected to the first instruction decoding unit, the first processing unit being configured to perform a first operation on a first data when receiving the first control signal, and to pass through the first data when receiving the second control signal;
   a latch circuit provided between the current processing stage and a next processing stage, the latch circuit holding one of a result of the first operation and the first data passing through the first processing unit as a second data;
   a second instruction decoding unit that determines at least a kind of instruction in a next processing stage, decodes a second instruction into a third control signal, and decodes all other instructions with the exception of the second instruction into a fourth control signal upon determining at least the kind of instruction;
   a second processing unit provided in the next processing stage and connected to the second instruction decoding unit, the second processing unit being configured to perform a second operation on the second data when receiving the third control signal; and
   a multiplexer provided in the next processing stage for selecting an output of the second processing unit or the second data held in the latch circuit based on an output of the second instruction decoding unit.

2. The processor execution pipeline according to claim 1, wherein
   the multiplexer selects an output of the second processing unit when receiving the third control signal, and selects the second data when receiving the fourth control signal.

3. The processor execution pipeline according to claim 1, wherein the first processing unit receives multiple data as the first data.

4. A processor execution pipeline, comprising:
a first latch circuit provided in a current processing stage for storing a first data;
a first instruction decoding unit that determines at least a kind of instruction in the current processing stage, that decodes a first instruction into a first control signal, and that decodes all other instructions with the exception of the first instruction into a second control signal upon determining at least the kind of instruction;
a first processing unit provided in the current processing stage and connected to the first instruction decoding unit, the first processing unit being configured to perform a first operation on a first data when receiving the first control signal;
a bypass line provided in parallel with the first processing unit;
a multiplexer provided in the current processing stage for selecting one of an output of the first processing unit or the first data held in the first latch circuit based on an output of the first instruction decoding unit;
a second latch circuit provided between the current processing stage and a next processing stage, the second latch circuit holding one of a result of the first operation and the first data bypassing the first processing unit through the bypass line as a second data;
a second instruction decoding unit that determines at least a kind of instruction in the next processing stage, that decodes a second instruction into a third control signal, and that decodes all other instructions with the exception of the second instruction into a fourth control signal as a through instruction upon determining at least the kind of instruction; and
a second processing unit provided in the next processing stage and connected to the second instruction decoding unit, the second processing unit being configured to perform a second operation on the second data when receiving the third control signal, and to pass the second data when receiving the fourth control signal.

5. The processor execution pipeline according to claim 4, wherein
the multiplexer selects an output of the first processing unit when receiving the first control signal, and selects the first data when receiving the second control signal.

6. The processor execution pipeline according to claim 4, wherein
the first processing unit receives multiple data as the first data, and the multiplexer receives the output of the first operating unit and one of the multiple data.

7. A processor execution pipeline, comprising:
a first instruction decoding unit that determines at least a kind of instruction in a current processing stage, that decodes a first instruction into a first control signal, and that decodes all other instructions with the exception of the first instruction into a second control signal as a through instruction upon determining at least the kind of instruction;
a first processing unit provided in the current processing stage and connected to the first instruction decoding unit, the first processing unit being configured to perform a first operation on a first data when receiving the first control signal, and to pass the first data when receiving the second control signal;
a latch circuit provided between the current processing stage and a next processing stage, the latch circuit holding one of a result of the first operation and the first data passing through the first processing unit as a second data;
a second instruction decoding unit that determines at least a kind of instruction in the next processing stage, that decodes the first instruction into a third control signal, decodes a second instruction into a fourth control signal, and decodes all other instructions with the exception of the first and second instructions into a fifth control signal upon determining at least the kind of instruction;
a second processing unit provided in the next processing stage and connected to the second instruction decoding unit, the second processing unit being configured to perform a second operation on a second data when receiving the third control signal, and performs a third operation on the second data when receiving the fourth control signal; and
a multiplexer provided in the next processing stage for selecting an output of the second processing unit or the second data held in the latch circuit based on an output of the second instruction decoding unit.

8. The processor execution pipeline according to claim 7, wherein
the multiplexer selects an output of the second processing unit when receiving either one of the third or the fourth control signals, and selects the second data when receiving the fifth control signal.

9. The processor execution pipeline according to claim 7, wherein the first processing unit receives multiple data as the first data.

10. A processor execution pipeline, comprising:
a first latch circuit provided in a current processing stage for storing a first data;
a first instruction decoding unit that determines at least a kind of instruction in the current processing stage, that decodes a first instruction into a first control signal, decodes a second instruction into a second control signal, and decodes all other instructions with the exception of the first and second instructions into a third control signal upon determining at least the kind of instruction;
a first processing unit provided in the current processing stage and connected to the first instruction decoding unit, the first processing unit being configured to perform a first operation on a first data when receiving the first control signal, and performs a second operation on the first data when receiving the second control signal;
a bypass line provided in parallel with the first processing unit;
a multiplexer provided in the current processing stage for selecting one of an output of the first processing unit or the first data held in the first latch circuit based on an output of the first instruction decoding unit;
a second latch circuit provided between the current processing stage and a next processing stage, the second latch circuit holding one of a result of the first operation and the first data bypassing the first processing unit through the bypass line as a second data;
a second instruction decoding unit provided in the next processing stage, that decodes the first instruction into a fourth control signal, and that decodes all other instructions with the exception of the first instruction into a fifth control signal as a through instruction upon determining at least the kind of instruction; and
a second processing unit provided in the next processing stage and connected to the second instruction decoding unit, the second processing unit being configured to perform a third operation on a second data when receiving the fourth control signal, and to pass the second data when receiving the fifth control signal.

11. The processor execution pipeline according to claim 10, wherein
the multiplexer selects an output of the first processing unit when receiving either one of the first or the second control signals, and selects the first data when receiving the third control signal.

12. The processor execution pipeline according to claim 10, further comprising:
a latching unit that holds the output of the multiplexer, where the second data is data held by the latching unit.

13. A processor execution pipeline having at least a latching unit to hold and output data, comprising:
a first instruction decoding unit to convert a first instruction into a first control signal in a current processing stage, and to convert all other instructions with the exception of the first instruction into a second control signal as a through instruction;
a first processing unit provided in the current processing stage and connected to the first instruction decoding unit, the first processing unit being configured to perform a first operation on a first data when receiving the first control signal, and to pass the first data when receiving the second control signal;
a latching circuit provided between the current processing stage and a next processing stage, the latch circuit holding one of a result of the first operation and the first data passing the first processing unit as a second data;
a second instruction decoding unit in the next processing stage to convert a second instruction into a third control signal, and to convert all other instructions with the exception of the second instruction into a fourth control signal;
a second processing unit provided in the next processing stage and connected to the second instruction decoding unit, the second processing unit being configured to perform a second operation on the second data when receiving the third control signal; and
a multiplexer provided in the next processing stage for selecting an output of the second processing unit or the second data held in the latching circuit based on an output of the second instruction decoding unit;
wherein the latching unit is configured to be shared by the first processing unit and the second processing unit.

* * * * *